July 20, 1943.    B. JORGENSEN    2,324,509
MACHINE FOR USE IN THE MANUFACTURE OF SHOES
Filed Feb. 4, 1941    20 Sheets-Sheet 1

INVENTOR
Bernhardt Jorgensen
By his Attorney

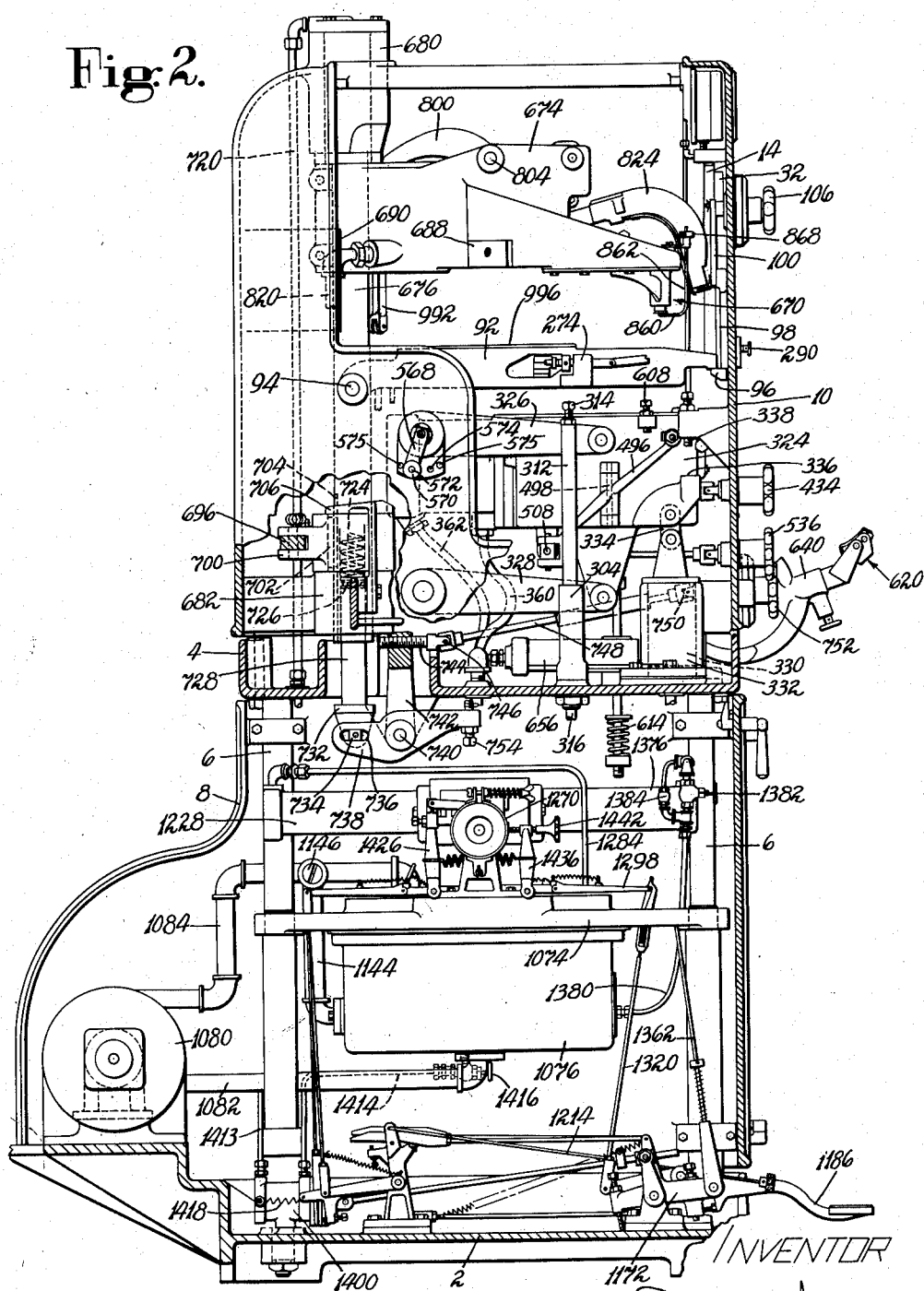

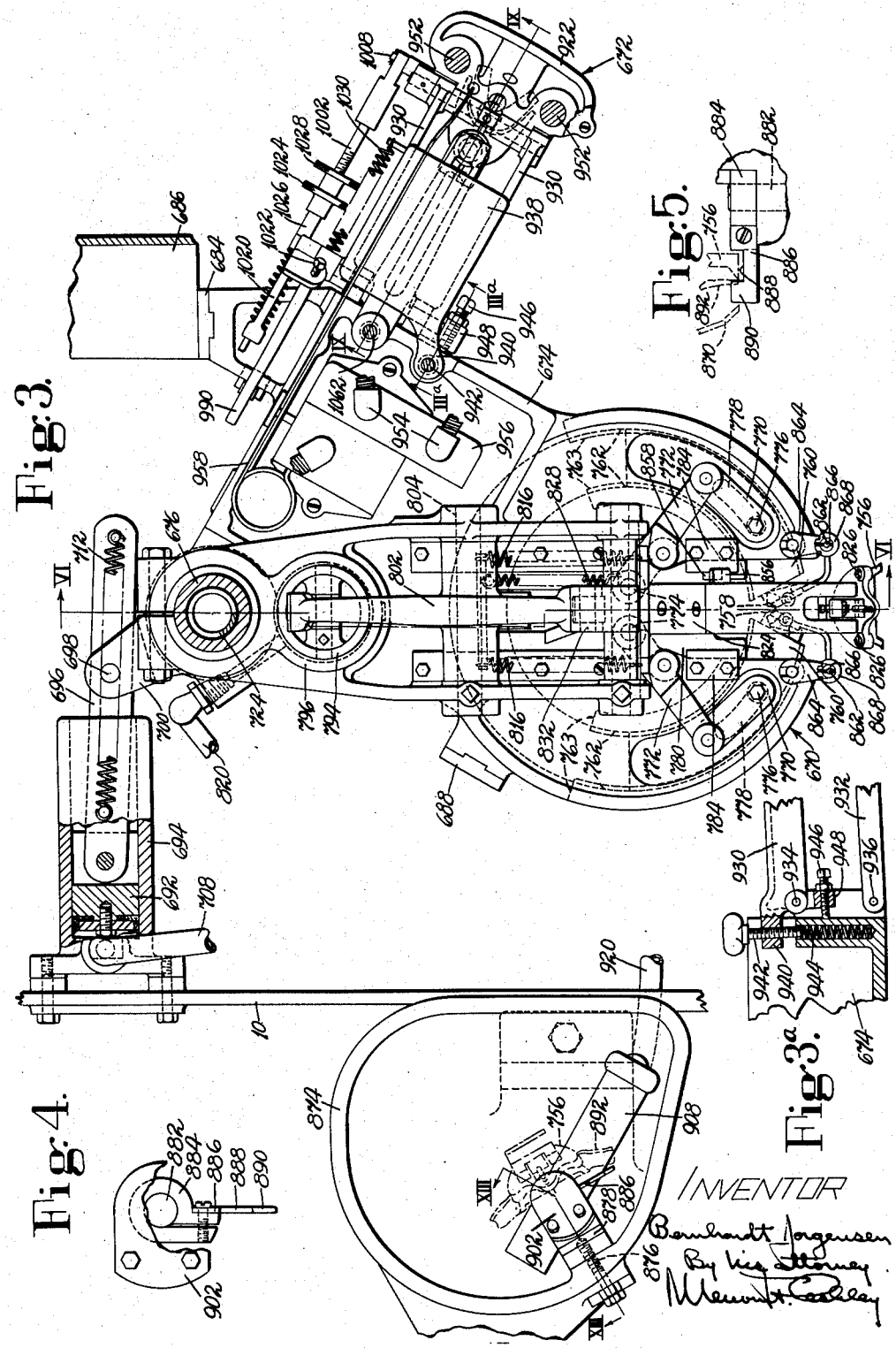

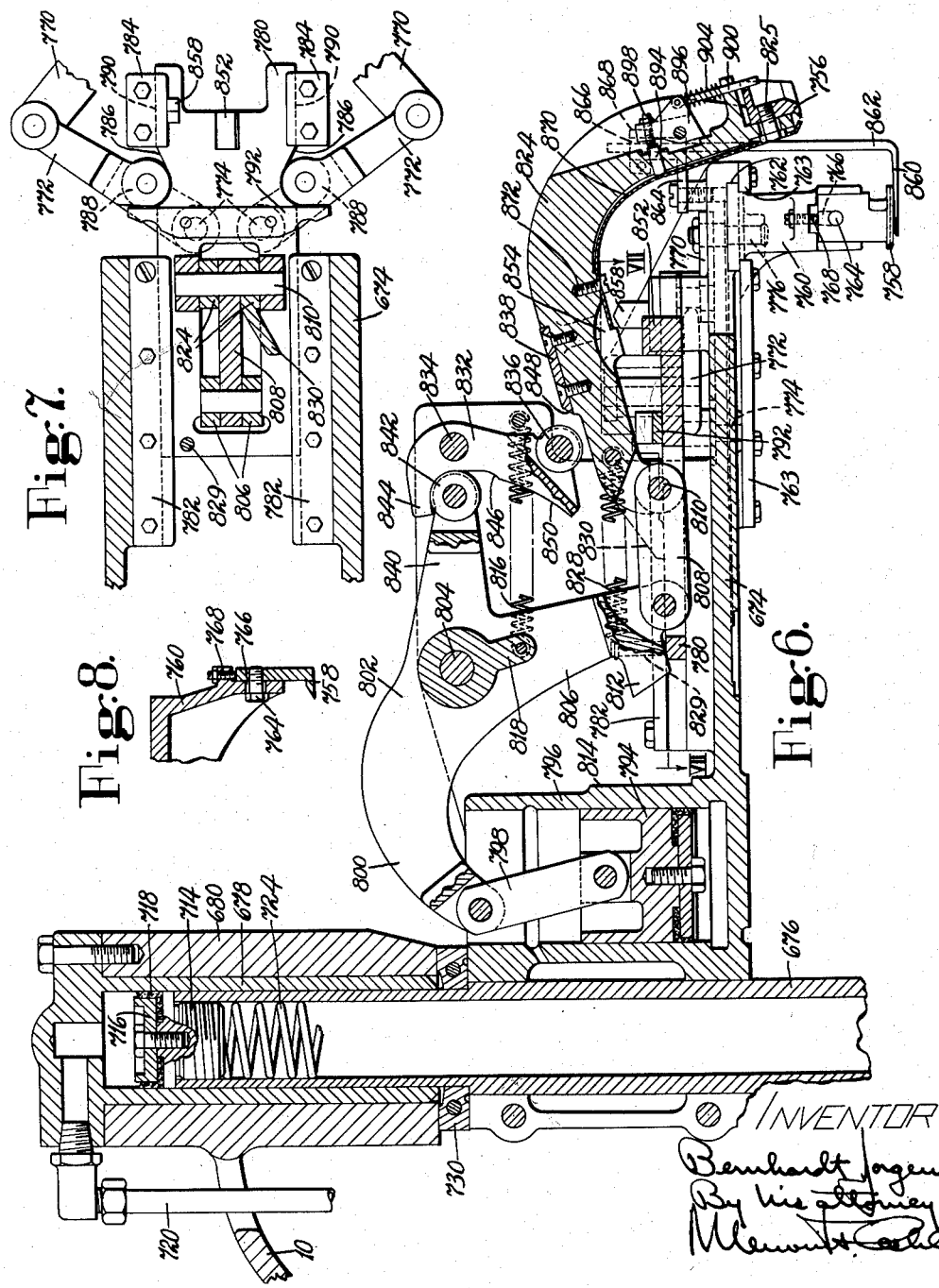

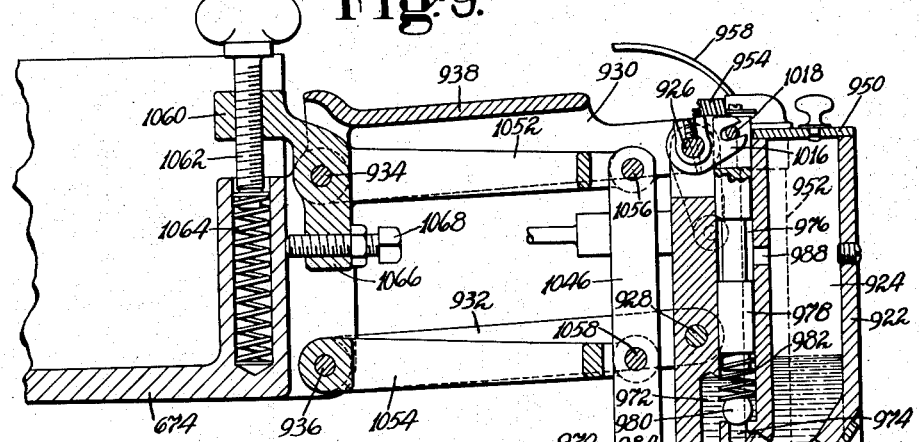
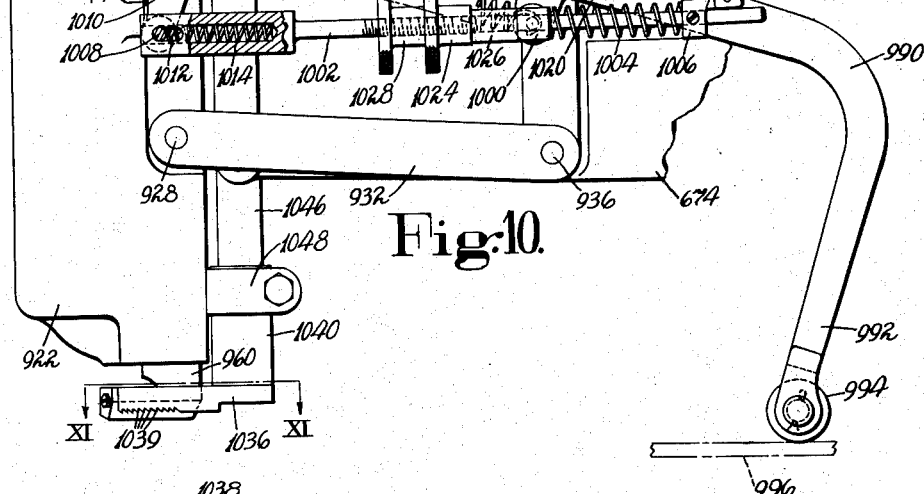

July 20, 1943. B. JORGENSEN 2,324,509
MACHINE FOR USE IN THE MANUFACTURE OF SHOES
Filed Feb. 4, 1941 20 Sheets-Sheet 6

INVENTOR
Bernhardt Jorgensen
By his attorney

July 20, 1943.   B. JORGENSEN   2,324,509
MACHINE FOR USE IN THE MANUFACTURE OF SHOES
Filed Feb. 4, 1941   20 Sheets-Sheet 7
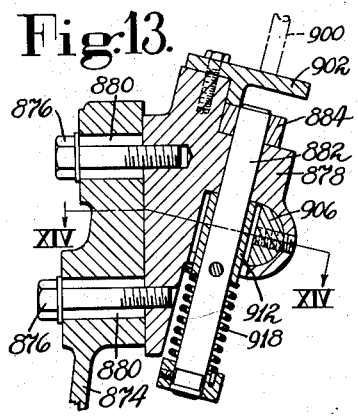
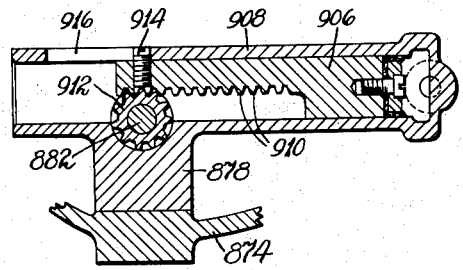
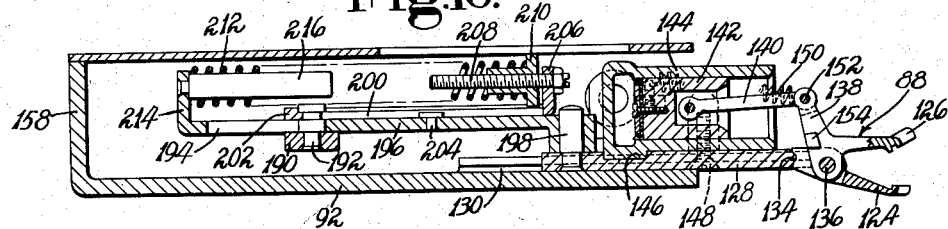
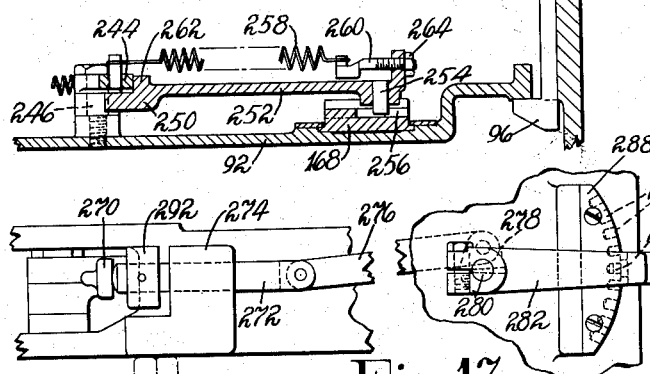

July 20, 1943. B. JORGENSEN 2,324,509
MACHINE FOR USE IN THE MANUFACTURE OF SHOES
Filed Feb. 4, 1941 20 Sheets-Sheet 8
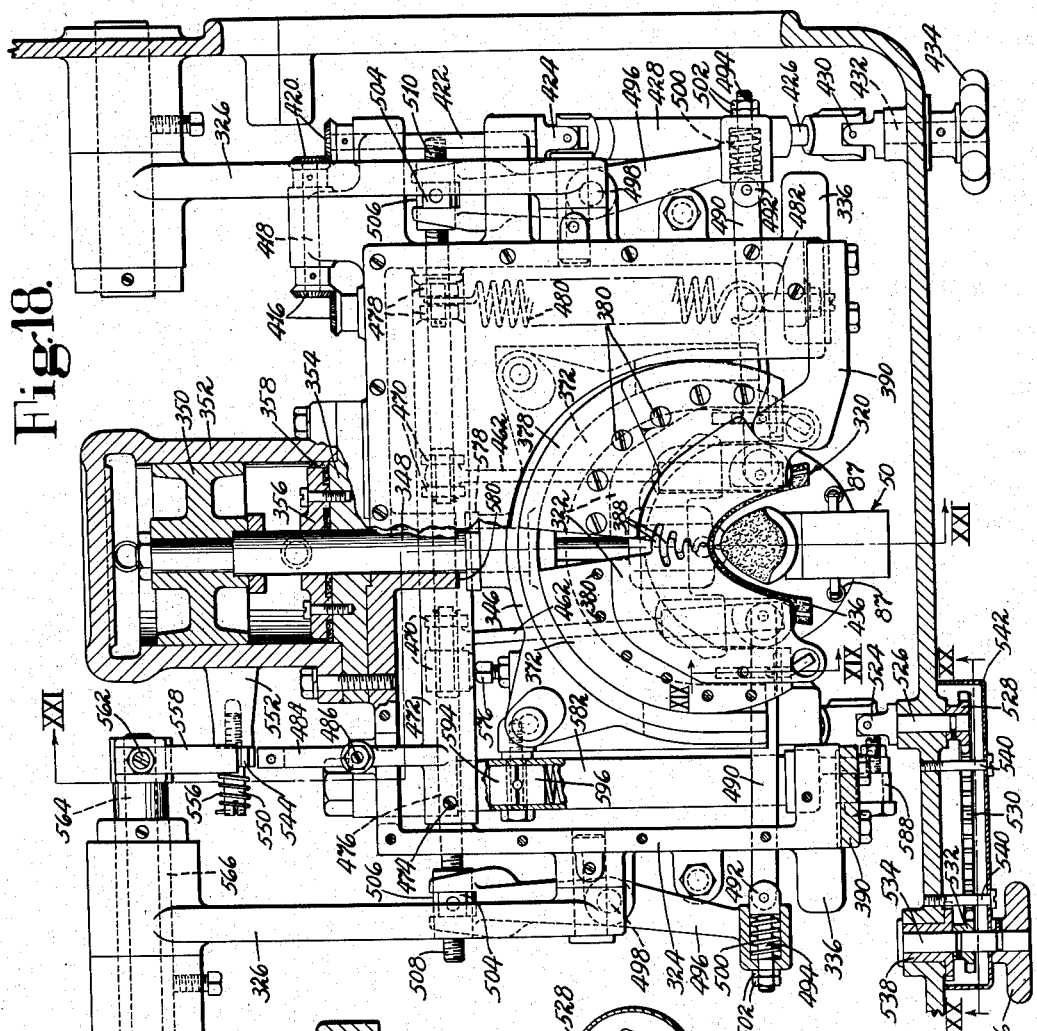
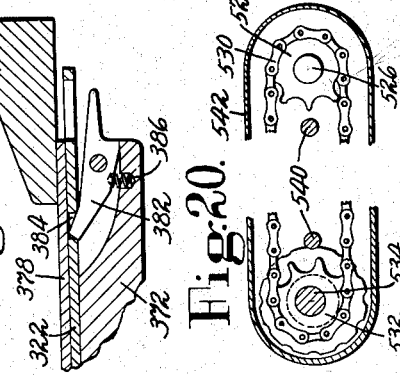
INVENTOR July 20, 1943. B. JORGENSEN 2,324,509
MACHINE FOR USE IN THE MANUFACTURE OF SHOES
Filed Feb. 4, 1941 20 Sheets-Sheet 9
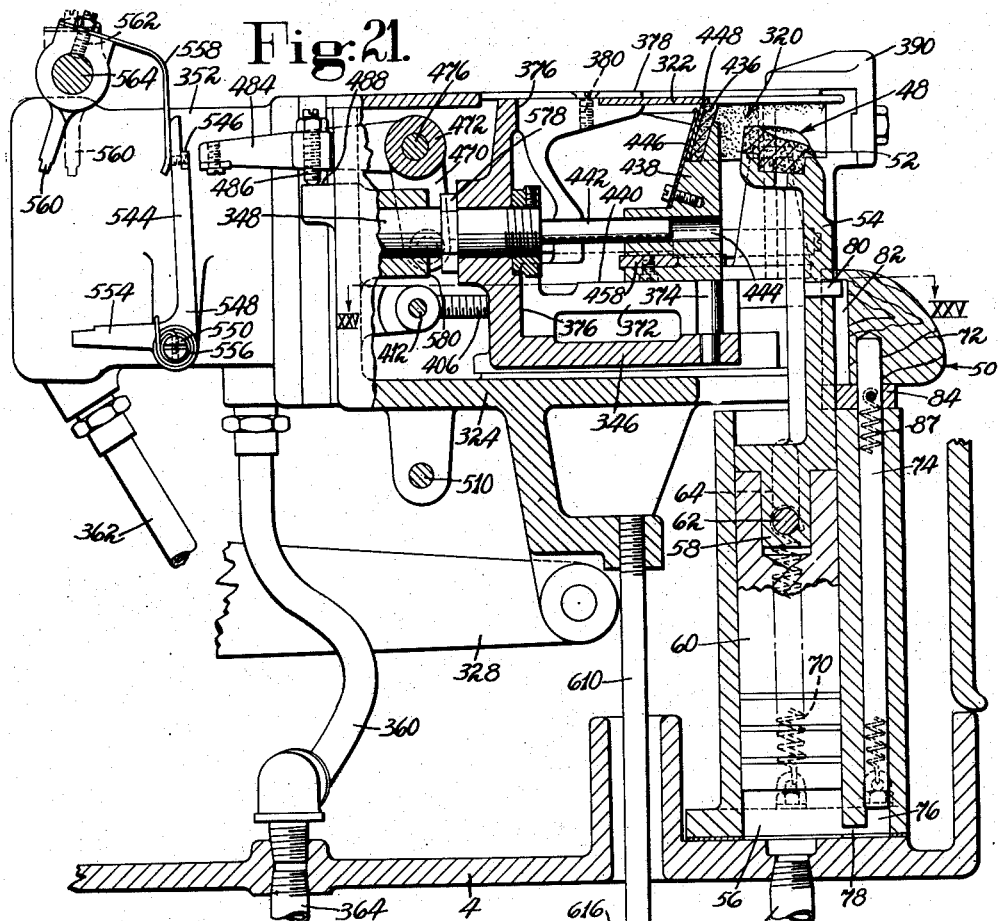
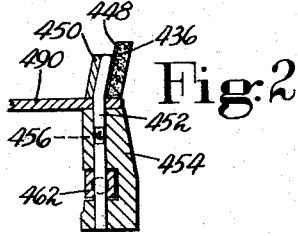
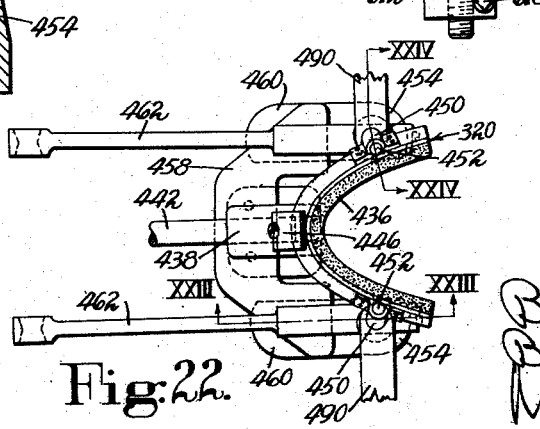
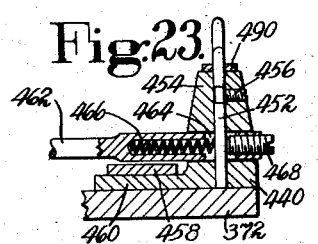

July 20, 1943.    B. JORGENSEN    2,324,509
MACHINE FOR USE IN THE MANUFACTURE OF SHOES
Filed Feb. 4, 1941    20 Sheets-Sheet 13

INVENTOR
Bernhardt Jorgensen
By his attorney

July 20, 1943.     B. JORGENSEN     2,324,509
MACHINE FOR USE IN THE MANUFACTURE OF SHOES
Filed Feb. 4, 1941     20 Sheets-Sheet 14
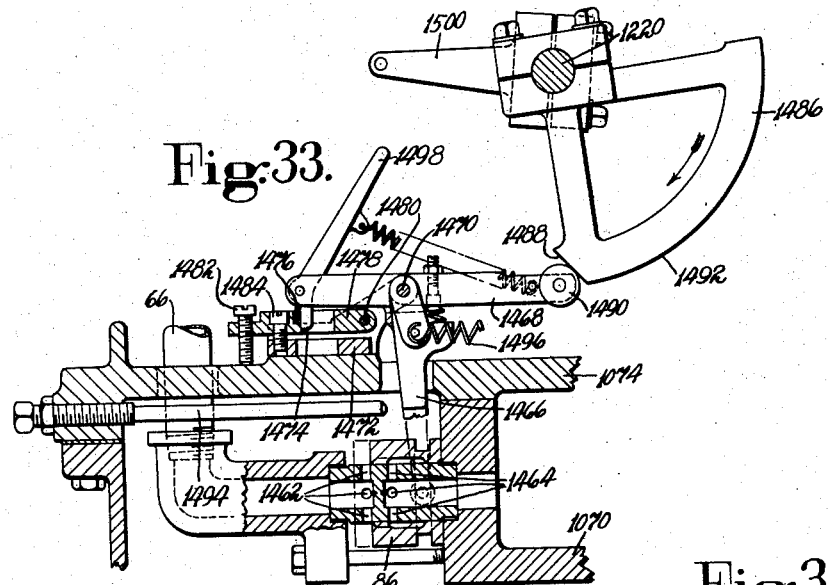
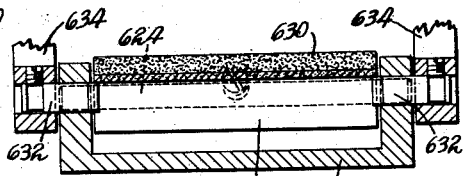
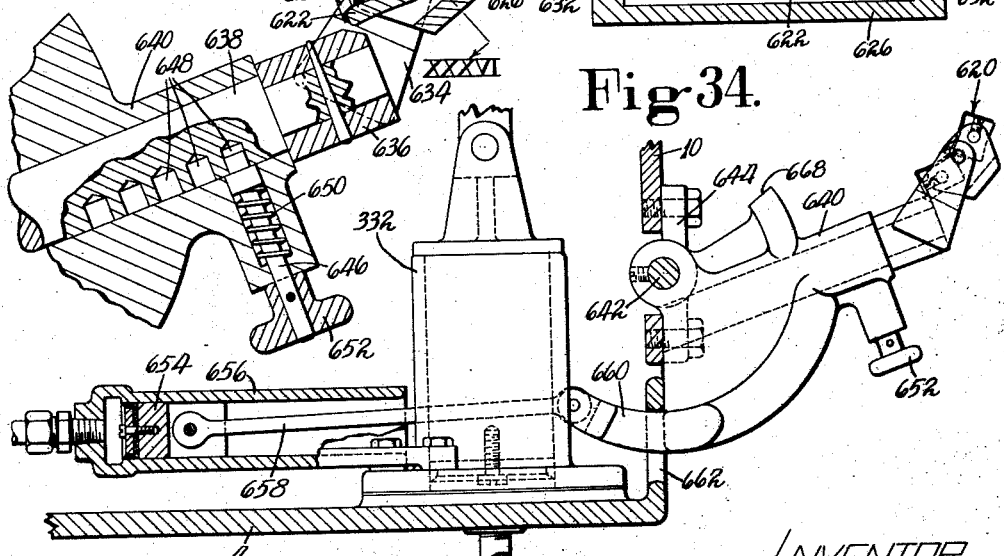
INVENTOR
Bernhardt Jorgensen
By his attorney

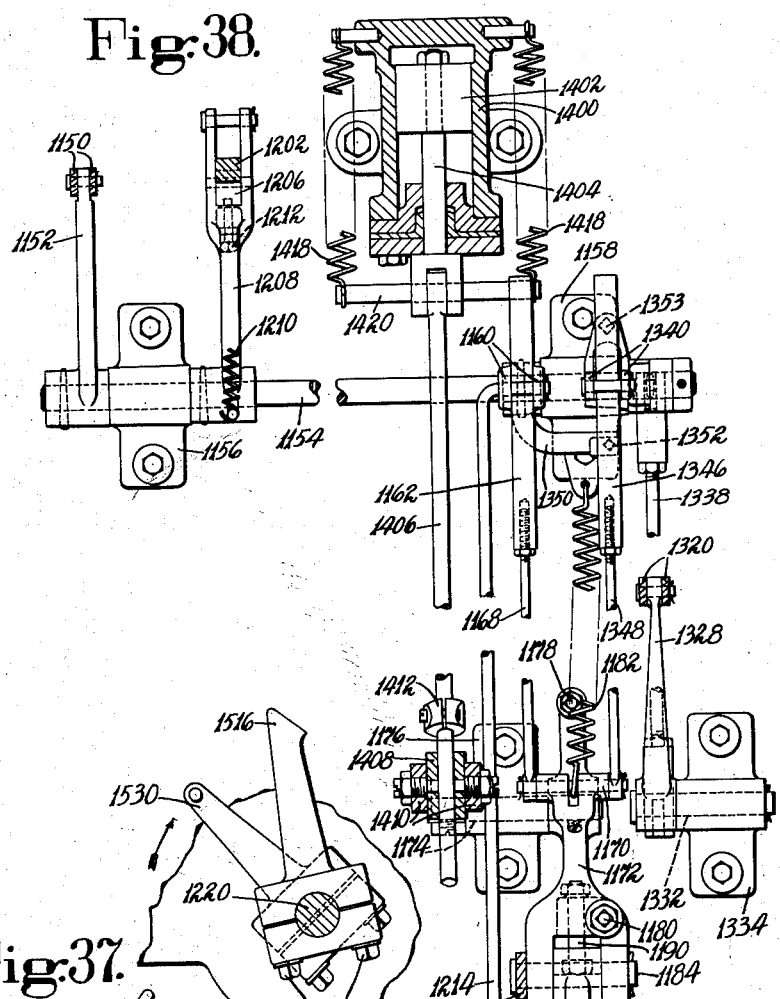

July 20, 1943.     B. JORGENSEN     2,324,509
MACHINE FOR USE IN THE MANUFACTURE OF SHOES
Filed Feb. 4, 1941     20 Sheets-Sheet 18
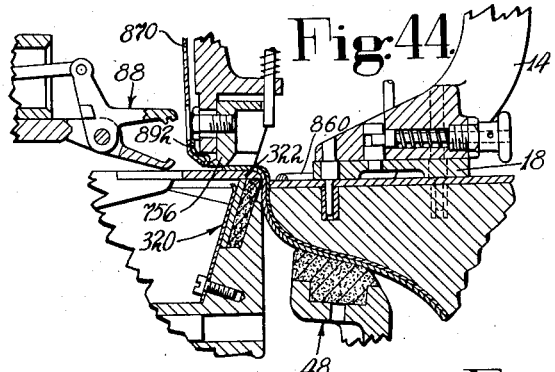
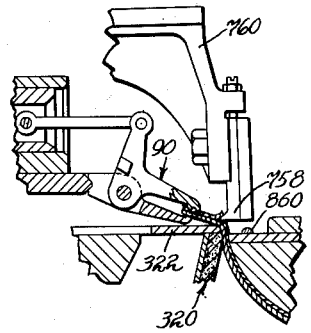
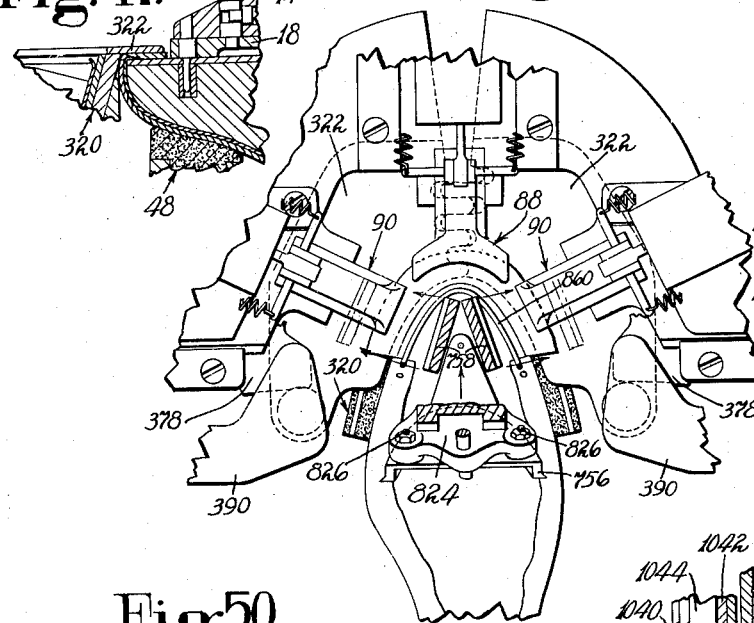
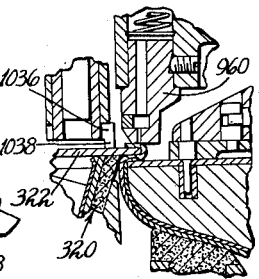
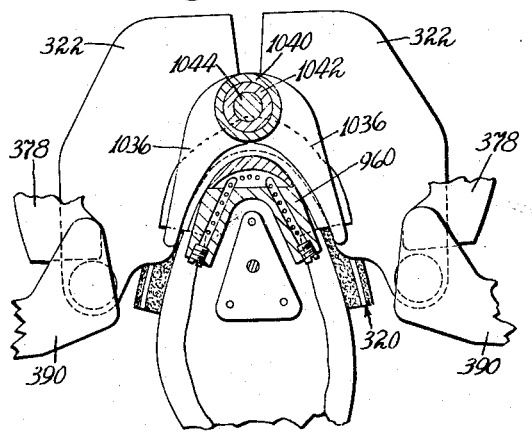
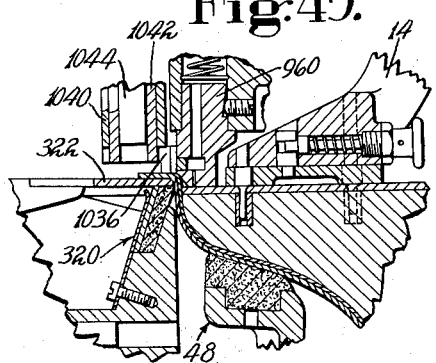

July 20, 1943.  B. JORGENSEN  2,324,509
MACHINE FOR USE IN THE MANUFACTURE OF SHOES
Filed Feb. 4, 1941  20 Sheets-Sheet 19

INVENTOR
Bernhardt Jorgensen
By his attorney

Patented July 20, 1943

2,324,509

UNITED STATES PATENT OFFICE 2,324,509

MACHINE FOR USE IN THE MANUFACTURE OF SHOES

Bernhardt Jorgensen, Marblehead, Mass., assignor to United Shoe Machinery Corporation, Flemington, N. J., a corporation of New Jersey Application February 4, 1941, Serial No. 377,347

202 Claims. (Cl. 12—14)

This invention relates to machines for use in the manufacture of shoes, and is herein illustrated as embodied in a machine for lasting the toe ends of shoes. In various novel aspects, however, the invention is not limited to toe-lasting machines, and with respect to some of its novel features also it is not limited to machines or mechanisms for performing operations of the particular character herein disclosed.

An immediate object of the invention is to provide a power-operated machine for lasting the toe ends of shoes automatically in a speedy and effective manner when an adhesive, herein referred to as cement, is used to secure the toe end of the upper in lasted relation to an insole. For the purposes in view the machine herein shown comprises in its organization mechanisms for gripping and pulling the toe end of the upper, wiping the upper about the toe heightwise of the last, trimming from the upper the margin of one or more inner layers of the upper materials around the toe so that the margin of the outer layer will lie next to the insole, applying cement to the shoe, and wiping the margin of the outer layer of the upper over the insole into position to be secured thereto by the cement. In the illustrated embodiment of the invention the different mechanisms are operated by fluid pressure in predetermined time relation to one another. Novel features of the invention are to be recognized in various combinations of these mechanisms, in the construction of the mechanisms and in the means whereby they are operated and controlled. It will be understood that in various aspects the utility of the invention is not dependent upon the use of all such mechanisms in combination.

For trimming the toe end of the upper the machine herein shown is provided with a plurality of trimming knives movable outwardly from positions opposite the bottom of the shoe to sever the margin of all but the outer layer of the upper materials, these knives comprising side knives movable widthwise of the shoe about an axis opposite the toe end of the shoe and a middle knife movable rectilinearly lengthwise of the shoe. The sides knives are arranged to act first on the upper, after which the middle knife completes the upper-trimming operation. To avoid interference of the knives with one another, the middle knife is initially retracted heightwise of the shoe relatively to the side knives and is swung toward the shoe into the same plane as the side knives before it begins its operation on the upper. In the lasting machine organization disclosed the margins of the different layers of the upper materials, after the upper has been conformed to the contour of the toe end of the last, are supported in the upper-trimming operation in outturned position over wipers which thereafter wipe the margin of the outer layer inwardly over the insole. A plurality of toe grippers which grip the several layers at the end and the sides of the toe apply an outward pull to the upper in directions transverse to the height of the last prior to the upper-trimming operation and automatically release the upper just after the side knives begin their action thereon. Prior to the upper-trimming operation the several knives are moved as a unit heightwise of the shoe into position to operate thereon, and movable with them is a device for engaging the margin of the toe end of the insole and for holding it against the bottom of the last out of the paths of the knives. After the upper-trimming operation the knives are moved as a unit away from the shoe, and associated with them is means for holding the waste material removed from the upper and for carrying it away from the shoe. The waste material is thereafter released by the holding means and is removed therefrom by automatically operating mechanism provided for that purpose.

For applying cement to the shoe to secure the margin of the toe end of the upper to the insole, the machine herein shown is provided with cement-applying means which is mounted on the same support as the upper-trimming means and by movement of that support is carried into position to operate on the shoe as the trimming means is carried to a position away from the shoe, this support receiving swinging movement laterally of the shoe and also movement heightwise of the shoe. In the construction disclosed the cement-applying means comprises a cement receptacle and a pump which are movable as a unit toward the shoe, and spring-operated mechanism which in response to that movement is rendered effective to operate the pump to deliver cement on the insole. For use particularly with thermoplastic cement, the receptacle is maintained in a heated condition, as is also an insole-engaging member through which the cement is applied and which serves as a retarder in engagement with the margin of the upper as the margin is wiped inwardly over the insole by the wipers. Combined with this retarder, in the construction shown, is an additional retarder which is moved heightwise of the shoe with the cement-applying means and clamps the margin of the upper outspread on the wipers, the additional retarder and the above-mentioned insole-engaging member being so controlled as to permit each to yield heightwise of the shoe independently of the other.

The toe grippers above referred to as for gripping and pulling the upper in outward directions at the end and the sides of the toe assist not only in the proper positioning of the margin of the upper for the upper-trimming operation, but also in conforming the toe end of the upper tightly and smoothly to the contour of the last. Novel features of the invention are embodied in these grippers and in the means for operating and controlling them. As illustrated, each gripper comprises a pair of upper-gripping jaws and fluid-operated jaw-closing mechanism, and bodily movement is imparted to each gripper to pull the upper by additional fluid-operated means. For thus operating the grippers by the fluid-operated means, there are provided novel lever-and-spring mechanisms. The several grippers are mounted on a common support which is movable heightwise of the last to cause the grippers to pull the upper in that direction as well as in the previously mentioned outward directions. The machine includes fluid-operated means arranged for optional use thus to move the gripper support when it is desired to impart to the grippers a substantial amount of upper-pulling movement heightwise of the last. In the machine herein shown the wipers are moved by their support heightwise of the last into position to wipe the margin of the upper over the insole while the grippers are holding the upper under tension; and in order to insure proper clearance between the grippers and the wipers the machine is further provided with means for imparting to the gripper support a short movement heightwise of the last in response to the movement of the wiper support in that direction if the above-mentioned optional means for operating the gripper support is not in use.

The above-mentioned movement of the wipers heightwise of the last is permitted by parallel links which are spaced apart heightwise of the last and on which the wiper support is mounted, the movement of the support and the wipers being effected by fluid-operated means connected to the support; and carried by the wiper support is a double-acting cylinder-and-piston device by which operative inward movements and retractive movements are imparted to the wipers. After the wipers have wiped the margin of the upper inwardly over the insole, a spring which is subjected to stress by the movement of the wiper support heightwise of the last is rendered effective to force the wipers more firmly against the margin of the upper upon release of the operating fluid from the means whereby the wiper support is operated. Also carried by the wiper support is a toe former comprising a flexible band for embracing the upper around the toe end of the last and wiping it heightwise of the last in response to the movement of the support, this toe former in the construction shown being directly supported on wiper holders on which the wipers are mounted and by movements of which they are closed inward laterally of the shoe. The band is controlled by novel means permitting it to yield bodily lengthwise of the shoe and also permitting its end portions to yield laterally of the shoe in response to pressure of the shoe thereon. In accordance with a further feature, mechanism is provided for use at the will of the operator to render the toe former ineffective to wipe the upper heightwise of the last, as may be desirable in operating on some kinds of uppers. This mechanism comprises a latch arranged to retain the toe former in an idle retracted position lengthwise of the shoe upon movement of the toe former to that position by retractive movement of the wiper-operating means. If the latch is not in position for use, the toe former is immediately returned by a spring to its normal position lengthwise of the shoe in response to a short reverse movement of the wiper-operating means, so that the toe former will operate to wipe the upper heightwise of the last. If the latch is in position for use, it holds the toe former against such return by the spring until the wiper support has substantially completed its movement heightwise of the last, whereupon the latch is automatically retracted to cause the toe former then to be applied by the spring in clamping relation to the upper around the toe.

In the machine herein shown the various operations are performed in an operating cycle corresponding to a complete rotation about its axis of valve-controlling means with which the machine is provided. In order, however, to permit the operator to rearrange the margin of the upper in the grippers if it is not properly gripped by the gripper jaws, provision is afforded, by control of the fluid acting on the jaw-closing mechanisms, for the closing of the jaws on the upper prior to the starting of the cycle of operations and for optionally causing them to open and thereafter to grip the upper again also prior to the starting of the cycle. As illustrated, operating fluid is supplied by a continuously running pump to a pressure chamber from which, when the machine is idle, the fluid escapes through an outlet valve without developing any substantial pressure in the chamber, and this outlet valve is moved to stop the escape of the fluid and thus to establish pressure in the chamber by a member which is movable by the operator and which acts simultaneously to open a valve admitting fluid to the gripper-closing mechanisms. If it is desired to rearrange the margin of the upper in the grippers, the operator causes the outlet valve to return to its initial position, so that the pressure of the fluid is again reduced substantially to zero. In one form of construction herein disclosed the valve admitting fluid to the gripper-closing mechanisms remains open at this time, so that the grippers will close again simply in consequence of movement of the outlet valve once more into position to establish pressure in the pressure chamber. In another form disclosed the valve admitting fluid to the gripper-closing mechanisms is returned to initial position when the outlet valve is returned, after which both valves are once more operated by the above-mentioned member. The invention further provides for use of this same member, herein shown as a treadle, to start the cycle of operations after the proper gripping of the upper. As illustrated, another depression of the treadle in the same path as before serves to initiate the movement of the above-mentioned rotatable valve-controlling means, mechanism being provided for rendering the treadle ineffective to start this valve-controlling means when it is depressed to cause the grippers to grip the upper.

Novel features of the invention are also to be recognized in means for controlling the cycle of operations. In the construction shown the above-mentioned rotatable valve-controlling means comprises a shaft having thereon arms which actuate in proper time relation to one another the valves for admitting fluid to the various operating mechanisms and for releasing the fluid therefrom, the arms being relatively adjustable about the shaft to determine as desired the relative timing of the operations of the different mechanisms. The shaft is rotated by a piston movable in a cylinder to which the operating fluid is admitted by a valve operated by the above-mentioned depression of the treadle, this valve being further controlled by an arm on the shaft to terminate movement of the shaft at the proper time by releasing the fluid from the cylinder. The piston operates the shaft through a clutch which permits the piston to be returned by a spring without turning the shaft upon such release of the fluid from the cylinder, the shaft being held against reverse movement by a brake. Associated with the piston is a fluid check which variably retards its movement and thereby permits the duration of the cycle of operations to be varied as desired. The fluid acting on the piston is of the same pressure as that acting on the various operating mechanisms, and, accordingly, any variations in the pressure resulting from variations in the volume of fluid required at different times by the operating mechanisms causes the speed of the shaft to vary inversely as the volume of fluid thus required, so that sufficient time is allowed for the performance of any operation requiring a comparatively large volume of fluid.

In the machine herein shown there is an interruption in the cycle of operations between the beginning and the end of the cycle, the specific purpose of which is to permit the wipers to maintain their pressure for a few seconds on the margin of the upper after wiping it inwardly over the insole. This interruption in the cycle results from automatic control of the valve which admits fluid as above described to operate the control shaft, this valve being moved into position to release the fluid acting on the shaft and thus to permit return movement of the piston by which the shaft is rotated. The invention further provides automatic means for starting the machine again in operation after a predetermined interval. For this purpose, in the construction herein shown, the above-mentioned valve is moved once more into position to cause rotation of the control shaft by a fluid-operated member which begins its movement just before the interruption in the cycle and is variably retarded in its movement to determine the interval before the cycle is resumed. To insure that the shaft will be turned at the proper speed at the very beginning of its movement, mechanism is provided for so controlling the valve that when it is operated it will move at once to a fully open position to admit a full flow of fluid to operate the shaft. This mechanism serves also to control the valve in the same manner when the valve is operated by the treadle.

To insure that the rotatable valve-controlling means will be moved to a definitely predetermined position at the end of the cycle, the machine herein shown is provided with auxiliary mechanism for moving it fully to that position if it is not so moved by the fluid-operated means which rotates it. As illustrated, this auxiliary mechanism is spring mechanism controlled by fluid-pressure means which renders it effective at the end of the cycle. More particularly, it comprises a spring-operated member arranged to impart the final movement to the valve-controlling means, and a fluid-operated device which retracts the member against the resistance of its spring when the pressure of the operating fluid is established at the beginning of the cycle and releases it to the action of the spring when the pressure of the fluid is terminated at the end of the cycle. It will be recognized that novel features of this auxiliary mechanism are not limited to the specific use herein illustrated.

The above and other features of the invention, including novel valve-operating mechanism and various novel details of construction and combinations of parts, will now be more particularly described with reference to the accompanying drawings and thereafter pointed out in the claims.

In the drawings,

Fig. 2 is a view of the machine in left-hand side elevation, with parts broken away;

Fig. 3 is mainly a plan view of the means for trimming the upper and for applying cement to the shoe;

Fig. 3a is a section on the line IIIa—IIIa of Fig. 3;

Fig. 4 is a plan view, with parts broken away, showing in greater detail means provided at the left-hand side of Fig. 3 for removing waste material from the trimming means;

Fig. 5 is a view in elevation illustrating the action of the waste-removing means shown in Fig. 4;

Fig. 6 is a section on the line VI—VI of Fig. 3;

Fig. 7 is a section on the line VII—VII of Fig. 6;

Fig. 8 is a vertical section through one of the side-trimming knives and its support;

Fig. 9 is a section on the line IX—IX of Fig. 3;

Fig. 10 is a view in elevation, from the opposite side, of the structure shown in Fig. 9 and of other parts associated therewith;

Fig. 11 is a section on the line XI—XI of Fig. 10 with certain parts broken away to a lower level;

Fig. 13 is a section on the line XIII—XIII of Fig. 3;

Fig. 14 is a section on the line XIV—XIV of Fig. 13;

Fig. 15 is a section on the line XV—XV of Fig. 12;

Fig. 16 is a section on the line XVI—XVI of Fig. 12;

Fig. 17 is a view in left-hand side elevation of certain gripper-adjusting means shown in Fig. 12;

Fig. 18 is a plan view, with parts broken away, showing the toe wipers and parts associated therewith;

Fig. 19 is a section on the line XIX—XIX of Fig. 18;

Fig. 20 is a section on the line XX—XX of Fig. 18;

Fig. 21 is a section on the line XXI—XXI of Fig. 18;

Fig. 22 is a plan view of the toe former and parts associated therewith;

Fig. 23 is a section on the line XXIII—XXIII of Fig. 22;

Fig. 24 is a section on the line XXIV—XXIV of Fig. 22;

Fig. 33 is a section on the line XXXIII—XXXIII of Fig. 28;

Fig. 34 is a view partly in left-hand side elevation and partly in section, showing a heel rest for the shoe and the means for operating it;

Fig. 35 is a vertical sectional view of a portion of the structure shown in Fig. 34;

Fig. 36 is a section on the line XXXVI—XXXVI of Fig. 35;

Fig. 37 is a section on the line XXXVII—XXXVII of Fig. 28;

Fig. 38 is a view partly in plan and partly in section of a portion of the controlling means which is shown near the bottom of Fig. 29;

Figure 42:
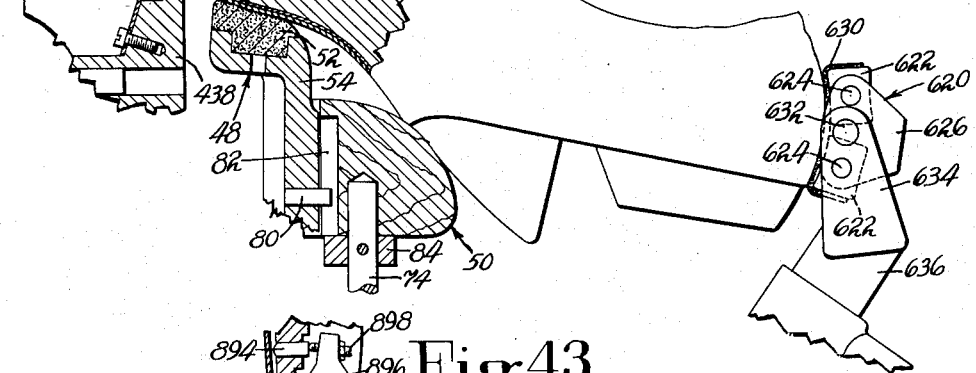
Figure 51:
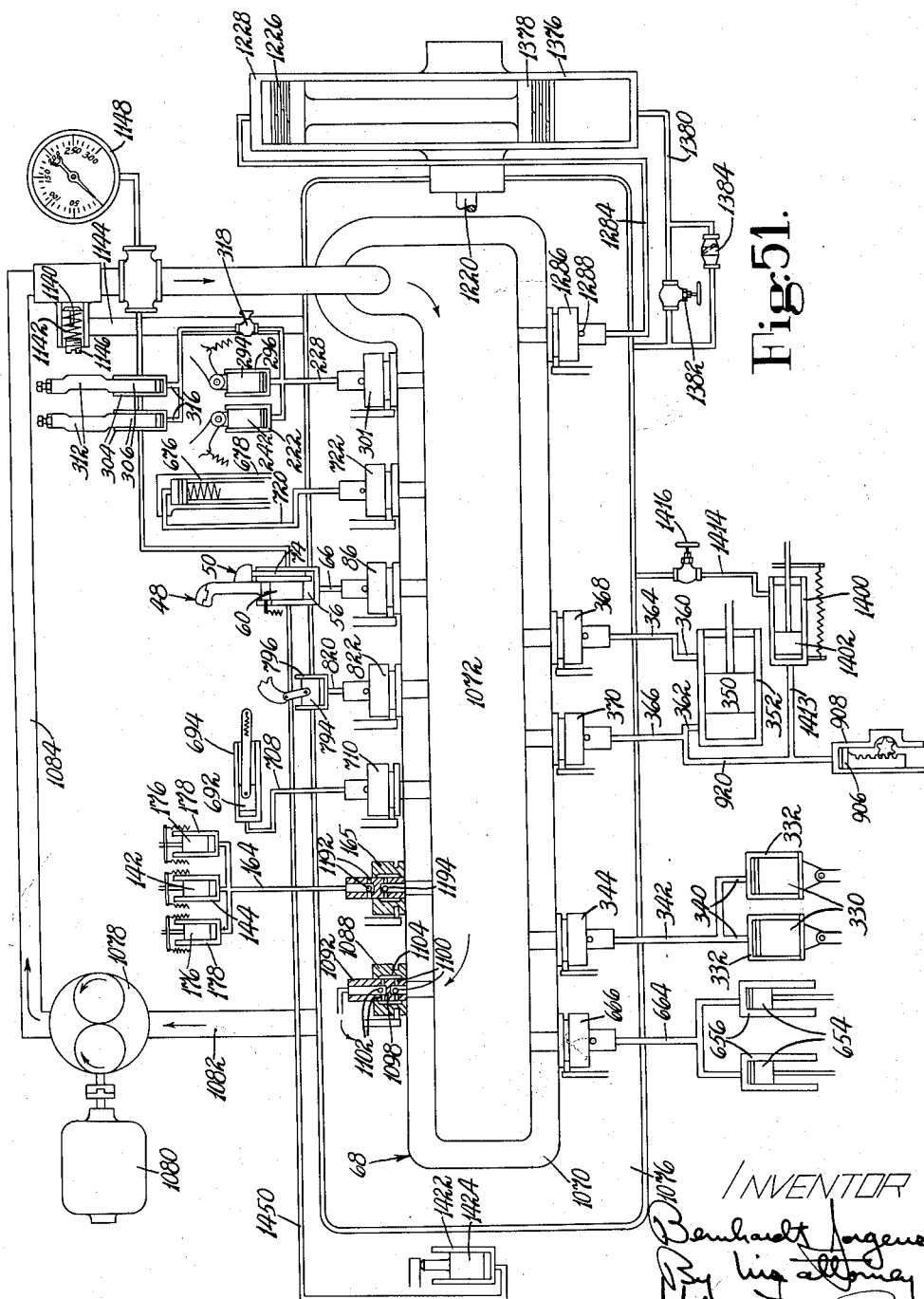
Figure 52:
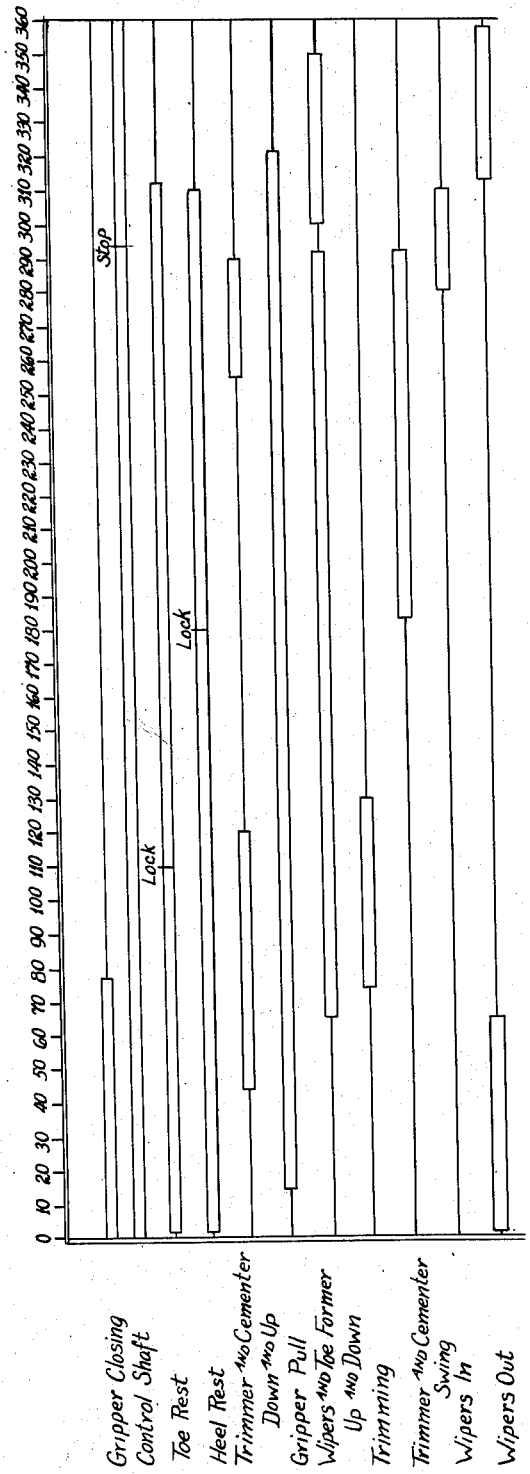

Figs. 41 to 47, inclusive, are sectional views illustrating the relation of the shoe to the parts which operate thereon at different times in the course of the operation of the machine;

Fig. 48 is mainly a plan view showing certain parts in the positions which they occupy at the same stage of the cycle as in Fig. 42;

Fig. 49 is a sectional view showing certain parts at approximately the same stage of the cycle as in Fig. 42;

Fig. 50 is a view partly in plan and partly in section showing certain parts at the same stage of the cycle as in Fig. 45;

Fig. 51 is a view showing diagrammatically the assemblage of fluid-operated mechanisms and illustrating also diagrammatically their relation to the source of operating fluid and to the means for admitting fluid thereto and releasing it therefrom; and Fig. 52 is a chart illustrating the timing of the various operations performed in the cycle of operations of the machine.

Figure 1:
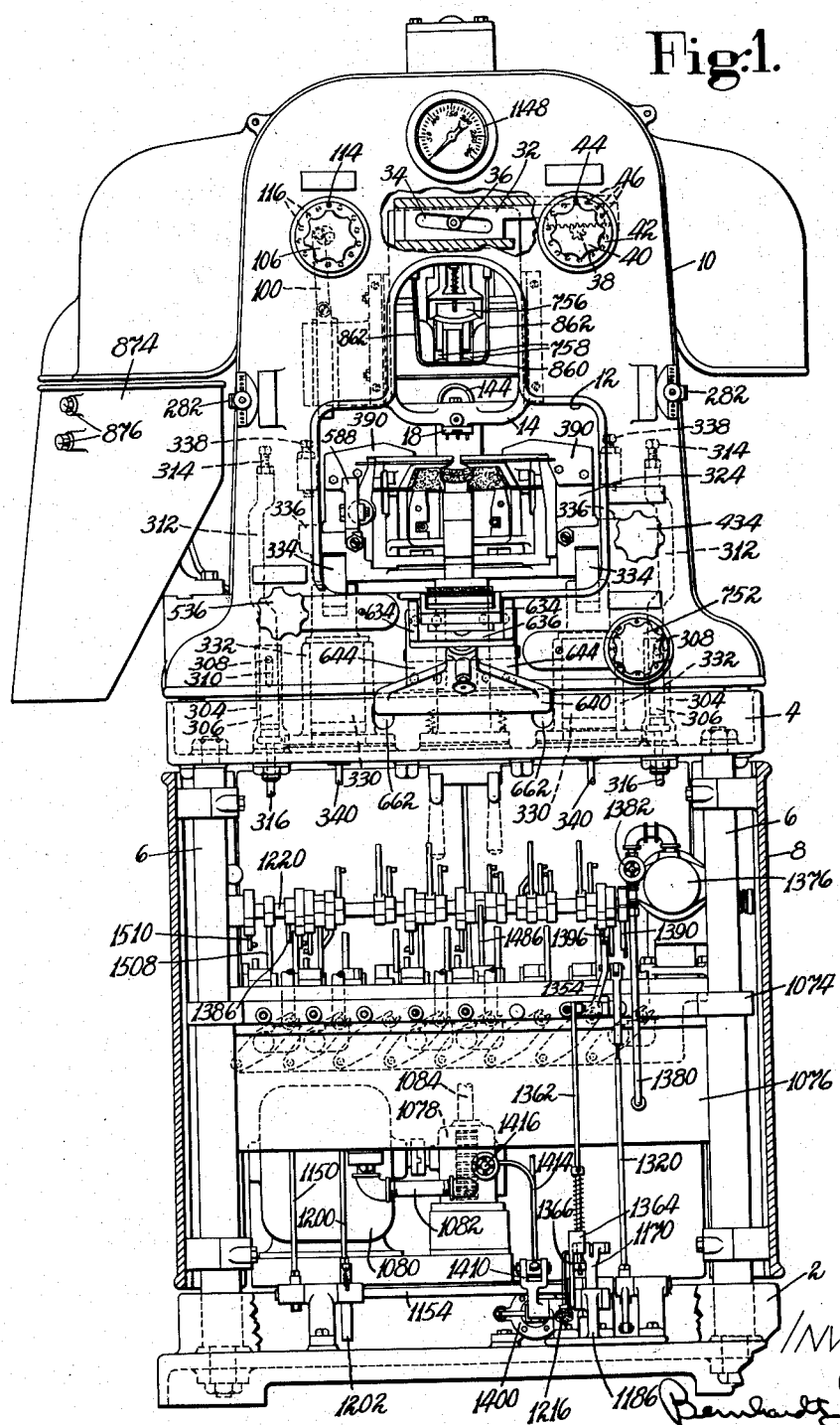
Fig. 1 is a view in front elevation of a machine in which the invention is embodied, with parts broken away.
Figure 12:
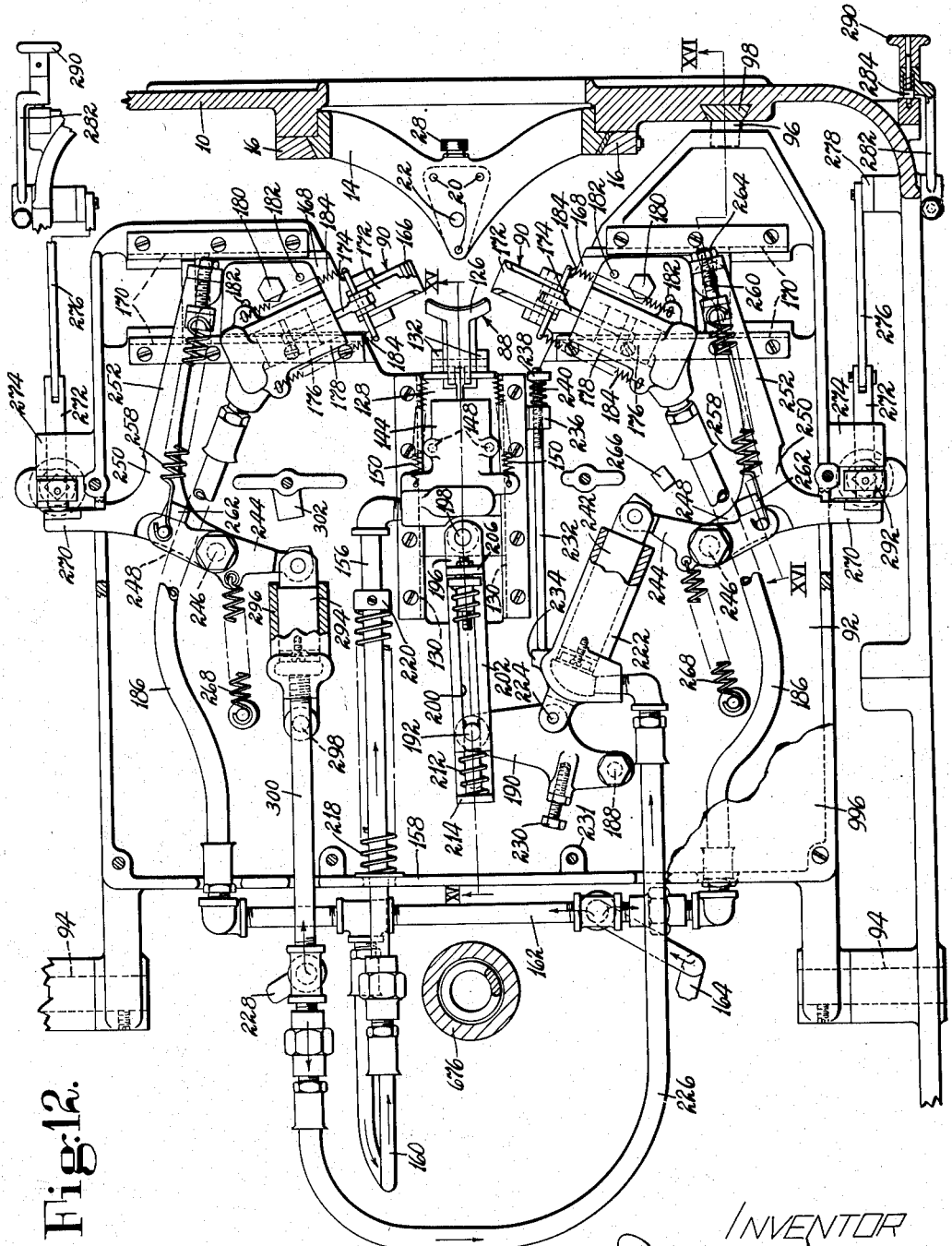
Fig. 12 is mainly a plan view of the upper-gripping and pulling means.

The machine is provided (Figs. 1 and 2) with a base 2 and an intermediate frame casting 4 supported on the base by a plurality of posts 6. Between the base and the casting 4 is a lower frame 8, and above the casting 4 is an upper frame 10 in the front of which is an opening 12 to afford access to portions of the machine which operate directly on the shoe. Vertically adjustable along guideways on the frame 10 adjacent to the opening 12 is a slide 14 of skeleton form which supports means for determining the position of the shoe in the machine, the slide being held on its guideways by gibs 16 (Fig. 12). The shoe-positioning means on the slide 14, in the construction herein shown, comprises a plate 18 (Fig. 41) which by engagement with the forepart of the insole determines the position of the shoe heightwise, the position of the shoe in other respects being determined in known manner by three pins 20 which extend through holes in the insole into holes provided in metal bushings located in the bottom portion of the last in predetermined relation to the contour of the last. Enlarged portions of the pins 20 are fast in the plate 18 and are arranged to extend upwardly into corresponding holes provided in the slide 14 to determine the relation of the pins to the slide. The plate 18 has also fast thereon a stud 22 arranged to extend upwardly into an opening in the slide 14 and provided with a transverse bore 24 to receive the inner end of a pin 26 horizontally movable in the slide. By means of a knob 28 on its outer end this pin may be moved lengthwise against the resistance of a spring 30 to withdraw it from the bore in the stud 22 and thus to release the plate 18 and permit its removal from the slide 14.

The slide 14 is adjustable vertically to vary the position of the shoe heightwise by means of a horizontal bar 32 (Figs. 1 and 2) which is movable in a guideway in the frame 10 and is provided with an inclined slot 34 the walls of which are in engagement with a roll 36 carried by the slide 14. Formed on the bar 32 are rack teeth engaged by a pinion 38 which may be rotated by a hand wheel 40 connected thereto and located at the front of the frame 10. Fast on this hand wheel is a disk 42 provided with a pin 44 arranged to enter any one of a series of holes 46 formed in a plate on the frame 10 to hold the bar 32 in adjusted position. The pin 44 may be withdrawn from any hole 46 by forward movement of the hand wheel and disk in a manner which will be readily understood by reference to Fig. 16 which shows similar adjusting means provided for a different purpose and hereinafter described in detail. It is to be understood that while the construction herein shown comprises the pins 20 arranged to extend into holes in the last to position the shoe, the successful operation of the machine is not dependent upon the use of shoe-positioning means of this particular character.

The shoe is clamped against the plate 18 and is supported against downward movement by a toe rest 48 and an instep support 50 (Figs. 21 and 42). The toe rest comprises a rubber pad 52 arranged to engage the top of the toe end of the upper and a metal holder 54 for the pad, this holder having a lower end portion formed to fit in a cylinder 56 fast on the intermediate frame casting 4. A depending portion 58 of the holder 54 extends into a bore in a piston 60 movable in the cylinder 56 and is connected rigidly to the piston by a cross pin 62 which extends into slots 64 formed in opposite sides of the cylinder. The toe rest 48 and the piston 60 are thus movable as a unit between limits determined by the pin 62 and the slots 64, the means for thus limiting upward movement of the parts being effective in case there is no shoe in the machine. Upward movement of the toe rest into clamping position results from the admission of fluid to the cylinder 56 through a pipe line 66 which leads from a source of supply 68 (Fig. 51) of fluid under pressure the character of which is hereinafter described in detail. Such movement of the toe rest is effected against the resistance of a pair of springs 70, one of which is shown in Fig. 21, connected to the ends of the pin 62 and to the base of the cylinder 56. It will be understood that these springs serve, when permitted, to return the toe rest to its initial position.

The instep support 50 also is operated by fluid from the pipe line 66. It comprises a block 72 which engages the instep portion of the upper or the last, the block being preferably made of wood to provide a positive support without danger of injuring the upper by contact therewith and being mounted on the upper end of a rod 74 which serves as a piston vertically movable in a cylinder 76 communicating through a passage 78 with the cylinder 56. The block 72 has a concave rear face which substantially fits a convex front face of the holder 54 to prevent the block from turning. A pin 80 extends from the holder 54 into a slot 82 in the block 72 to serve by engagement with a plate 84 pinned to the piston 74 to prevent any accidental movement of the piston entirely out of the cylinder 76. The piston 74 is of much smaller diameter than the piston 60, and accordingly the instep support is forced against the shoe or last with less pressure than the toe rest to avoid any tipping of the shoe by the action of the instep support thereon. Fluid is admitted to the pipe line 66 by valve 86 (Fig. 51) controlled by mechanism shown in Fig. 33 and hereinafter described in detail. It may be stated at this point, however, that this valve is operated to trap or lock the fluid in the cylinders 56 and 76, so that the toe rest and the instep support are maintained in a substantially positive manner in their clamping and supporting positions. The instep support, when permitted, is returned to its initial position by a pair of springs 87 (Figs. 18 and 21) at opposite sides of the cylinder 76. The plate 84 serves by engagement with the upper end of the cylinder 76 to limit the downward movement of the instep support.

For applying a pull to the toe-end portion of the upper the machine is provided with a toe-end gripper 88 (Fig. 12) arranged to grip the margin of the upper around the end of the toe and with two side grippers 90 arranged to grip the opposite side margins of the upper in locations at or near what may be termed the corners of the toe. These three grippers are mounted on a gripper support 92 comprising a substantially horizontal plate which by means of studs 94 is pivotally mounted at its rear end on the frame 10 for swinging movements heightwise of the shoe. The support 92 at its front end rests normally on a lug 96 formed on a slide 98 (Figs. 2 and 16) vertically adjustable in a guideway in the frame to vary the initial positions of the grippers heightwise of the shoe. The slide 98 is connected by a link 100 to a crank pin 102 on a shaft 104 mounted in a bearing in the frame and rotatable by means of a hand wheel 106. This hand wheel is fastened by a set screw 108 to the hub of a disk 110 which is provided with a stud 112 extending into a slot in the shaft 104, and the disk carries a pin 114 arranged to enter any one of a series of holes 116 formed in a plate 118 which is fast on the frame. By this means the slide 98 is maintained in adjusted position. When it is desired to adjust the slide the disk 110 is moved forwardly by a pull on the hand wheel 106 to withdraw the pin 114 from the hole 116 in which it lies, such forward movement of the disk being effected against the resistance of a spring 120 lying between a shoulder on the hub of the disk and the head of a screw 122 threaded in the end of the shaft 104.

The toe-end gripper 88 comprises a pair of jaws 124 and 126 (Fig. 15) so arranged as to present a substantially horizontal opening between them to receive the outturned or outwardly flaring margin of the upper when the shoe is presented to the machine. The lower jaw 124 is fast on a slide 128 which is movable in directions lengthwise of the shoe along guideways 130 (Fig. 12) on the support 92. More particularly, the rear portion of the jaw lies between ears 132 formed on the slide 128 and interlocks at 134 with the slide, the jaw being held in place by a pin 136 on which the upper jaw 126 is mounted for swinging movements toward and from the lower jaw. A lever arm 138 on the jaw 126 is connected by a link 140 to a piston 142 movable in a cylinder 144 a portion of which lies in a recess 146 in the slide 128, the cylinder being secured to the slide by screws 148. The jaw 126 is held initially in the position illustrated in Fig. 15 by two springs 150 connected at their rear ends to the cylinder 144 and at their front ends to a pin 152 which serves as a connection between the arm 138 and the link 140, this position of the jaw 126 being determined by engagement of a lug 154 on the arm 138 with a shoulder on the rear portion of the jaw member 124. When the jaws are thus open in upper-receiving relation the piston 142 is near the inner end of the cylinder 144. The piston is operated to effect the gripping of the upper by fluid admitted to the cylinder 144 from a pipe 156 which extends rearwardly through an opening in an upstanding flange 158 of the support 92 and is connected by a flexible tube 160 to a cross pipe 162 at the rear of this flange. This cross pipe receives operating fluid from a pipe line 164 to which fluid is admitted in a manner hereinafter described by a valve 165 (Fig. 51).

Each of the side grippers 90 is similar to the toe-end gripper 88 except that the inner ends of the gripper jaws are straight lengthwise of the edge of the upper instead of being curved as are those of the toe-end gripper. Each side gripper comprises a pair of jaws arranged to present initially between them a substantially horizontal upper-receiving opening like the jaws of the toe-end gripper, the lower jaw 166 of each pair, a portion of one of which is shown in Fig. 12, being secured in the same manner as the lower jaw of the toe-end gripper to a slide 168 movable along guideways 170 on the support 92. Mounted for swinging movement toward and from each lower jaw 166 is an upper jaw 172 connected by a link 174 to a piston 176 operating in a cylinder 178 which by means of a screw 180 and dowel pins 182 is connected rigidly to the slide 168. The upper jaw 172 is held initially in open position by springs 184 acting in the same manner as the springs 150 associated with the toe-end gripper, and closing movement of the jaw is effected by fluid admitted to the cylinder 178 through a flexible tube 186 connected to the cross pipe 162. It will, therefore, be evident that fluid from the pipe line 164 acts simultaneously on all the grippers to close them on the margin of the upper. The manner in which the valve 165 is controlled to admit fluid to the pipe line 164 and to release it therefrom will be hereinafter described in detail. As hereinbefore suggested, however, such admission of fluid to effect the closing of the grippers is under direct control of the operator prior to the starting of what may be regarded as the cycle of operations of the machine, and the operator may, if desired, cause the grippers to open and again to close on the margin of the upper if the upper was not properly presented initially.

The pulling of the upper by the several grippers is effected by movements of the slides 128 and 168 outwardly along their guideways on the support 92 in directions substantially parallel to the bottom of the forepart of the last, the directions of movement of the side grippers 90 widthwise of the last being substantially at right angles to the direction of movement of the toe-end gripper lengthwise of the last. For imparting such upper-pulling movement to the toe-end gripper there is pivotally mounted on a stud 188 on the support 92 a lever 190 which carries a stud 192 extending upwardly through a guide slot 194 (Fig. 15) formed in a link 196 pivotally connected at its front end by a stud 198 to the slide 128. The stud 192 also extends upwardly through a slot 200 formed in a slide 202 which rests on the link 196 and is guided for lengthwise movements by a stud 204 which is mounted in the link and the head of which lies in the slot 200. The stud 192 has at its upper end an enlarged head which lies in grooves in the slide 202 to hold the slide down on the link 196. At its front end the slide 202 is provided with an upstanding flange 206 in which is mounted a rod 208 having a nut 210 threaded thereon. This nut serves as an abutment for the front end of a spring 212 the rear end of which abuts against an upstanding flange 214 on the link 196, this flange being provided with a pin 216 which extends within the spring to assist in controlling the spring. It will thus be seen that the lever 190, by swinging movement in a counterclockwise direction (Fig. 12), acts through the slide 202, the spring 212 and the link 196 to move the slide 128 along its guideway and thus to impart upper-pulling movement to the toe-end gripper, the spring 212 being yieldable to permit movement of the slide 202 relatively to the link 196 in response to resistance of the upper to the force of the pull applied thereto. The force thus applied to the upper may be varied by adjusting the nut 210 along the rod 208 to vary the compression of the spring 212. During such upper-pulling movement of the toe-end gripper the pipe 156 through which the fluid is admitted to the cylinder 144 to close the gripper moves lengthwise with the cylinder, and to return the gripper eventually to its starting position there is mounted on the pipe 156 a spring 218 which abuts at its rear end against a washer engaging the flange 158 of the support 92 and at its front end against a collar 220 fast on the pipe.

Operative movement of the lever 190 as above described is effected by bodily movement of a cylinder 222 which is pivotally connected at 224 to the lever and into which fluid is admitted from a flexible tube 226 communicating with a pipe line 228 leading from the source of fluid supply. A screw 230 threaded in the lever 190 is arranged to engage a boss 231 on the flange 158 to limit movement of the lever if there is no shoe in the machine. Return movement of the lever and of the toe-end gripper, effected as above described by the spring 218, is limited by engagement of a rod 232 with a lug 234 on the cylinder 222, this rod being threaded for purposes of adjustment in a lug 236 on the support 92. The rod has a nut 238 thereon, and between this nut and the lug 236 is a compression spring 240 which acts frictionally to prevent accidental turning of the rod. It will be evident that adjustment of the rod 232 serves to vary the initial position of the toe-end gripper lengthwise of the shoe.

The fluid admitted to the cylinder 222 also acts to impart upper-pulling movement to the left-hand side gripper 90. For this purpose there is movably mounted in the cylinder a piston 242 pivotally connected to one end of a lever 244 which is pivotally mounted between its opposite ends on a stud 246 on the support 92. Also pivotally mounted on this stud is one arm 248 of a three-armed lever 250 which has a second arm 252 extending forwardly and provided at its front end with a pin 254 (Fig. 16) extending into a transverse slot 256 in the slide 168. The left-hand end of the lever 244 is connected by a spring 258 to a hook 260 mounted on an upturned front end of the arm 252, and this spring acts to hold the left-hand end of the lever 244 normally in engagement with a lug 262 on the three-armed lever 250. Accordingly, outward movement of the piston 242 in the cylinder 222 serves to swing the lever 244 and the three-armed lever 250 as a unit about the stud 246 and thereby to operate the slide 168 to impart upper-pulling movement to the left-hand side gripper. It will be understood that the spring 258 is yieldable in response to resistance of the upper to the force of the pull applied thereto to permit the lever 244 to swing relatively to the three-armed lever 250, and that the force of the pull applied to the upper may be varied by adjusting the tension of the spring 258, this being done by turning a nut 264 threaded on the hook 260. A lug 266 on the support 92 serves as a stop to limit movement of the piston 242.

The left-hand side gripper is returned to its initial position, when permitted, by a spring 268 connected to the lever 244 and the support 92. This position of the gripper is determined by engagement of a third arm 270 of the three-armed lever 250 with one end of a rod 272 adjustably movable lengthwise in a lug 274 on the support 92. This rod is connected by a link 276 to a crank arm 278 fast on a shaft 280 (Fig. 17) in the frame 10, and also fast on this shaft is a lever 282 by which the shaft is turned by the operator to adjust the stop rod 272 and thus to vary the initial position of the left-hand side gripper. A spring-pressed pin 284 in the lever 282 is arranged to enter any one of a plurality of holes 286 in a segment 288 on the frame to hold the lever in adjusted position, the pin being movable forwardly out of any hole in which it is mounted by pulling on a knob 290 fast thereon. A collar 292 fast on the stop rod 272 is arranged to engage the lug 274 to limit adjustment of the gripper in an inward direction.

The mechanism for imparting upper-pulling movement to the right-hand side gripper 90 and for adjusting the gripper is of substantially the same construction and operates in the same manner as that above described as associated with the left-hand side gripper, and corresponding parts are identified by the same reference characters. The lever 244 through which the right-hand gripper is operated is pivotally connected to a piston 294 movably mounted in a cylinder 296 which is pivoted on a stud 298 on the support 92. Fluid is admitted to this cylinder through a pipe 300 communicating with the pipe line 228. Accordingly, by fluid received from this pipe line all the grippers are operated simultaneously to pull the upper, the fluid being admitted to this pipe line by a valve 301 (Fig. 51). Movement of the piston 294 is limited by engagement with a lug 302 on the support 92.

Under some conditions it may be desirable to impart to the grippers upper-pulling movements heightwise of the last as well as movements in directions transverse to the height of the last as above described. Accordingly, there are provided two cylinders 304 (Figs. 1 and 2) secured in upright positions on the intermediate frame casting 4 and each having therein a piston 306 movements of which are limited by a pin 308 mounted in the cylinder and extending through a slot 310 in the piston. Integral with each piston is an upwardly extending bar 312 provided at its upper end with a screw 314 the head of which is arranged to engage the lower face of the corresponding lug 274 on the gripper support 92 when the piston has been moved upwardly a certain distance depending on the adjustment of the screw. Further upward movements of the two pistons thereafter serve to impart upward swinging movement to the support 92 about the axis of the studs 94 to cause the grippers to pull the upper heightwise of the last. Fluid is supplied to the cylinders 304 through pipes 316 which, as illustrated in Fig. 51, are arranged to communicate with the same pipe line 228 through which fluid is supplied to the cylinders 222 and 296 to cause the grippers to pull the upper in outward directions. In case it is not desired to impart upper-pulling movements heightwise of the last to the grippers, communication between the pipes 316 and the pipe line 228 may be shut off by means of a hand valve 318, as also illustrated in Fig. 51. When this valve is closed the pistons 306 remain idle. When used, they are returned by gravity to their lowest positions upon escape of the fluid from the cylinders 304 simultaneously with its escape from the cylinders 222 and 296.

For wiping the upper about the toe end of the last heightwise of the last and for clamping it in its upward position the machine is provided with a toe former 320 (Figs. 18 and 21) constructed and controlled as hereinafter described, and for wiping the margin of the toe end of the upper inwardly over the insole there are further provided toe-embracing wipers 322. The toe former and the wipers are supported by what may be termed a toe head 324 comprising a casting pivotally supported on the front ends of upper and lower pairs of parallel links 326 and 328 which are spaced apart heightwise of the shoe (Fig. 2) and the rear ends of which are pivotally supported on the frame 10. Accordingly, the toe head 324 may be moved upwardly and downwardly while maintaining a substantially horizontal position. It is moved upwardly to cause the toe former to wipe the upper heightwise of the last by means of two pistons 330 (Figs. 1 and 2) vertically movable in cylinders 332 fast on the intermediate frame casting 4. The two pistons are connected to the toe head by links 334. The upward movement of the toe head is adjustably limited by the engagement of shoulders 336 thereon with stop screws 338 threaded in lugs on the frame 10. Fluid is admitted to the cylinders 332 to raise the toe head through pipes 340 (Fig. 1) which, as illustrated diagrammatically in Fig. 51, communicate with a common pipe line 342 to which fluid is admitted and from which it is released under control of a valve 344.

Figure 25:
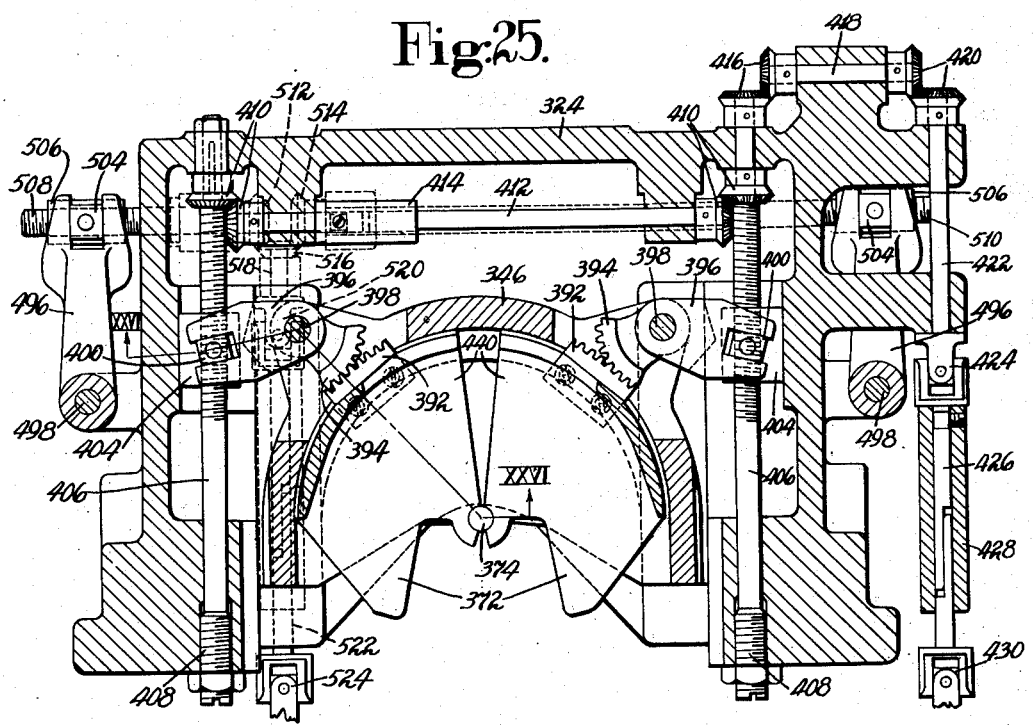
Fig. 25 is a section on the line XXV—XXV of Fig. 21.

Movable in directions lengthwise of the shoe along guideways on the toe head 324 is a wiper carrier 346 (Figs. 18, 21 and 25) connected directly by a piston rod 348 to a piston 350 movable in a cylinder 352 fast on the rear end of the toe head. The position of the cylinder is such that it is opposite the toe end of the shoe with its axis extending lengthwise of the shoe when the wipers wipe the margin of the upper inwardly. A plate 354 serves as a closure for one end of the cylinder, and fastened to this plate is another plate 356 which serves within the cylinder as a holder for packing 358. Fluid is admitted to the front and rear ends of the cylinder, respectively, through flexible tubes 360 and 362 (Figs. 2 and 21). As illustrated diagrammatically in Fig. 51, these tubes communicate respectively with pipe lines 364 and 366 leading to the source of fluid supply. Admission of fluid to the pipe line 364 and exhaust of fluid therefrom is controlled by a valve 368, and similarly admission and exhaust of fluid to and from the pipe line 366 is controlled by a valve 370. It will thus be seen that when fluid is admitted to the rear end of the cylinder 352 the wipers are advanced lengthwise of the shoe and that when it is admitted to the front end of the cylinder they are bodily retracted.

Supported on the wiper carrier 346 are two wiper holders 372 which near their front ends partially embrace a pin 374 fast in the wiper carrier. The wiper holders swing laterally of the shoe about this pin and are further guided in their swinging movements by curved faces 376 formed on the wiper carrier concentric with the axis of the pin. The wipers 322 fit in recesses formed in the tops of the wiper holders 372 under cover plates 378 which are secured to the wiper holders by screws 380. They are held detachably in place by latches 382 (Fig. 19) which are pivotally mounted on the wiper holders 372 and the inner ends of which are arranged to enter holes 384 in the wipers. By lifting the front ends of the latches 382 they may be swung against the resistance of springs 386 to release the wipers and permit their removal from the wiper holders, so that differently shaped wipers may be substituted when desired. The wipers 322 are provided with a plurality of curved fingers 388 (Fig. 18) which interlock to prevent any V-shaped opening between the wipers when they are in their closed positions. Overlapping the front ends of the plates 378 are brackets 390 which are fast on the toe head 324 and serve to support the wipers and the wiper holders against upward pressure of the shoe on the wipers.

Figure 26:
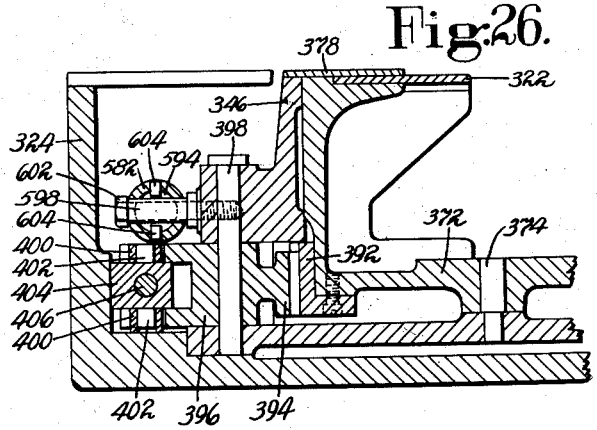
Fig. 26 is a section on the line XXVI—XXVI of Fig. 25, showing also parts which lie above those shown in Fig. 25.

Closing movements of the wipers laterally of the shoe about the axis of the pin 374 are effected in response to the forward movement of the wiper carrier 346 lengthwise of the shoe. For this purpose each wiper holder 372 has fast thereon a gear sector 392 (Figs. 25 and 26) which extends outwardly into a recess in the wiper carrier 346 and engages a gear sector 394 formed on one arm of a lever 396 mounted to swing about a pin 398 on the wiper carrier. The other arm of each lever 396 is bifurcated and engages trunnion blocks 400 mounted to turn about studs 402 extending upwardly and downwardly from a block 404 threaded on a shaft 406. The blocks 404 engage flat faces on the toe head 324 to prevent them from turning. The two shafts 406 are mounted in bearings in the toe head and are held against lengthwise forward movements by thrust members 408 threaded in the toe head. It w'll thus be seen that in response to forward movement of the wiper carrier 346 the levers 396 are swung about the pins 398 by reason of their connections with the blocks 404 to impart closing movements to the wiper holders 372 and the wipers, and that by the same means the wipers are opened in response to reverse movement of the wiper carrier. Each of the shafts 406 is connected by bevel gears 410 to a cross shaft 412 mounted in bearings in the toe head 324, the bevel gears which are on the shafts 406 abutting against the toe head to prevent rearward movement of these shafts. For convenience of assembly, the cross shaft 412 is made in two parts which interlock by the overlapping engagement of semi-circular end portions of the parts with each other within a sleeve 414 fast on one of the parts. The right-hand shaft 406 is connected at its rear end by bevel gears 416 to a shaft 418 in the toe head, and this shaft is connected by bevel gears 420 to a shaft 422 also rotatable in the toe head. The shaft 422 is connected by a universal joint 424 to a forwardly extending shaft 426 which, like the cross shaft 412, comprises two parts interlocking within a sleeve 428 fast on one of the parts, and the shaft 426 is connected at its front end by a universal joint 430 to a shaft 432 (Fig. 18) which is rotatable in the frame 10 and may be turned by a hand wheel 434. Accordingly, the wipers may be adjusted toward or from each other for shoes of different sizes by turning the hand wheel 434, the threads on the two shafts 406 being respectively right and left threads. It will be understood that the interlocking relation of the two parts of the shaft 426 and the universal joints 424 and 430 permit the upward and downward movements of the toe head 324.

The toe former 320 (Figs. 21 and 22) comprises a flexible band 436 of leather or other suitable material which flares outwardly in a downward direction, so that only its upper edge portion engages the shoe. The intermediate portion of the band is mounted in an inclined slot formed in a band-supporting block 438 which rests on horizontal supporting faces 440 provided on the wiper holders 372, the block being held down on these faces and being guided for movements lengthwise of the shoe by a reduced portion 442 of the piston rod 348 extending forwardly into a bore 444 in the block. A plate 446 fast on the block 438 holds the band 436 in place by engagement with a thin resilient metal plate 448 which is fastened to the band and extends along its outer face. This plate is formed near the ends of the band to provide loops 450 into which extend the upper ends of pins 452 mounted in blocks 454 which also rest on the supporting faces 440 of the wiper holders 372. As illustrated in Fig. 24, the upper ends of the pins 452 are inclined similarly to the inclination of the band-receiving slot in the middle block 438. The pins 452 are held against upward or downward movements in the blocks 454 by set screws 456 extending into annular slots in the pins. The two blocks 454 are held down on the supporting faces of the wiper holders 372 by a plate 458 which, as shown in Fig. 21, is fastened in a slot in the central block 438, this plate extending over horizontal flanges 460 of the blocks 454, as illustrated in Figs. 22 and 23. It will be understood that this construction permits relative movements of the central block 438 and the other blocks 454 along the supporting faces of the wiper holders 372.

The pins 452 are connected to rearwardly extending links 462 the front end portions of which are tubular and extend into bores provided in the blocks 454, as illustrated in Fig. 23. The tubular portion of each link is provided with a vertical slot 464 through which the pin 452 extends. A spring 466 in each link bears against the rear side of the pin 452 and thus tends to move the block 454 forward relatively to the link, such forward movement of the block being limited by engagement of the pin 452 with a screw 468 threaded in the end of the link. At their rear ends the two links 462 are connected (Fig. 18) to the lower bifurcated ends of arms 470 which are integral at their upper ends with a sleeve 472 held by a set screw 474 in fixed relation to a shaft 476 mounted to rock in bearings in the toe head 324. One of the arms 470 is shown in full in Fig. 21. Another depending arm 478 (Fig. 18) on the sleeve 472 is connected to the rear end of a spring 480 the front end of which is connected to a hook 482 adjustably mounted in the toe head 324. It will thus be seen that the spring 480 tends to turn the sleeve 472 and the shaft 476 in the direction to impart forward movement to the links 462 and the entire toe former 320. To limit such movement there is integral with the sleeve 472 a rearwardly extending arm 484 in which is threaded a screw 486 arranged to engage a shoulder 488 on the toe head 324. It will be evident that by adjustment of the screw 486 the position of the toe former lengthwise of the shoe may be varied. When the toe former is moved upwardly by the toe head 324 to wipe the upper heightwise of the last it is yieldable bodily lengthwise of the shoe in response to pressure of the shoe thereon against the resistance of the springs 466 in the links 462, the pins 452 moving along the slots 464 in the links. These slots are of such lengths and the spring 480 is of such strength that this spring does not yield in the upwiping operation.

The pins 452 in the blocks 454 are further connected by links 490 extending laterally of the machine to the heads 492 (Fig. 18) of rods 494 which are slidingly movable in the front ends of levers 496. These levers are downwardly and rearwardly inclined (Fig. 2) and are pivotally mounted substantially midway between their front and rear ends on pins 498 held in lugs on the sides of the toe head 324. Between the heads 492 and the inner end of sockets formed in the levers 496 are springs 500 against the resistance of which the blocks 454 and the opposite side portions of the toe band 436 may be spread apart by the wedging action of the shoe thereon in the upwiping operation. Nuts 502 threaded on the ends of the rods 494 determine the normal positions of the blocks 454 relatively to the levers 496. The bifurcated rear ends of the levers 496 are connected by trunnion blocks 504 to block 506 which are threaded respectively on the outer ends of shafts 508 and 510 mounted in bearings in the toe head 324. Mounted respectively on the inner ends of these two shafts are bevel gears 512 and 514, shown in dotted lines in Fig. 25, both of which are engaged by a bevel gear 516 mounted on a short shaft 518 in the toe head. The shaft 518 is connected by a universal joint 520 to a shaft 522 comprising two interlocking parts, like the parts of the shaft 426, one of which is connected by a universal joint 524 to a shaft 526 (Fig. 18) mounted in the frame 10. Fast on this shaft is a sprocket wheel 528 connected by a chain 530 to another sprocket wheel 532 fast on a shaft 534 on which is a hand wheel 536. Accordingly, by turning this hand wheel the front end portions of the toe former 320 may be adjusted toward or from each other by swinging movements of the levers 496. The shaft 534 is rotatable in an eccentric bushing 538 in the frame 10, which may be turned to take up any slack in the chain 530, the bushing being locked in adjusted position by engagement of a flange thereon with the shank portion of one of two screws 540 which hold a cover 542 in place over the chain, as illustrated in Figs. 18 and 20.

In operating on some kinds of shoes it may be desirable not to use the toe former 320 to wipe the upper heightwise of the last, but to use it only as upper-clamping and holding means after the upper, held under tension by the grippers, has been deflected toward the last by the upward movement of the toe wipers 322 the edges of which, as shown in Fig. 18, are normally positioned farther outward from the last than the edge of the toe band 436. With this object in view, the machine is provided with means whereby the toe former may be maintained in a rearwardly retracted idle position substantially until the end of the upward movement of the toe head 324 and then released to permit it to be moved forwardly and applied in clamping relation to the upper. This means includes a latch 544 (Fig. 21) having a shoulder 546 arranged under certain conditions to hold the rear end of the previously mentioned arm 484 uplifted against the resistance of the spring 480 (Fig. 18), so that through the arms 470 and the links 462 the toe former is held far enough rearwardly to prevent any effective wiping action thereof on the upper. The latch 544 is part of a bell-crank lever 548 which is mounted to swing about a stud 550 threaded in a lug 552 (Fig. 18) on the cylinder 352 and has a rearwardly extending arm 554. A torsion spring 556 on the stud 550 tends to swing the bell-crank lever 548 in a counterclockwise direction (Fig. 21). The bell-crank lever may be swung in the opposite direction by a leaf spring 558 in engagement with the rear face of the latch arm 544, this spring being fastened to the hub of a depending arm 560 which is secured by a set screw 562 to a shaft 564 mounted to turn in a fixed sleeve 566 on which one of the previously mentioned links 326 is supported. The shaft 564 may be turned by a crank arm 568 (Figs. 2 and 18) fast on its outer end, this crank arm having thereon a knob 570 for manipulating it and having also an inwardly extending pin 572 the inner end of which is arranged to enter either one of two holes provided in a boss on the frame 10, one of these holes being shown at 574 in Fig. 2. Pins 575 serve to limit movements of the crank arm. The crank arm is resilient to permit the pin to be withdrawn from either hole by springing the arm outwardly, so that the shaft 564 may then be turned by the arm. When the parts are in the positions illustrated in Fig. 21 the leaf spring 558 is in such a position that the latch arm 544 is held away from the rear end of the arm 484 by the spring 556, this spring maintaining the latch arm in engagement with the leaf spring 558. Under these conditions the toe former 320 is used to wipe the upper heightwise of the last in each cycle of operations of the machine. If it is desired not to use the toe former for this purpose the operator turns the shaft 564 by the crank arm 568 to the position determined by the other one of the two holes 574 and thereby moves the arm 560 to a position in which its lower end is in vertical alinement with the rear-end portion of the arm 554 of the bell-crank lever 548. The same movement of the shaft 564 causes the leaf spring 558 to bear hard enough against the latch arm 544 to overcome the force of the spring 556 and to move the latch arm into yielding engagement with the rear end of the arm 484. Accordingly, the latch arm is in condition to hold the toe former retracted if the arm 484 is lifted far enough to clear the shoulder 546. Such upward movement of the arm 484 is effected by means which will be presently described. The toe former having thus been latched in its retracted position, represented by broken lines in Fig. 41, it remains in that position as the toe head 324 is moved upwardly. In such upward movement of the toe head the arm 554 of the bell-crank lever 548 approaches the lower end of the arm 560 until, subtsantially at the end of the upward movement, the arm 560 by its engagement with the arm 554 swings the latch arm 544 out of its operative position, so that the spring 480 is permitted to advance the toe former 320 into clamping relation to the upper close to the edge of the shoe bottom. In the return of the parts to starting positions the arm 554 is released by the arm 560 to permit the latch arm 544 again to hold the toe former retracted when the arm 484 receives its upward movement.

The retractive movement of the toe former and the lifting of the arm 484 into position to be latched are effected by the final portion of the rearward movement of the wiper carrier 346 in response to the pressure of fluid admitted to the front end of the cylinder 352. For this purpose the wiper carrier 346 has thereon a screw 576 (Fig. 18) the head of which is arranged to engage an enlarged portion of one of the depending arms 470 on the sleeve 472 to rock this sleeve and the shaft 476 against the resistance of the spring 480. The limit of such rearward movement of the carrier 346 is determined by engagement of a collar 578 on the carrier with a shoulder 580 formed on the front end of a boss on the toe head 324 through which the piston rod 348 extends. It will be evident that the screw 576 must then be retracted from engagement with the arm 470 far enough to permit the forward movement of the toe former when it is released by the latch arm 544. For this purpose spring mechanism is provided for imparting a definite amount of forward movement to the wiper carrier 346 when the front end of the cylinder 352 is opened to exhaust, thus spacing the collar 578 from the shoulder 580 as illustrated in Fig. 18. It will be understood that such movements of the wiper carrier, first to the position determined by the shoulder 580 and then to space the collar 578 from this shoulder as illustrated in Fig. 18, occur in every cycle of the machine, regardless of the position of the mechanism which controls the latch arm 544. The above-mentioned spring mechanism comprises (Figs. 18, 26 and 27) a cylinder 582 which is closed at both ends and the front end of which is mounted on a pin 584 which is formed eccentrically on a stud 586 rotatable in a depending arm 588 (Fig. 1) of one of the previously mentioned brackets 390 on the toe head 324. Mounted in the cylinder 582 are two springs 590 and 592 in engagement respectively with blocks 594 and 596 which are held normally by the springs in contact with a sleeve 598, the blocks having curved recesses to receive portions of the sleeve. The sleeve 598 extends through slots 600 in the cylinder 582, and it is mounted on a stud 602 which is threaded in the wiper carrier 346. Fast in the cylinder 582 are two pins 604 (Fig. 26) which extend inwardly to positions between the two blocks 594 and 596 and by engagement with the blocks determine the normal positions in which the blocks are held by the springs. When the wiper carrier 346 receives the final portion of its rearward movement to the position determined by the shoulder 580, the block 594 is moved rearwardly against the resistance of the spring 590 by the action of the sleeve 598 thereon. When the front end of the cylinder 352 is thereafter opened to exhaust, the spring 590 serves to impart to the wiper carrier the short forward movement required to space the collar 578 from the shoulder 580 as illustrated in Fig. 18, the limit of such movement being determined by engagement of the pins 604 with the block 594. It will be evident that when the wiper carrier is moved forwardly from this position to operate the wipers the spring 592 is compressed, and that when the wiper carrier is retracted this spring expands until the block 596 arrives in the position determined by the pins 604. This spring serves as a buffer to insure that when the wiper carrier is moved forwardly by the spring 590 it will not be moved too far forwardly by its momentum, but will stop in the required position. It will be evident that the initial position of the wipers lengthwise of the shoe is determined by the spring mechanism shown in Fig. 27, and they may be initially adjusted lengthwise of the shoe by turning the stud 586 to cause the eccentrically mounted pin 584 to adjust the cylinder 582 forwardly or rearwardly. For this purpose the stud is provided with a head 606 to be engaged by a wrench.

In order to insure that at the end of the upward movement of the toe head 324, the limit of which movement is determined adjustably as hereinbefore explained by the stop screws 338, the several grippers mounted on the gripper support 92 will be positioned high enough to clear the wipers 322, the toe head is provided, in lugs on the opposite sides thereof, with screws 608, one of which is shown in Fig. 2, arranged to engage the support 92 and to swing it a short distance upwardly before the movement of the toe head is stopped by the screws 338. Accordingly, the grippers will be clear of the wipers, although close thereto as illustrated in Fig. 42. It will be evident that such upward movement of the support 92 results in a pulling of the upper heightwise of the last by the grippers, but this movement is shorter than that effected by the fluid-operated bars 312 when they are used. When the pulling of the upper is effected by these bars the support 92 may be moved to a position high enough to prevent the screws 608 from engaging it.

As shown in Fig. 21, the toe head 324 has extending downwardly therefrom through an opening in the intermediate frame casting 4 a rod 610, and supported on a collar 612 on the lower end of the rod is a spring 614. In the course of the upward movement of the toe head a washer 616 which rests on the upper end of the spring is carried into engagement with the lower face of the frame casting 4, and during further upward movement of the toe head the spring is compressed. After the wipers have been operated to wipe the margin of the upper inwardly over the insole and while they are in engagement with the overwiped margin, fluid is permitted to exhaust from the cylinders 332 containing the pistons which raise the toe head, thus permitting the compressed spring 614 to force the toe head in a downward direction to cause the wipers to apply increased downward pressure to the margin of the upper. As hereinafter explained in the description of the complete operation of the machine, fluid is thereafter again admitted to the cylinders 332 to relieve the upper of such increased pressure of the wipers before the wipers are retracted from over the shoe bottom. The collar 612 is threaded on the rod 610 for adjustment to vary the amount of compression of the spring 614 resulting from the upward movement of the toe head and, accordingly, to vary the amount of downward pressure applied to the upper by the wipers. The collar is split and has threaded therein a clamping screw 618 to secure it in adjusted position on the rod.

The machine is further provided with a heel rest 620 (Figs. 2, 34, 35 and 42) arranged to engage the heel-end face of the shoe to assist in supporting the shoe against lengthwise forward movement. It comprises two blocks 622 mounted on pins 624 the ends of which are rotatable in bearings in the two arms of a U-shaped member 626 which serves as a holder for the blocks. Fastened to the blocks by screws 628 is a strip of leather 630 arranged to serve as a cover for the blocks and to engage the end face of the shoe. The holder 626 is mounted to swing about pins 632 which are fast in the arms 634 of a yoke member 636. The inner ends of the pins 632 are V-shaped and extend between the two blocks 622 to limit turning movements of these blocks about the axes of the pins 624 and also by engagement with the blocks to limit turning movement of the holder 626 about the pins 632. It will be understood that upon engagement of the heel rest with the shoe the holder 626 may turn about the pins 632 and the blocks 622 may turn about their own axes to conform to the contour of the heel-end face of the shoe heightwise of the shoe. The hub of the yoke member 636 is fast on the reduced front end of a rod 638 mounted in a socket formed in a carrier 640 which is fast on a shaft 642 the ends of which are mounted to turn in bearings in two plates 644 fast on the front of the frame 10. The rod 638 may be adjusted lengthwise in the carrier for shoes of different sizes or shapes, and it is held in adjusted position and also held from turning by a pin 646 the inner end of which is arranged to enter any one of a plurality of holes 648 in the rod. The pin may be withdrawn from any one of the holes against the resistance of a spring 650 by means of a knob 652 fast on the pin. Swinging movement of the carrier 640 about the axis of the shaft 642 to apply the heel rest to the shoe is effected by a pair of pistons 654 which are movable in cylinders 656 secured horizontally to flanges on the lower ends of the previously mentioned cylinders 332 and are connected by rods 658 to a pair of arms 660 formed on the carrier 640 and extending through openings 662 in the frame 10. One of the cylinders 656 is shown in Fig. 34, and both cylinders are shown diagrammatically in Fig. 51. They communicate with a pipe line 664 leading to the source of fluid supply, and the admission and exhaust of fluid to and from this pipe line is controlled by a valve 666. In case there is no shoe in the machine, swinging movement of the carrier 640 is limited by engagement of a shoulder 668 thereon with the frame 10. When the fluid is permitted to exhaust from the cylinders 656, the heel rest and its carrier are returned to their initial positions by gravity, their return movement being limited by engagement of the carrier with the frame, as illustrated in Fig. 34.

After the wiping of the toe end of the upper heightwise of the last and before it is wiped inwardly over the insole by the wipers, the margin of one or more inner layers of the upper materials is removed and cement is applied to the shoe to secure the margin of the outer layer to the insole. For these two purposes the machine is provided with an upper-trimming device 670 (Figs. 2 and 3) and a cement-applying device 672 (Figs. 3 and 9). Both these devices are supported on a carrier 674 clamped on a vertical hollow post 676. This post is guided for vertical movements and for turning movements in a cylinder 678 (Fig. 6) inserted in a tubular portion 680 of the frame 10 and in a bearing 682 (Fig. 2) which also is a part of the frame 10. By the vertical movements of the post the trimming device and thereafter the cement-applying device are moved downwardly each into position to operate on the shoe, and by the swinging of the carrier 674 accompanied by turning movement of the post the different devices are moved into positions where they are over the toe end of the shoe. Initially the carrier 674 is positioned as illustrated in Figs. 2 and 3 with the trimming device 670 over the shoe, this position of the carrier being determined by engagement of a bumper 684 thereon with an abutment 686 on the frame 10. The other position of the carrier, when the cement-applying device is over the shoe, is determined by engagement of a bumper 688 on the carrier with an abutment 690 (Fig. 2) on the frame. Swinging movement of the carrier into the last-mentioned position is effected by a piston 692 movable in a cylinder 694 fast on the frame, the piston being connected by a link 696 to a pin 698 mounted in an arm 700 on the post 676. A key 702 (Fig. 2) in the arm is mounted in a keyway 704 in the post so that the post may be turned by the arm and may move relatively to the arm in vertical directions. The arm is held down on the previously mentioned bearing 682 by a bracket 706 fast on the frame. Fluid is admitted to the cylinder 694 through a pipe line 708 (Fig. 3) communicating with the source of fluid supply as illustrated in Fig. 51, the admission and exhaust of fluid to and from this pipe line being controlled by a valve 710. The link 696 extends beyond the pin 698, as shown in Fig. 3, and connected to the extended portion of the link and to the cylinder 694 is a spring 712 which swings the carrier 674 to its initial position when the fluid is permitted to exhaust from the cylinder.

The upper end of the hollow post 676 is closed by a plug 714 (Fig. 6) threaded therein, and a disk 716 fastened to this plug serves as a holder for packing 718. The upper end portion of the post serves, therefore, as a piston in the cylinder 678, and by fluid admitted to the upper end of the cylinder through a pipe line 720 downward movement is imparted to the post to carry either the trimming device or the cement-applying device into position to operate on the shoe. The pipe line 720 leads to the source of fluid supply, as illustrated in Fig. 51, the admission and exhaust of fluid to and from this pipe line being controlled by a valve 722. The downward movement of the post is effected against the resistance of a spring 724 therein, this spring bearing at its upper end against the plug 714 and at its lower end (Fig. 2) against a ball bearing 726 supported on the upper end of a short rod 728. The spring accordingly acts to return the post to its uppermost position when the cylinder 678 is opened to exhaust, the upward movement of the post being limited by a fibre bumper 730 (Fig. 6) supported on the hub of the carrier 674 and arranged to engage the lower end of the tubular portion 680 of the frame. The downward movement of the post 676 is limited by engagement of its lower end with a head 732 on the rod 728. By such engagement the lowermost position of the trimming device is determined. The head 732 of the rod 728 is provided with a trunnion block 734 mounted in a slot 736 in one arm of a lever 738 pivotally mounted on a pin 740 on a lug extending downwardly from the frame casting 4. An upwardly extending arm 742 of the lever 738 has threaded therein a rod 744 connected by a universal joint 746 to a two-part shaft 748, similar to the previously mentioned shaft 426 (Fig. 25), this shaft being connected at its front end by a universal joint 750 to a shaft (not shown) in the frame 10 which may be turned by a hand wheel 752 through means of the same character as shown in Fig. 18 for connecting the shaft 526 to the hand wheel 536. The hand wheel 752 is held in different adjusted positions by means like that associated with the previously mentioned hand wheel 106 (Fig. 16). It will be understood that by the turning of this hand wheel the lever 738 is adjusted to vary the position vertically of the rod 728 and its head 732 and thereby to vary the position of the trimming device and of the cement-applying device relatively to the shoe. A screw 754 threaded in another arm of the lever 738 is arranged to engage the frame casting 4 to prevent any accidental adjustment of the rod 728 to such a low position that the trimming device might be damaged in operating on a shoe.

Figure 43:
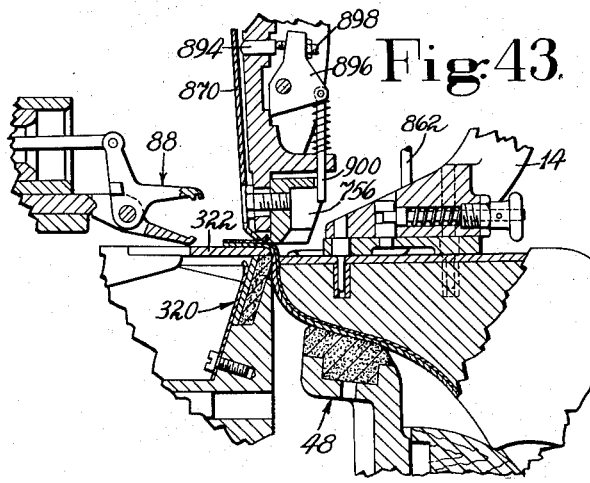

The upper-trimming device 670 comprises a middle knife 756 (Fig. 48) which is curved similarly to the curvature of the edge of the insole around the end of the toe and is movable lengthwise of the shoe toward the toe-end gripper 88, and two side knives 758 movable laterally of the shoe toward the side grippers 90 in paths curved about a vertical axis located opposite the end of the toe. The several knives, in operating on the upper, move in a plane parallel to the top faces of the wipers with their cutting edges spaced from those faces a distance substantially equal to the thickness of the outer layer of the upper materials, so that as the marginal portions of the different layers are outturned over the wipers the knives sever the surplus marginal material of the inner layer or layers while leaving a margin of the outer layer to overlap the insole. As illustrated, the top faces of the wipers (Fig. 42) are positioned at the time of the upper-trimming operation somewhat above the plane of the bottom face of the toe end of the insole, to leave enough of the inner layer or layers to overlap the extreme marginal edge of the insole when the wipers thereafter wipe the outer layer inwardly. It will be understood that the toe end of the upper materials will usually comprise at least three layers, including a lining and a toe box in addition to the outer layer, but for convenience of illustration the drawings show only the lining in addition to the outer layer. As shown in Fig. 48, the shoe is preferably prepared for the operation of the machine by slitting the margin of the upper materials at the sides of the toe forwardly of the side-pulling over tacks, to facilitate turning the margin of its toe-end portion outwardly in parallel relation to the plane of the wipers, and the knives act to sever completely the surplus margin of the inner layer or layers from the rest of the upper materials. The operation of the trimming means is such that the side knives 758 act on the upper prior to the middle knife 756, the grippers maintaining their hold on the upper until these side knives have started their cutting operation, as illustrated in Fig. 49, whereupon the several grippers open and are moved farther outwardly to provide clearance for the knives. After the side knives have completed their operative movements the middle knife 756 acts, as illustrated in Fig. 43, to complete the severing of the surplus material.

Each side knife 758 is secured to a knife holder 760 (Figs. 3, 6 and 8) the upper portion of which is curved and provided with flanges movable along curved guideways 762 in the carrier 674, these guideways being curved, as above suggested, about a vertical axis located opposite the end of the toe of the shoe. The flanges are supported underneath by gibs 763. Each knife 758 is adjustable heightwise of the shoe relatively to its holder 760, and is held in adjusted position by a clamping screw 764 extending through a slot 766 in the holder. A fine adjustment of the knife is facilitated by the provision of a screw 768 which is threaded in a lug on the holder 760 and arranged to bear on the upper edge of the knife. The two holders 760 are connected by links 770 (Fig. 3) to the outer ends of levers 772 which are pivotally mounted at their inner ends on studs 774 on the carrier 674. Studs 776 connecting the links 770 to the holders 760 extend through slots 778 in the carrier 674. The levers 772 are controlled by a slide 780 (Fig. 7) movable lengthwise of the shoe along guideways on the carrier 674 and held on its guideways by a pair of gibs 782 and another pair of gibs 784. Formed on the opposite side edges of this slide are cam faces 786 engaged by rolls 788 mounted on the levers 772. Accordingly, upon rearward movement of the slide 780 (i. e., movement toward the left in Fig. 7) the cam faces 786 act on the rolls 788 to swing the levers 772 outwardly about the studs 774 and thus to impart operative movements to the side knives 758. After these knives have thus been operated the rolls are engaged by parallel side edges 790 of the slide 780 to permit further movement of the slide while the side knives remain stationary. These knives are returned to their initial positions, upon reverse forward movement of the slide 780, by engagement of a crossbar 792 fast on the slide with the rolls 788.

Operative rearward movement is imparted to the slide 780 by a fluid-operated piston 794 mounted in a cylinder 796 which is integral with the carrier 674, the piston being connected by a link 798 to one arm 800 of a three-armed lever 802 mounted to swing about a pin 804 supported in upwardly extending webs of the carrier 674. A second arm 806 of the three-armed lever is connected by a link 808 to a pin 810 mounted in lugs on the slide 780. Accordingly, upward movement of the piston 794 serves to move the slide 780 in a rearward direction, this movement being limited by engagement of a lug 812 on the arm 806 with a face 814 on the cylinder 796. Return movement of the slide 780 is effected by springs 816 connected to a pin on the carrier 674 and to bosses 818, one of which is shown in Fig. 6, integral with the three-armed lever 802. Such return movement of the slide is limited by engagement of the crossbar 792 thereon with the rolls 788, the latter engaging the cam faces 786 on the slide. Fluid is admitted to the cylinder 796 from a pipe line 820 (Figs. 2 and 3) a portion of which is flexible to permit the swinging movements of the carrier 674. Admission and exhaust of fluid to and from this pipe line is controlled by a valve 822 (Fig. 51).

The middle knife 756 is supported on the lower front end of a curved arm 824 which extends rearwardly and is pivotally mounted at its rear end for swinging movements heightwise of the shoe on the pin 810. The knife is adjustable relatively to this arm and is secured in adjusted position by a screw 825 extending through a slot in the arm. Two set screws 826 (Figs. 3 and 48) are provided for engaging opposite side portions of the knife to assist in obtaining a fine adjustment about an axis extending lengthwise of the shoe. The front end of the arm 824 is held initially upraised by a spring 828 connected to the arm above the pivot pin 810 and to a pin 829 on the slide 780. The initial position of the arm is determined by engagement of a lug 830 on its rear end with the top face of the slide 780. It will be evident that the arm 824 is carried rearwardly by the slide 780, but it remains upraised until the side knives 758 have been swung substantial distances away from each other. The arm is then swung downwardly to carry the knife 756 to the same plane as the side knives, and by further movement of the slide 780 thereafter the knife 756 is moved rectilinearly to complete the upper-trimming operation. For thus swinging the arm 824 downwardly there is provided a lever 832 pivotally mounted on a pin 834 in the upstanding web portions of the carrier 674 and provided with a roll 836 arranged to engage a plate 838 fast on the arm. A third arm 840 of the three-armed lever 802 carries a roll 842 which by engagement with a rearwardly extending arm 844 of the lever 832 holds this lever initially with the roll 836 retracted rearwardly beyond the plate 838. As the lever 802 receives its operative movement the roll 842 is carried downwardly along the rear face of the lever 832 and by engagement with a cam face 846 on this lever swings it in a forward direction as the arm 824 is being carried rearwardly. This causes the roll 836 to act on the inclined edge 848 of the plate 838 to impart a quick downward movement to the arm 824, after which the roll engages the top face of the plate 838 to maintain the knife 756 at the proper height during its action on the upper materials. At this time the lever 832 is held stationary by engagement of the roll 842 with a face 850 of the lever which is curved on an arc concentric with the axis of the pin 834. As the arm 824 is swung downwardly a lug 852 extending upwardly from the slide 780 enters a recess 854 in the arm to insure by engagement with the side walls of this recess that the arm is held properly positioned laterally. To insure against damage in case the arm 824 should be swung accidentally downward when the machine is idle, a lug 856 (Fig. 3) on the arm is arranged to engage a lug 858 formed on one of the gibs 784.

It is desirable during the upper-trimming operation to hold the margin of the toe end of the insole down on the last out of the way of the trimming knives. The machine is accordingly provided with a holddown 860 (Figs. 1, 2, and 48) comprising a rod curved similarly to the toe end of the insole and having upwardly extending portions 862 mounted in brackets 864 fast on the carrier 674 (Fig. 3). The curved portion of the rod thus engages the insole between the latter and the paths of movement of the trimming knives. The upwardly extending portions 862 of the rod are adjustable vertically in upwardly extending tubular portions 866 of the brackets 864, these tubular portions being split and encircled by split clamps 868 which are contracted by suitable screws to retain the holddown in adjusted position. It will be understood that the holddown is moved into engagement with the insole by the downward movement of the carrier 674.

The waste material severed from the toe end of the upper by the trimming knives is held on the arm 824 adjacent to the middle knife 756 by a retainer comprising a resilient curved plate 870 (Fig. 6) fastened to the arm by a screw 872, the lower end of this plate being bent toward the edge of the knife 756 but being spaced far enough therefrom to permit the waste material, when this knife is operated, to curl upwardly between the knife and the lower edge of the plate, as illustrated in Fig. 43. Accordingly, the waste material is supported by the arm 824 when the arm is swung upwardly and moved forwardly after the upper-trimming operation and during the subsequent movements of the carrier 674 to carry the trimming means away from over the shoe and to bring the cement-applying means 672 into position to operate on the shoe. The machine is further provided with means for removing the waste material from the arm 824 when the cement-applying means is in engagement with the shoe. Fast on the left-hand side of the frame 10 is a casting 874 (Figs. 1 and 3) formed to serve as a receptacle for the waste material, and secured to this casting within the receptacle by screws 876 (Figs. 3 and 13) is a bracket 878. The screws extend through slots 880 in the casting to permit the bracket to be adjusted vertically. Rotatable in the bracket 878 is a shaft 882, and clamped on the upper end of this shaft is a collar 884 on which is secured a clearer plate 886 (Figs. 3, 4 and 5). This plate has therein a recess 888 which receives the lower end of the trimming knife 756, as illustrated in Fig. 5, when the plate is swung by rotation of the shaft 882 after the carrier 674 has moved the knife downwardly in carrying the cement-applying means into engagement with the shoe. In such swinging movement of the plate 886 an upwardly extending end portion 890 thereof is arranged to engage the waste material, indicated at 892 in Figs. 3 and 5, and to remove it from the trimming knife so that it falls into the receptacle formed by the casting 874. To provide clearance for this end portion of the plate 886, mechanism is provided for swinging the resilient waste-retaining plate 870 away from the knife to the position illustrated in Fig. 5. This mechanism comprises a pin 894 (Fig. 6) slidingly mounted in the arm 824 with its rear end in engagement with the plate 870, a member 896 pivotally mounted on the arm and provided with a screw 898 arranged to engage the front end of the pin 894, and a rod 900 pivotally connected to the member 896 and extending downwardly through an opening in the arm 824 in position for its lower end to engage a plate 902 secured to the bracket 878 when the trimming means is carried downwardly toward the waste-removing means in the manner hereinabove described. It will be understood that in response to engagement of the plate 902 with the rod 900 the member 896 is swung to force the pin 894 rearwardly and thus to move the lower end portion of the waste-retaining plate 870 into the position illustrated in Fig. 5. A comparatively light spring 904 arranged as shown in Fig. 6 serves to maintain the member 896 normally in such a position as to avoid interference between the lower end of the rod 900 and other parts of the machine. It will be noted by reference to Fig. 13 that the shaft 882 is somewhat inclined, the purpose being to cause the clearer plate 886 to operate in a plane substantially parallel to the plane of the cutting edge of the knife 756 when the knife is inclined relatively to the carrier 674 in the manner illustrated in Fig. 6, as it is at the time when the clearer plate acts to remove the waste material. It will be understood that under some conditions the waste material may fall into the receptacle as a result of the swinging of the waste-retaining plate 870 away from the knife 756, before the clearer plate receives its operative movement.

The shaft 882 is rotated to operate the clearer plate 886 by a fluid-operated piston 906 (Fig. 14) movable in a cylinder 908 which is a part of the bracket 878. The piston is provided with rack teeth 910 in engagement with a pinion 912 fast on the shaft 882, and its movements in opposite directions are limited by a pin 914 which is threaded therein and arranged to engage the cylinder 908 at opposite ends of a slot 916. A torsion spring 918 (Fig. 13) serves to impart return movement to the clearer plate and the piston. The piston is operated by fluid admitted to the cylinder 908 from a pipe 920 (Fig. 3) which, as illustrated in Fig. 51, communicates with the pipe line 366 through which fluid is admitted to the cylinder 352 to operate the toe wipers. No valve, therefore, in addition to the previously mentioned valve 370, is required to admit fluid to the cylinder 908.

Novel features of the above-described upper-trimming means are claimed in a divisional application Serial No. 443,097, filed on May 15, 1942, and novel features of the combined upper-trimming and cement-applying means are claimed in another divisional application Serial No. 473,936, filed on January 29, 1943.

The cement-applying device 672 in the machine herein shown is so constructed as to adapt it for use to apply thermoplastic cement maintained by heat in a liquid condition to the insole to fasten the toe end of the upper to the insole, although cement of a different kind may be used if desired. For the purpose in view the carrier 674 serves as a support for a casting 922 (Figs. 3 and 9) having therein a cement-containing chamber 924. The casting 922, which thus serves as a cement receptacle, is supported directly by means of rods 926 and 928 on the front ends of upper and lower pairs of parallel links 930 and 932 the rear ends of which are mounted, respectively, on rods 934 and 936 on the carrier 674. The two upper links 930 are connected together by a web 938 and threaded in an ear 940 on this web is a screw 942 (Fig. 3a) the lower end of which is engaged by a compression spring 944 mounted in a socket in the carrier 674. This spring, therefore, tends to swing the links 930, 932 downwardly, the limit of such downward movement of the links and of the casting 922 being adjustably determined by a screw 946 which is threaded in an ear 948 on one of the links 930 and is arranged to engage a vertical face on the carrier 674. It will be understood that the spring 944 is yieldable to permit any further downward movement of the carrier 674 which may take place after downward movement of the casting 922 is stopped by the shoe in the manner hereinafter explained. A cover 950 on the top of the casting 922 is removable to permit cement in a solid state to be introduced into the chamber 924. To melt the cement and maintain it in a liquid condition the casting 922 is heated by electrical heating units 952 (Fig. 3) mounted in bores formed therein, these units being supplied with current by wires mounted in conduits 954 leading from a junction box 956 on the carrier 674 to which current is supplied under control of a thermostat (not shown) connected by a capillary tube 958 to the casting 922.

Mounted in a bore in the lower end of the casting 922 is a cylindrical upwardly extending portion of a block 960 the lower portion of which is of horseshoe shape, as illustrated in Fig. 11, and is provided with two bores 962 communicating with each other through a chamber 964. This horseshoe-shaped portion of the block 960 is arranged to engage the marginal portion of the toe end of the insole and to act as a holddown thereon, and extending through it from the bores 962 and the chamber 964 are holes 966 through which cement is applied to the insole. The chamber 964 communicates through an upwardly extending bore 968 in the block 960 with a chamber 970 in the casting 922, and this chamber is arranged to communicate with another chamber 972 from which a passage 974 leads to the cement-containing chamber 924. Leading upwardly from the chamber 972 is a bore 976 in the casting 922 in which is mounted a pump plunger 978. Normally closing the passage 974 is a ball valve 980 held on its seat by a spring 982 mounted between the valve and the lower end of the plunger 978, and normally closing communication between the chamber 970 and the chamber 972 is a ball valve 984 held on its seat by a spring 986. When the plunger 978 is moved upwardly it draws a certain amount of cement past the valve 980 into the chamber 972, and when it is moved downwardly it forces this cement past the valve 984 into the chamber 970 and thence through the passage 968 and the holes 966 into contact with the toe end of the insole. A port 988 in the casting 922 permits any cement which may leak past the plunger 978 to return to the chamber 924.

The plunger 978 is moved downwardly to deliver the cement in the manner above described as a result of the downward movement of the carrier 674 to carry the cement-applying device toward the shoe. For this purpose there is mounted to swing about the previously mentioned rod 934 a lever 990 having a downwardly extending arm 992 provided with a roll 994 arranged to engage a cover plate 996 secured on the top of the previously mentioned gripper support 92, a portion of this cover plate being shown in Fig. 12.

Prior to the downward movement of the carrier 674 the roll 994 is positioned at some distance above the cover plate 996, and in response to the downward movement of the carrier the roll is first carried into engagement with the cover plate and then the lever 990 is swung about the rod 934 during further downward movement of the carrier. Another arm 998 of the lever 990 carries a trunnion block 1000 slidingly mounted on a rod 1002 and engaging one end of a compression spring 1004 the other end of which abuts against a collar 1006 fast on the rod. An enlarged front end portion of the rod 1002 is connected by a pin 1008 to a crank arm 1010 fast on the previously mentioned rod 926 which serves as a rockshaft. The pin 1008 extends through a slot 1012 in the enlarged end of the rod 1002 and is held normally at one end of the slot, as shown in Fig. 10, by a spring 1014 mounted in the rod. Also fast on the rockshaft 926 is an arm 1016 (Fig. 9) provided with a slot in which lies a pin 1018 mounted in an upward extension of the pump plunger 978. It will thus be seen that rearward movement of the rod 1002 in response to the action of the compression spring 1004 thereon serves to rock the shaft 926 in the direction to impart downward cement-applying movement to the pump plunger 978. The spring is prevented, however, from thus operating the rod until near the end of the downward movement of the carrier 674, notwithstanding the fact that the spring is being compressed at this time by the action of the lever 990. For this purpose there is pivotally mounted on the rod 934 a lever 1020 one arm of which serves as a latch in engagement with the collar 1006 fast on the rod 1002, as illustrated in Fig. 10. This arm is swung upwardly to release the rod by engagement of the lever 990 with a screw 1022 threaded in another arm of the lever 1020 when the carrier 674 has nearly completed its downward movement as hereinabove described. It will be understood that adjustment of the screw 1022 serves to vary the time in the downward movement of the carrier when the rod 1002 is released. The amount of movement imparted to the rod by the spring 1004, and therefore the amount of cement-applying movement imparted to the pump plunger 978, is adjustably determined by a nut 1024 threaded on the rod and a spacing collar 1026 slidingly mounted on the rod between this nut and the trunnion block 1000. It will be understood that the spacing collar abuts against the trunnion block and the nut abuts against the collar to limit the movement of the rod. The nut 1024 is held in adjusted position by a lock nut 1028. In the return of the parts to starting positions return movement is imparted to the rod 1002 and the pump plunger by the arm 998 of the lever 990, the trunnion block 1000 on this arm acting on the rod through the collar 1026 and the nut 1024. It will be understood that at this time the rod 1002 acts on the pin 1008 through the spring 1014, the slot 1012 in the rod being provided for leeway in the swinging of the links 930 and 932, since the return movement of the arm 1010 is limited by engagement with an abutment face of the casting 922. The return movement of the lever 990 is effected by a spring 1030 connected to the arm 998 of the lever and to one of the links 930.

Novel features of the above-described cement-applying means are claimed in a divisional application Serial No. 435,989, filed on March 24, 1942.

The downward movement of the casting 922 toward the shoe is limited by engagement of the horseshoe-shaped lower end of the block 960 thereon with the insole, as illustrated in Fig. 45. This lower end of the block is provided with an inclined face 1034 (Fig. 9) against which the marginal portion of the upper is forced by the wipers 322 when they are advanced and closed inwardly over the insole, and by the force thus applied to this face the block 960 and the casting 922 are wedged upwardly against the resistance of the previously mentioned spring 944 (Fig. 3a), so that the wipers move inwardly under the block as illustrated in Fig. 46. The block 960 accordingly acts as a retarder on the margin of the upper to insure that it will be wiped tightly and smoothly inward over the insole by the wipers, and since the block 960 as well as the casting 922 is maintained in a heated condition, it serves to apply heat both to the cement on the margin of the insole and to the inner face of the margin of the upper, thus affording increased insurance that the thermoplastic cement will effectively secure the margin of the upper to the insole.

The margin of the upper is further controlled by an additional retarder supported on the carrier 674, this retarder comprising a pair of plates 1036 curved as illustrated in Fig. 11 and provided with downwardly extending curved flanges 1038 arranged to clamp the margin of the upper outturned on the top faces of the wipers in response to the downward movement of the carrier 674. These flanges have teeth 1039 on their end portions for better control of the margin of the upper at the sides of the toe. The plates 1036 are provided respectively with upwardly extending tubular portions 1040 and 1042, one mounted within the other and the inner one mounted on a cylindrical stem 1044 on the lower end of a bar 1046 (Fig. 9). The two plates 1036 may be adjusted relatively to each other about the axis of the stem 1044 and they are held in adjusted positions by a split collar 1048 which extends around the outer tubular portion 1040 and is contracted by a screw 1050, both the tubular portions being split part way downward from their upper ends. The bar 1046 is supported on a pair of upper and lower parallel links 1052 and 1054 by pins 1056 and 1058, these links being pivotally mounted on the previously mentioned rods 934 and 936. An ear 1060 on the link 1052 carries a screw 1062 in engagement with a spring 1064 mounted in a socket in the carrier 674, and another ear 1066 on this link carries a screw 1068 arranged to engage an abutment face on the carrier 674 to determine adjustably the height at which the retarder plates 1036 are initially positioned. It will be understood that by the downward movement of the carrier 674 the plates 1036 are carried into clamping engagement with the margin of the upper, as illustrated in Fig. 45, the spring 1064 being yieldable to permit further downward movement of the carrier after the upper is clamped by the plates. As the margin of the upper is wiped inwardly by the wipers, it slips under the flanges 1038 of the plates 1036 until it is withdrawn from under these flanges, as illustrated in Fig. 46. Thereafter the block 960 serves alone as a retarder during most of the remainder of the wiping operation of the wipers. It will be evident that cement adhering to the lower face of this block is applied to the upper as the upper is wiped inwardly under it.

Figure 28:
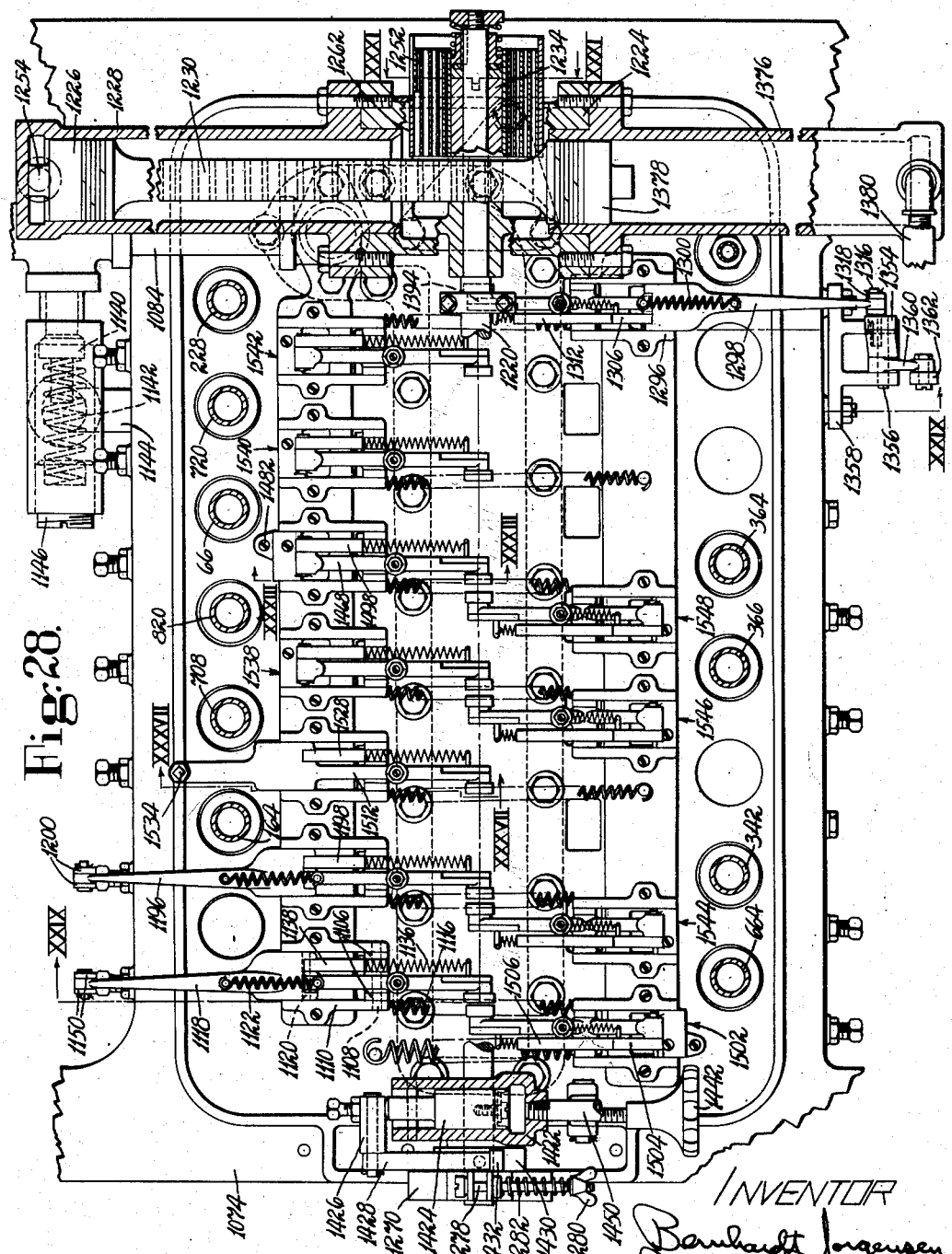
Fig. 28 is a view partly in plan and partly in section of the means for controlling the operation of the various mechanisms by fluid pressure, parts being broken away.
Figure 29:
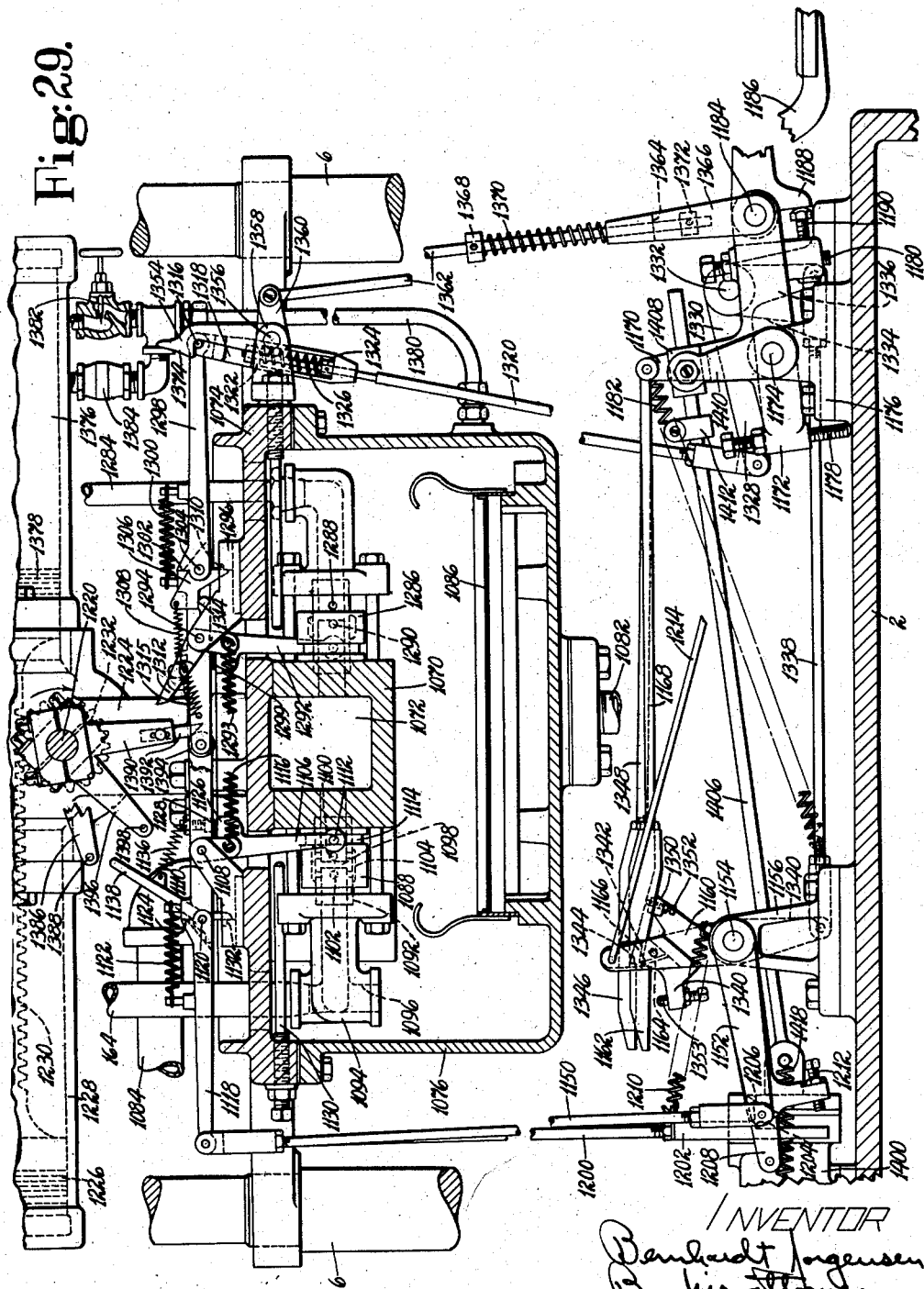
Fig. 29 is a section on the line XXIX—XXIX of Fig. 28.
Figure 40:
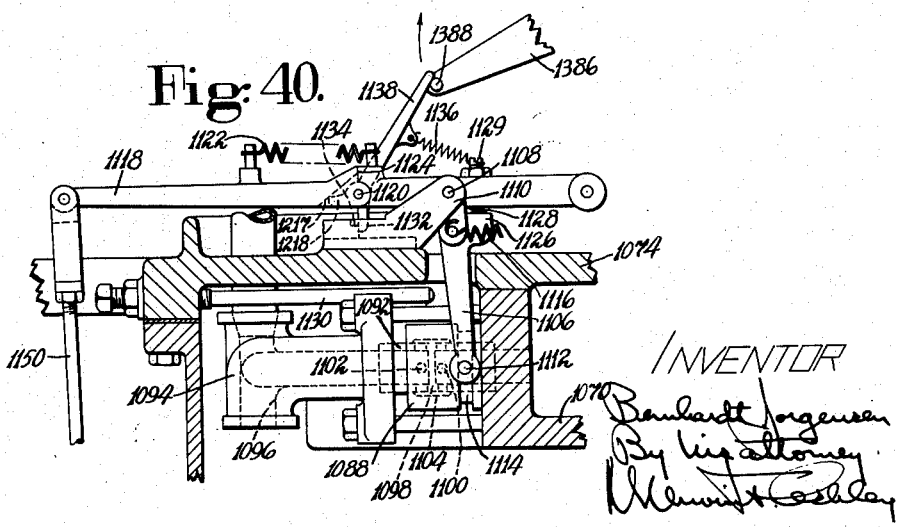
Fig. 40 is a view similar to Fig. 29 of a portion of the structure there shown, illustrating further the purpose of the construction shown in Fig. 39.

The previously mentioned source of supply 68 (Fig. 51) of fluid under pressure comprises a casting 1070 (see also Fig. 29) which has therein a chamber 1072 communicating through openings in the casting with all the previously mentioned valves which control the flow of fluid to the various operating mechanisms. The casting 1070 is secured to the lower face of a plate 1074 which serves as a closure for the chamber 1072 and which is supported on the previously mentioned posts 6. Secured also to the plate 1074 is a casting 1076 which encloses the casting 1070 and serves as a reservoir or sump for fluid under atmospheric pressure. A pump 1078 (Fig. 1) driven continuously by an electric motor 1080 draws fluid from the reservoir 1076 through a pipe 1082 and delivers the fluid through a pipe 1084 into the chamber 1072. The fluid passes from the reservoir to the pump through a strainer 1086. When the machine is not in operation the fluid is returned freely to the reservoir 1076, without developing any substantial pressure in the chamber 1072, through a valve 1088 (Figs. 29, 40 and 51). This valve is a sleeve valve slidingly movable on a tube 1092 clamped tightly between the casting 1070 and a coupling 1094 and communicating respectively at its opposite ends with the chamber 1072 and with a passage 1096 in this coupling which opens into the reservoir 1076. The tube 1092 has therein a partition 1098 which closes communication between its opposite ends, and extending through the tube at opposite sides of this partition, respectively, are two sets of ports 1100 and 1102. The valve 1088 is provided with an annular chamber 1104 through which these two sets of ports are in communication with each other when the valve is in its normal position against the casting 1070, as illustrated, so that the fluid is permitted to escape freely from the chamber 1072 to the reservoir 1076. To interrupt such escape of the fluid, so that pressure will be developed in the chamber 1072, the valve is moved into position to close the ports 1100. The valve is controlled by an arm 1106 which is forked at its upper end (Fig. 28) and is pivotally mounted on a pin 1108 supported on a bracket 1110 fast on the plate 1074. At its lower end the arm 1106 carries a pin 1112 extending into an annular groove 1114 in the valve 1088, so that the valve is moved along the tube 1092 by the arm. A spring 1116 connected to the arm 1106 and to a similar arm of another valve-controlling mechanism at the other side of the casting 1070 holds the valve 1088 in its normal position against the casting. Also pivotally mounted on the pin 1108 is a lever 1118 the rear arm of which consists of two parts pivotally connected together by a pin 1120 and normally held by a spring 1122 in a fixed relation to each other determined by the interengagement of shoulders on the two parts at 1124. Between the front arm of the lever 1118 and a lug 1126 on the arm 1106 is a compression spring 1128 abutting against a screw 1129 in the lever. Through this spring the arm 1106 is operated to move the valve 1088 into position to close the ports 1100 in response to movement of the lever 1118 in a clockwise direction as the parts are viewed in Figs. 29 and 40, this movement of the arm 1106 being limited by its engagement with a rod 1130 threaded in the plate 1074. The spring 1128 is stronger than the spring 1116 and yields only upon engagement of the arm 1106 with the rod 1130. When the lever 1118 is thus operated, by means hereinafter described, it is held against return movement, to prevent return of the valve 1088, by a latch 1132 which normally rests against a vertical face on the bracket 1110, as shown, but in response to the movement of the lever is lifted to a position where it is swung over a horizontal shoulder 1134 (Fig. 40) on the bracket. A spring 1136 connected to an upwardly extending arm 1138 of the latch and to the lever 1118 swings the latch into this position, and it normally remains in this position until it is swung from over the shoulder 1134 by automatic means acting on the arm 1138 as also hereinafter described. It will be understood that when the lever 1118 is thus released by the latch 1132 the spring 1116 returns the valve 1088 to its initial position to relieve the pressure in the chamber 1072. When the valve is moved by the lever into position to close the ports 1100 as above described, the pressure thus established in the chamber 1072 is limited by a relief valve 1140 (Figs. 28 and 51), this valve being controlled by a spring 1142 against the resistance of which it is opened by the pressure of the fluid to permit fluid to return to the reservoir 1076 through a by-pass 1144. The pressure of the fluid in the chamber 1072, therefore, depends upon the strength of the spring 1142 which is adjustably variable by means of a screw 1146. A gage 1148 connected to the pipe 1084 serves to indicate the amount of pressure developed in the chamber 1072.

The swinging of the lever 1118 to operate the valve 1088 as above described is effected by upward movement of a rod 1150 connecting the lever to an arm 1152 (Figs. 29 and 38) fast on a rockshaft 1154 mounted in brackets 1156 and 1158 on the base 2 of the machine. Also fast on this rockshaft is an upwardly extending lever arm 1160 which is forked at its upper end, and between its forks is mounted a latch 1162 which rests on a triangular block 1164 fast on the arm and is provided with a shoulder 1166 arranged to engage this block. The latch 1162 is connected by a rod 1168 to an upwardly extending arm 1170 of a three-armed treadle lever 1172 fast on a rockshaft 1174 which is mounted on a bracket 1176 on the base of the machine. Screws 1178 and 1180 carried by this lever are arranged to engage the base to limit movements of the lever in opposite directions. A spring 1182 connected to the arm 1170 and the bracket 1158 holds the lever 1172 normally in the position determined by the screw 1178. The front end of the lever 1172 is forked and carries a pin 1184 on which is mounted a treadle 1186 provided with a lug 1188 arranged to engage a screw 1190 in the lever to determine adjustably the height of the treadle relatively to the lever. It will be evident that upon depression of the treadle 1186 the resulting forward movement of the rod 1168 causes the latch 1162 to swing the arm 1160 forwardly and thus to lift the rod 1150 to swing the lever 1118, thereby moving the valve 1088 into position to establish pressure in the chamber 1072. By reason of the action of the valve-controlling latch 1132 the rod 1150 remains uplifted when the treadle 1186 is released by the operator, the latch 1162 moving rearwardly along the block 1164 as the treadle is returned to its starting position by the spring 1182.

The same depression of the treadle 1186 which establishes pressure in the chamber 1072 as above described also causes the jaws of the grippers 88 and 90 to close on the upper. The valve 165 (Fig. 51) which controls the flow of fluid to and from the gripper-closing cylinders 144 and 178 is like the valve 1088 and operates in the same manner, except that in its initial position, as shown, it disconnects the gripper-closing cylinders from the chamber 1072, ports 1192 communicating with the pipe line 164 leading to the cylinders being open to exhaust and ports 1194 communicating with the chamber 1072 being closed. When the valve 165, therefore, is moved in the same direction as the valve 1088 it establishes communication between these two sets of ports and therefore admits fluid to the gripper-closing cylinders. Mechanism mounted on the plate 1074 for thus operating the valve 165 is shown in Fig. 28 and is substantially identical with the mechanism above described for operating the valve 1088. The same mechanism is shown also in Fig. 39 in combination with modified operating means hereinafter described. It includes a two-part lever 1196 corresponding to the lever 1118, and a latch 1197 (Fig. 39), corresponding to the latch 1132, for holding the valve 165 in the position to which it is moved by the lever, the upwardly extending arm of this latch (corresponding to the arm 1138) being shown at 1198. Operative movement is imparted to the lever 1196 by upward movement of a rod 1200 connected to the lever. At its lower end this rod carries a bar 1202 provided with a shoulder 1204 arranged to be engaged by a triangular block 1206 (see also Fig. 38) secured between forks at the rear end of an arm 1208 fast on the rockshaft 1154. Accordingly, when this rockshaft is operated by the treadle as above described the rod 1200 is lifted and acts through the lever 1196 to move the valve 165 into position to admit fluid to the gripper-closing cylinders, the valve being held in that position by the latch 1197. A spring 1210 connected to the bar 1202 and to the hub of the arm 1208 holds the bar normally against the block 1206. Near the end of the upward swinging movement of the arm 1208, however, a screw 1212 mounted in a depending lug on the arm engages the lower end of the bar 1202 and swings the bar and the rod 1200 rearwardly to carry the shoulder 1204 away from over the block 1206. The purpose of this is to leave the valve 165 free to be returned to its initial position when it is released by the latch 1197 at the proper time in the cycle of operations, notwithstanding the fact that the arm 1208 remains upraised by reason of the action of the latch 1132 on the lever 1118.

If the operator should find, after having depressed the treadle as above described, that the upper materials are not properly positioned in the jaws of the grippers, he may cause the grippers to open and release the upper. For this purpose there is provided a rod 1214 slidingly mounted in a bearing at the front of the base of the machine and provided on its front end with a pad 1216 which the operator may engage with his foot, the rear end of the rod being connected to the upper end of the arm 1160. If it is desired that the grippers shall release the upper, the operator pushes the rod 1214 rearwardly with his foot and thereby swings the arm 1160 rearwardly to cause the arm 1152 to pull downwardly on the rod 1150. This causes the rear part of the two-part lever 1118 to swing downwardly about the pin 1120 against the resistance of the spring 1122. In this operation an inclined face 1217 (Fig. 40) on the rear part of the lever acts on a tail portion 1218 of the latch 1132 to swing the latch into position to release the lever 1118, so that the valve 1088 is returned by its spring 1116 into position to terminate the pressure in the chamber 1072. Such termination of the pressure causes the gripper jaws to open, although the gripper-closing cylinders are still in communication with the chamber 1072 through the valve 165. After having arranged the margin of the upper properly in the gripper jaws the operator again depresses the treadle to move the valve 1088 into position to establish pressure once more in the chamber 1072, whereupon the gripper jaws immediately close on the upper as before.

Figure 30:
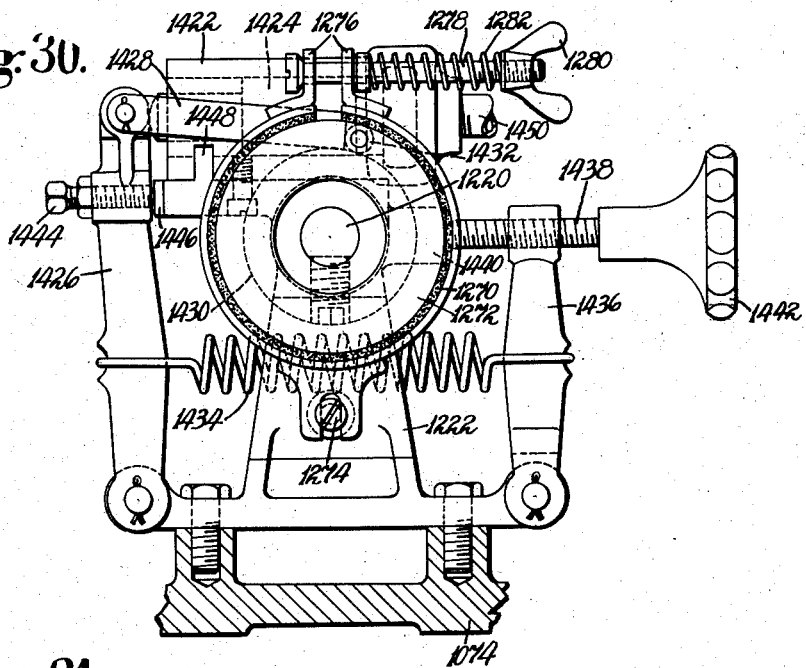
Fig. 30 is a view in left-hand side elevation of a portion of the structure shown in Fig. 28.
Figure 31:
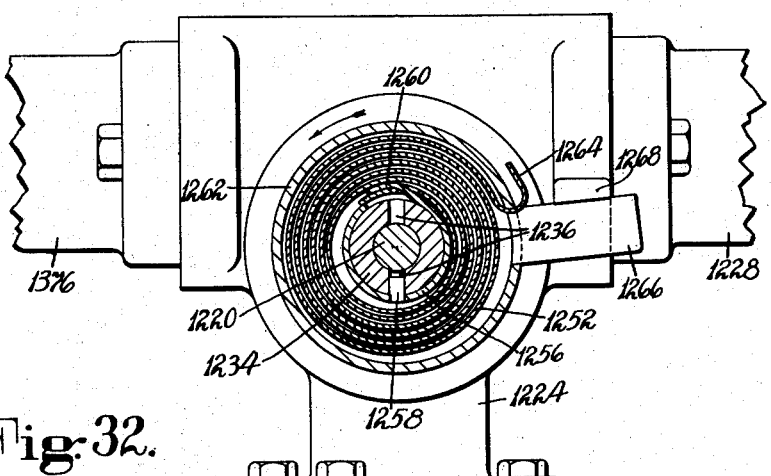
Fig. 31 is a section on the line XXXI—XXXI of Fig. 28.
Figure 32:
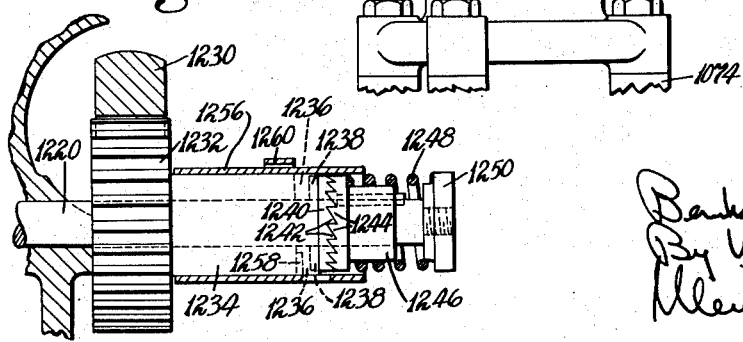
Fig. 32 shows in vertical section certain portions of the structure shown in Figs. 28 and 31.

By a third depression of the treadle 1186, or the second depression thereof if the operator does not find it necessary to rearrange the margin of the upper in the grippers, the operator starts the cycle of automatic operations of the machine by initiating the turning movement of a control shaft 1220 which carries means hereinafter described for actuating in proper time relation to one another the various previously mentioned valves which admit operating fluid to the different operating mechanisms and release the fluid therefrom. The shaft 1220 is rotatably mounted in a bracket 1222 (Fig. 30) secured on the left-hand end portion of the plate 1074 and a bracket 1224 (Figs. 28 and 31) secured on the right-hand end portion of the plate. The shaft is turned in one direction by a fluid-operated piston 1226 movable in a cylinder 1228 secured to the bracket 1224, the piston having integral therewith a rack bar 1230 the teeth of which are in engagement with a pinion 1232 (Figs. 29 and 32) rotatably mounted on the shaft. This pinion has a hub 1234 provided in one end with slots 1236 (Figs. 31 and 32) into which extend lugs 1238 formed on one end of a clutch member 1240 having ratchet teeth 1242 thereon. These ratchet teeth are engaged by other ratchet teeth 1244 formed on a cooperating clutch member 1246 which is keyed to the shaft 1220 but may move lengthwise of the shaft against the resistance of a spring 1248 confined by a nut 1250 threaded on a reduced end of the shaft. The teeth on the clutch members 1240 and 1246 are so arranged that the shaft 1220 is rotated through these members by the movement which the piston 1226 receives from the fluid admitted to the cylinder 1228. When the fluid is thereafter released from the cylinder 1228 the piston is returned to its starting position by a spiral spring 1252 acting on the hub 1234 of the pinion 1232 while the shaft 1220 is stationary. Such return movement of the piston is limited by engagement of a boss 1254 thereon with the head of the cylinder 1228. The inner end of the spring 1252 is anchored to a thin sleeve 1256 which is provided with a tab 1258 extending into one of the slots 1236 to lock it to the hub 1234. The sleeve 1256 is also provided with a finger 1260 which extends through an opening in the spring 1252 as illustrated in Fig. 31 to anchor the spring. The outer end of the spring is anchored to a sleeve member 1262 which surrounds the spring and extends into an opening in the bracket 1224, this end of the spring having a hook-shaped portion 1264 which extends through an opening in the sleeve member 1262. Rotation of this sleeve member under the influence of the spring is prevented by engagement of an arm 1266 thereon with a lug 1268 on the bracket 1224. It will thus be seen that the spring 1252 is tensioned by the operative movement of the piston 1226 and that, when permitted, it imparts return movement to the piston. When the piston is thus returned the teeth 1242 of the clutch member 1240 slip past the teeth 1244 of the clutch member 1246 which is forced outwardly against the resistance of the spring 1248, the shaft 1220 being held against reverse movement by a brake at its left-hand end. This brake (Figs. 28 and 30) comprises a split band 1270 mounted on a drum 1272 which is fast on the shaft 1220, the band being fastened to the bracket 1222 by a screw 1274. Extending through lugs 1276 on the band is a bolt 1278, and confined between one of the lugs and a nut 1280 on the bolt is a spring 1282 which tends to contract the band and holds it at all times against the drum 1272 with sufficient pressure to prevent any reverse movement of the shaft 1220.

Fluid is admitted to the cylinder 1228 through a pipe line 1284 (Figs. 2, 29 and 51) which leads from the chamber 1072, the admission of the fluid and its exhaust from the cylinder being under control of a valve 1286 which is like the previously mentioned valve 165 and operates in the same manner. That is, normally ports 1288 communicating with the pipe line 1284 are open to exhaust, and when the valve is moved outwardly from the casting 1070 communication is established between these ports and ports 1290 (Fig. 29) communicating with the chamber 1072, so that fluid is admitted to the cylinder 1228. The valve 1286 is controlled by mechanism generally similar to the mechanisms previously described for controlling the valves 165 and 1088. Movements of the valve are effected through an arm 1292 which is like the previously mentioned arm 1106 and is controlled by a spring 1293 acting in the same manner as the spring 1116 which controls the arm 1106. The arm 1292 is pivotally mounted at its upper end on a pin 1294 supported on a bracket 1296 on the plate 1074, and pivotally mounted also on this pin is a two-part lever 1298, similar to the previously mentioned lever 1118, for operating the arm 1292 through a spring 1299. The two parts of the lever 1298 are held normally by a spring 1300 in a relation to each other determined by the interengagement of shoulders on the parts at 1302. Pivotally mounted on the same pin 1304 which connects the two parts of the lever is a latch 1306 controlled by a spring 1308 which swings it into position over a shoulder 1310 on the bracket 1296 when the lever 1298 is swung in the direction to operate the valve 1286. The latch 1306 is of a different shape than the latch 1132 associated with the lever 1118, and the mechanism for controlling it also is different, for reasons which will hereinafter appear. It is operated to release the lever 1298 by a lever 1312 which is pivotally mounted on the pin 1294 and one arm of which bears upwardly against a shoulder 1314 on the latch, the arm being held against this shoulder by a light spring 1315. The lever 1312 is operated by means hereinafter described on the control shaft 1220, and when thus operated causes the valve 1286 to return to its initial position to stop the movement of the control shaft and thereby to stop the cycle of operations of the machine. The fluid is then exhausted from the cylinder 1228, the piston 1226 being returned by the spring 1252.

It will be understood from the above description that the starting of the control shaft 1220 results from upward movement of the outer or front end of the valve-controlling lever 1298. For thus operating the lever there is connected to a pin 1316 on its outer end a yoke 1318 in which is slidingly mounted the reduced upper end portion of a downwardly extending rod 1320. The rod extends through the lower end of the yoke and through a transverse wall 1322 of the yoke, between which wall and a collar 1324 fast on the rod is a spring 1326. Through this spring, therefore, upward movement is imparted yieldingly by the rod to the yoke. At its lower end the rod 1320 is pivotally connected to a rearwardly extending arm 1328 of a bell-crank lever 1330 which is mounted to swing about a pin 1332 supported in a bracket 1334 (Fig. 38) on the base of the machine. A downwardly extending arm 1336 of the bell-crank lever 1330 is connected by a link 1338 to the lower arm of a lever 1340 mounted between its ends to swing on the previously mentioned rockshaft 1154. The upper arm of the lever 1340 is forked and is provided between its forks with a triangular block 1342 (Fig. 29) arranged to be engaged by a shoulder 1344 formed on a latch 1346 positioned between the forks of the lever. This latch is connected by a rod 1348 to the previously mentioned upwardly extending arm 1170 of the treadle lever 1172. Accordingly, depression of the treadle 1186 causes the latch 1346 to swing the lever 1340 in the direction to lift the rod 1320 and thereby to move the valve 1286 into position to start the shaft 1220. When the treadle, however, is depressed the first time, as hereinbefore described, it is ineffective thus to start the shaft by reason of the fact that the latch 1346 is held by a projection 1350 on the previously mentioned arm 1160 at such a height that its shoulder 1344 will not engage the triangular block 1342. This projection is provided with a screw 1352 on the upper end of which the latch normally rests and which is adjustable to vary the height of the latch. It will be understood that since the arm 1160, which is swung forwardly by the treadle and therefore causes its projection 1350 to lower the latch 1346, is held against return movement by the valve-controlling latch 1132, the latch 1346 is ready to act on the lever 1340 in response to the next depression of the treadle. If, however, the operator causes the valve 1088 to return to its initial position by rearward swinging movement of the arm 1160 effected through the rod 1214 as hereinbefore described, in case it is desired to rearrange the margin of the upper in the grippers, such rearward movement of the arm 1160 causes its projection 1350 again to lift the latch 1346, so that the starting of the shaft 1220 will not result from the second depression of the treadle, but only from a third depression thereof. A screw 1353 carried by the lever 1340 lifts the latch 1346 and disengages it from the block 1342 near the end of the depression of the treadle to permit the machine to be stopped at the proper time if the operator should continue to hold the treadle depressed.

As illustrated in Fig. 29, an end of the previously mentioned pin 1316 which connects the yoke 1318 to the valve-operating lever 1298 is normally engaged by a latch 1354 movable about a pin 1356 which is mounted in a bracket 1358 on the front of the plate 1074. This latch, until it is swung from over the pin, prevents such upward movement of the lever 1298 as to start the shaft 1220. An arm 1360 integral with the latch is pivotally connected to a downwardly extending rod 1362 the lower end of which is slidingly movable in a laterally offset portion 1364 (Fig. 1) of a bar 1366 pivotally connected by the previously mentioned pin 1184 to the treadle lever 1172. Between the laterally offset portion of the bar and a collar 1368 fast on the rod 1362 is a spring 1370, anad fast on the lower end of the rod below the offset portion 1364 is a collar 1372 which is normally spaced from the offset portion as illustrated in Fig. 29. Accordingly, it is not until near the end of the depression of the treadle that the latch 1354 is swung from over the pin 1316 by the engagement of the offset portion of the bar 1366 with the collar 1372, prior to which time the spring 1326 is compressed by the upward movement of the rod 1320. The valve 1286 is, therefore, moved suddenly by the spring 1326 into position to start the control shaft 1220 as soon as the lever 1298 is released by the latch 1354. This insures that the ports 1288 through which fluid is admitted to the cylinder 1228 will be instantly opened to their full extent, so that there will be no lag in the speed of the control shaft at the beginning of its movement. When the operator releases the treadle after having thus started the control shaft, a rear face 1374 on the latch 1354 engages the upraised pin 1316 until such time as the lever 1298 is released by its latch 1306 to permit the pin to drop, whereupon the latch 1354 is returned to its normal position over the pin by the spring 1370.

In the machine herein shown the speed of the control shaft 1220 and therefore the time which it takes for the machine to perform its cycle of operations is variably controlled by a fluid check. Secured to the bracket 1224 in line with the cylinder 1228 is a cylinder 1376 in which operates a piston 1378 integral with the front end of the rack bar 1230. The front end of the cylinder 1376 communicates through a pipe 1380 with the fluid reservoir 1076, and in this pipe is an adjustable needle valve 1382. When the piston 1226 is operated to turn the control shaft, fluid in the cylinder 1376 is forced into the reservoir 1076 past the needle valve 1382 at a rate depending upon the adjustment of the valve. In this manner the speed of the shaft is controlled. When the piston 1226 is returned by the spring 1252 fluid is drawn into the cylinder 1376 from the reservoir 1076 by the suction of the piston 1378, the fluid being by-passed around the needle valve 1382 through a check valve 1384.

The automatic means hereinbefore referred to as acting on the arm 1138 (Fig. 29) to swing the latch 1132 into position to release the lever 1118, so that the valve 1088 is returned to its initial position to relieve the pressure of the fluid in the chamber 1072, comprises an arm 1386 which is fast on the control shaft 1220 but adjustable about the axis of the shaft, this arm being provided with a pin 1388 for engaging the arm 1138. Another arm 1390 also adjustably secured to the control shaft has adjustably mounted thereon a finger 1392 arranged to engage the lever 1312 to swing the latch 1306 into position to release the lever 1298 and thus to stop the operation of the control shaft at the end of the cycle of operations of the machine. The two arms 1386 and 1390 thus act on the respective latches at approximately the same time. As the parts are shown in Fig. 29, the finger 1392 is in engagement with a roll 1394 mounted on the inner end of the two-part lever 1298, the purpose of such engagement being to afford additional insurance, by reason of the resistance of the roll and the lever to further movement of the arm 1390, that the control shaft 1220 will not turn beyond its normal stopping position in case the previously mentioned brake on the shaft is not sufficiently effective. Since the arm 1390 is swinging in a downward direction when it acts on the latch 1306, as distinguished from the upward swinging movement of the arm 1386 acting on the latch 1132, the separate lever 1312 is provided as hereinbefore described in order properly to operate the latch 1306, as distinguished from the arm 1138 which is in fixed relation to the latch 1132.

Prior to the stopping of the machine at the end of the cycle as above described, it is brought to a stop at a time in the cycle when the parts are positioned as shown in Fig. 47, while the wipers are in pressure-applying relation to the margin of the upper over the insole, to allow more time for the setting of the cement. For this purpose the control shaft 1220 carries another arm 1396 (Fig. 29) adjustably secured thereon and provided with a pin 1398 arranged to act on the lever 1312 in the same manner as the above-mentioned finger 1392. The machine having thus been stopped, it is started again automatically after an adjustably variable interval. For this purpose there is provided on the base of the machine a cylinder 1400 (Figs. 2, 29, 38 and 51) in which is a piston 1402 fast on a piston rod 1404 pivotally connected at its front end to a forwardly extending rod 1406. The rod 1406 near its front end is slidingly mounted in a trunnion block 1408 supported on the forked upper end of an arm 1410 which is fast on the previously mentioned rockshaft 1174 secured to the treadle lever 1172. In response to forward movement of the rod 1406 a collar 1412 fast thereon engages the trunnion block 1408 and swings the treadle lever to start the control shaft 1220 once more in operation by movement of the valve-operating lever 1298. Such forward movement of the rod results from pressure of fluid admitted to the rear end of the cylinder 1400 through a pipe 1413 and acting on the piston 1402. As indicated in Fig. 51, this end of the cylinder 1400 is at all times in open communication with the pipe line 366 communicating with the rear end of the cylinder 352 in which is the piston 350 for imparting advancing and closing movements to the wipers. Accordingly, when the valve 370 is operated to cause the pressure fluid thus to operate the wipers, the fluid also begins to act on the piston 1402 to impart forward movement to the rod 1406. The collar 1412 is, however, initially spaced from the trunnion block 1408, and the movement of the piston 1402 is retarded, to allow sufficient time for the wipers to complete their advancing and closing movements, and then to dwell on the margin of the upper after the stopping of the machine by the arm 1396, before the machine is again started by the movement of the rod 1406. For thus retarding the movement of the piston 1402 the front end of the cylinder 1400 is closed and is connected by a pipe 1414 (Figs. 2 and 51) to the reservoir 1076 this pipe having therein a needle valve 1416 which variably restricts the flow of fluid in the pipe. It will be understood that when the piston 1402 is operated by the fluid admitted to the rear end of the cylinder 1400, fluid in the front end of the cylinder is forced by the piston into the reservoir 1076 at a rate depending upon the adjustment of the needle valve, and that by such adjustment the operator may vary the length of time that the margin of the upper is held under pressure by the wipers. When the fluid is released from the rear end of the cylinder 1400 by the valve 370 simultaneously with its release from the rear end of the cylinder 352, a pair of springs 1418 act to return the piston 1402, these springs being connected to a transverse pin 1420 which serves as the pivotal connection between the piston rod 1404 and the rod 1406. As the piston is thus returned, fluid is drawn into the front end of the cylinder 1400 from the reservoir 1076.

In the starting of the machine automatically as above described by the movement of the piston 1402 the latch 1354 remains in position to prevent the lever 1298 from being operated until the spring 1326 has been sufficiently compressed by the movement of the lever 1172 to effect a quick movement of the valve 1286 when the lever 1298 is released by the latch, the same as when the starting of the machine results from depression of the treadle 1186. The function of the latch is especially important in that automatic starting operation by reason of the comparatively slow movement of the piston 1402, insurance being afforded that notwithstanding such slow movement of the piston the valve 1286 will when operated, move at once into position to permit a full flow of the fluid into the cylinder 1228. This contributes to the desired accuracy as to the length of time the machine remains at rest, and also insures against any possibility that the machine might stall by reason of failure of the valve-controlling lever 1298 to be moved to the position where it is held by the latch 1306 before the admission of fluid to the cylinder 1400 is terminated.

It will be evident that if by any chance the machine should come to a stop at the end of the cycle with the pin 1388 (Fig. 29) engaging the arm 1138 in the manner illustrated in Fig. 40 after operating the latch 1132, the latch would be ineffective to hold the valve 1088 after the next depression of the treadle to establish pressure in the chamber 1072. To guard against this condition, the machine is provided with mechanism for insuring that the control shaft 1220 will turn far enough to carry the pin 1388 past the arm 1138. As shown in Figs. 28 and 30, there is secured to the bracket 1222 a cylinder 1422 in which is a piston 1424 having a diametrically reduced portion arranged to abut against the upper end of a lever arm 1426 the lower end of which is pivotally mounted on the bracket 1222. Pivotally mounted on the upper end of this arm is the rear end of a bar 1428 the front end portion of which rests on a hub portion 1430 of the previously mentioned drum 1272 within the brake band 1270. The front end face of this bar is arranged to engage a pin 1432 carried by the drum 1272 and thereby to turn the control shaft 1220 the distance required to disengage the pin 1388 from the arm 1138 if the shaft should come to a stop too soon. Forward movement of the bar for this purpose is effected by a spring 1434 connected at one end to the arm 1426 and at the other end to an arm 1436 also pivotally mounted on the bracket 1222, this arm being provided with a screw 1438 arranged to abut against a boss 1440 on the bracket and rotatable by means of a hand wheel 1442 to vary the stress of the spring. A screw 1444 carried by the arm 1426 is arranged to engage a boss 1446 on the bracket 1222 to limit movement of the arm by the spring 1434. The arm 1426 is swung rearwardly against the resistance of the spring 1434 by the piston 1424 in response to the pressure of fluid admitted to the cylinder 1422, the movement of the piston being limited by its engagement with a lug 1448 which extends from the bracket 1222 into a slot in the cylinder 1422. As illustrated in Fig. 51, the cylinder 1422 is at all times in open communication, through a pipe 1450, with the pipe line 1084 leading from the pump to the pressure chamber 1072, and, accordingly, the piston 1424 is operated to retract the bar 1428 and to tension the spring 1434 when pressure is established in the chamber 1072 in response to the initial depression of the treadle 1186. The piston is thereafter held by the fluid at the limit of its movement until the pressure in the chamber 1072 is relieved at the end of the cycle by the action of the pin 1388 on the arm 1138. In response to such relief of the pressure the arm 1426 is returned by the spring 1434, and if the shaft 1220 has not been moved far enough to disengage the pin 1388 from the arm 1138, the bar 1428 by its action on the pin 1432 turns the shaft the additional distance required to effect this result.

Figure 39:
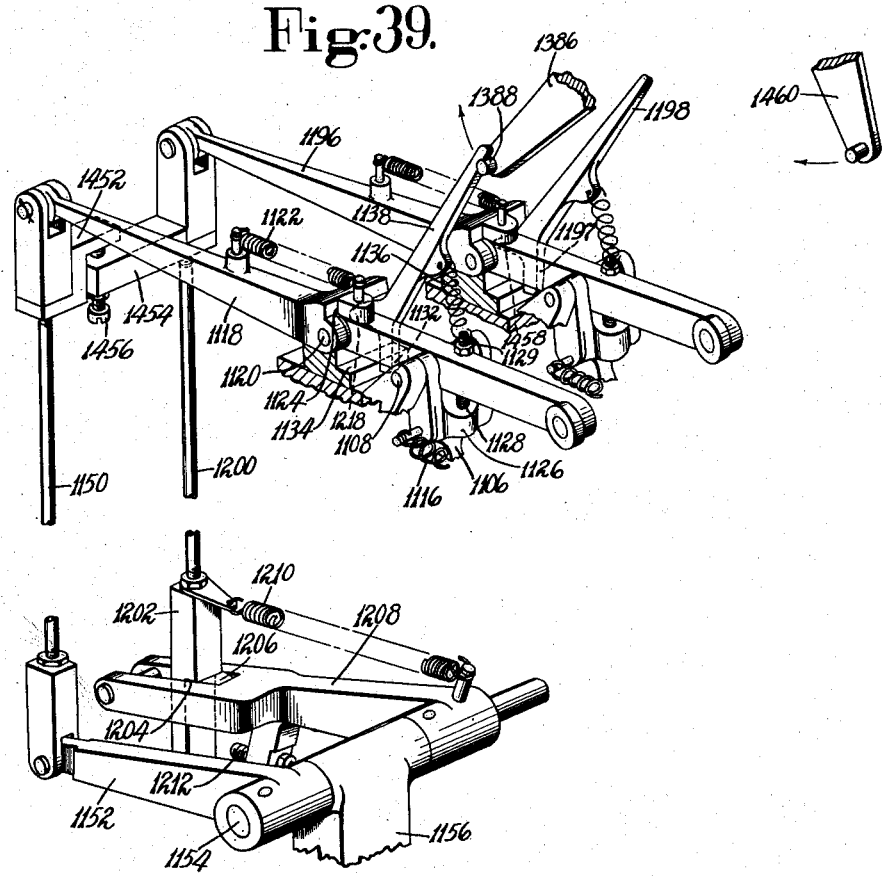
Fig. 39 is a perspective view showing modified means for controlling the valves which establish fluid pressure and admit fluid to close the grippers.

Instead of the means just described for insuring that the shaft 1220 will turn far enough at the end of the cycle to carry the pin 1388 past the arm 1138, the machine may be provided with means shown in Fig. 39 which is so constructed that even if the machine comes to a stop with the pin 1388 in engagement with the arm 1138, as shown in Fig. 39, the machine will nevertheless be properly started again by the treadle 1186. For this purpose the rod 1150 has fast thereon a bar 1452, and the rod 1200 has fast thereon a bar 1454 in which is a screw 1456 arranged to engage the lower face of the bar 1452. Accordingly, when the operator depresses the treadle the first time and thereby raises the rods 1150 and 1200 as hereinbefore described, the latch 1197 associated with the lever 1196 will hold not only this lever but also the lever 1118 against reverse movement, by reason of the engagement of the screw 1456 with the bar 1452, in case the latch 1132 does not act. That is, even though the latch 1132 is rendered inoperative by the pin 1388, the valve 1088 (Fig. 29) will be held in the position to maintain pressure in the chamber 1072 when the operator releases the treadle. The next depression of the treadle, therefore, will serve to start the control shaft 1220 in the normal manner, whereupon the pin 1388 will be carried past the arm 1138 to render the latch 1132 effective to control the lever 1118 before the latch 1197 is operated at the proper time in the cycle to release the lever 1196. In the use of the construction shown in Fig. 39 the operator may also, if desired, cause the grippers to open and release the upper by the operation of the push rod 1214 in the manner hereinbefore described, since the downward swinging movement imparted thereby to the rear portion of the two-part lever 1118 to cause the latch 1132 to release this lever is, by reason of the action of the bar 1452 on the screw 1456, accompanied by a corresponding downward swinging movement of the rear portion of the two-part lever 1196, whereby the latch 1197 is operated to release this lever in the same manner that the latch 1132 is operated to release the lever 1118. That is, an inclined face on the rear portion of the lever 1196, like the inclined face 1217 (Fig. 40) on the rear portion of the lever 1118 acts on a tail 1458 of the latch 1197 to swing this latch into inoperative position. Accordingly, in response to the movement of the push rod 1214 both the valve 1088 and the valve 165 are returned to their initial positions, as distinguished from the valve 1088 alone when the bars 1452 and 1454 are not used.

With reference to the means for operating the valve 1088 which controls the pressure in the chamber 1072, the valve 165 which controls the closing of the grippers, and the valve 1286 which controls the movement of the shaft 1220, it only remains to state that at the proper time in the cycle of operations the arm 1198 (Fig. 39) is operated automatically by an arm 1460 (Fig. 39) on the control shaft 1220 to cause the valve 165 to be returned to its starting position so that the grippers release the upper.

The valve 86, which controls the movement of the toe rest 48 and the instep support 50, is operated and controlled by mechanism shown in detail in Fig. 33. This mechanism is generally similar to the mechanism shown in Fig. 40 for operating the valve 1088, except that it is fully automatic. The valve 86, like the previously mentioned valve 165, is so positioned initially that ports 1462 communicating with the pipe line 66 leading to the toe rest and the instep support are open to exhaust and are out of communication with ports 1464 leading to the pressure chamber 1072. The valve is operated through an arm 1466, like the previously mentioned arm 1196 (Fig. 40), by a lever 1468 which corresponds to the lever 1118 but is shorter and is a one-piece lever. The lever 1468 is pivotally mounted on the same pin 1470 as the arm 1466, this pin being supported by a bracket 1472 on the plate 1074. After being operated by the lever 1468 the valve 86 is prevented from returning to its starting position by a latch 1474 which is pivotally mounted on the lever and is arranged to engage a shoulder 1476 formed on a plate 1478 pivotally mounted on a pin 1480 on the bracket 1472. The plate is adjustable about the pin 1480, to vary the position of the valve when controlled by the latch, by a screw 1482 bearing on the plate 1074 and is held in adjusted position by a screw 1484 threaded in the bracket 1472. The lever 1468 is operated to move the valve 86 into position to establish communication between the ports 1462 and 1464 by a segmental member 1486 adjustably secured to the control shaft 1220. This member has an inclined face 1488 which by engagement with a roll 1490 on the lever 1468 thus operates the lever and has also an arcuate face 1492 concentric with the shaft 1220 for engaging the roll thereafter to maintain the valve 86 in the position in which it establishes communication between the chamber 1072 and the pipe line 66. When the valve is in this position, determined by engagement of the arm 1466 with a rod 1494, the latch 1474 is over the shoulder 1476 but is spaced from the shoulder. When the segmental member 1486 passes beyond the roll 1490, a spring 1496, corresponding to the previously mentioned spring 1116 (Fig. 40), moves the valve 86 reversely to a position determined by engagement of the latch 1474 with the shoulder 1476. When the valve is in this position it covers the ports 1462, as illustrated by dotted lines in Fig. 33, thereby locking the fluid in the pipe line 66 and in the cylinders 56 and 76 (Fig. 21) in order to hold the toe rest and the instep support in a substantially positive manner against pressure of the shoe thereon. At the proper time thereafter in the cycle of operations an arm 1498 of the latch 1474 is operated by an arm 1500 (Fig. 33) on the control shaft 1220 to cause the valve 86 to return to its initial position and to release the fluid in the pipe line 66.

The valve 666 which controls the movement of the heel rest 620 operates in the same manner as the valve 86 which controls the toe rest. That is, it is moved first to admit fluid to the cylinders 656 to apply the heel rest to the shoe, and thereafter by a partial reverse movement, it locks the fluid in these cylinders to render the heel rest substantially positive in its control of the shoe. Later in the cycle the valve is returned to its initial position to release the fluid from the cylinders. The mechanism mounted on the plate 666 is identified inclusively by the reference character 1502 in Fig. 28, and in view of its similarity to the mechanism shown in Fig. 33 it need not be described in detail. By reason, however, of the position of this valve-operating mechanism relatively to the control shaft 1220, a latch 1504 which acts like the latch 1474 of Fig. 33 to determine the position of the valve 666 when the fluid is locked in the cylinders 656 is constructed like the latch 1306 shown in Fig. 29 and is operated by a lever 1506 like the lever 1312 of Fig. 29. Corresponding to the segmental member 1486 of Fig. 33, there is a segmental member 1508

1074 for thus operating and controlling the valve (Fig. 1) on the shaft 1220 for moving the valve 666 into the position to admit fluid to the cylinders 656, and also mounted on the shaft is an arm 1510 which acts at the proper time on the latch-operating lever 1506 to cause the valve to return to its initial position.

In Fig. 37 is shown the mechanism for operating and controlling the valve 710 which admits fluid to the cylinder 694 to swing the carrier 674 on which the upper-trimming means and the cement-applying means are supported. This mechanism comprises a lever 1512 which acts through an arm 1514 in a manner which will now be well understood from the foregoing description of similar mechanisms to move the valve into the position to admit the fluid to the cylinder, the lever being operated by an arm 1516 on the shaft 1220 arranged to engage a roll 1518 on the lever. The lever 1512 carries a latch 1520 arranged to engage a shoulder 1522 to hold the valve in the position in which the pressure chamber 1072 is in communication with the cylinder 694, this shoulder being formed on a block 1524 fast on a bracket 1526 which supports the lever. An arm 1528 of the latch 1520 is operated at the proper time in the cycle by an arm 1530 on the shaft 1220 to release the lever 1512 and cause the valve 710 to return to its starting position. As illustrated in Fig. 37, when the valve 710 is in its starting position it is not in engagement with the casting 1070 like the other valves hereinbefore described, but is spaced from the casting and is partially over ports 1532 communicating with the pipe line 708. To determine this position of the valve the lever 1512 is extended and is provided with a screw 1534 arranged to engage boss 1536 on the plate 1074. With the ports 1532 thus partially covered by the valve when the exhaust of fluid from the cylinder 694 takes place, the return movement of the carrier 674 (Fig. 3) under the influence of the spring 712 is retarded in order to reduce the force of the blow of the bumper 684 on the abutment 686. It will be evident that by adjustment of the screw 1534 the initial position of the valve may be varied.

The other previously mentioned valves 822, 722, 301, 344, 370 and 368 (Fig. 51) are operated and controlled by mechanisms on the plate 1074 which are identified respectively in Fig. 28 by reference characters 1538, 1540, 1542, 1544, 1546 and 1548. Each of these valves operates like the valve 86 (Fig. 33) except that it is not at any time maintained in a position where it locks the fluid in the cylinder or cylinders to which the fluid is admitted by the valve. That is, each valve is moved from an initial position in contact with the casting 1070 into position to admit the fluid and is then maintained in that position until it is returned into position to permit exhaust of the fluid from the cylinder or cylinders. In each case the valve is operated by a lever like the lever 1468 of Fig. 33 which acts on the valve through an arm like the arm 1466, the valve being maintained in position to admit the fluid by a latch controlled by a block like the block 1524 shown in Fig. 37. In the case of each mechanism positioned rearwardly of the pressure chamber 1072 the latch is like the latch 1474 of Fig. 33 and has an arm like the arm 1498, while in the case of each mechanism positioned forwardly of the pressure chamber the latch is like the latch 1306 shown in Fig. 29 and is controlled by a lever like the lever 1312.

In each case the lever through which the valve is moved into position to admit the fluid is operated by an arm on the shaft 1220 like the arm 1516 shown in Fig. 37, and the corresponding latch is operated to release the lever at the proper time by an arm like the arm 1530 shown in this figure. All the arms on the control shaft 1220, as well as the previously mentioned segmental members 1486 (Fig. 33) and 1508 (Fig. 1), are clamped on the shaft by screws like the screws 1550 shown in Fig. 37 and may be adjusted about the shaft to determine variably as desired the times in the cycle when the different respective operations of the machine are initiated or are terminated.

The manner of operation of the machine as a whole will now be briefly summarized with reference particularly to the chart (Fig. 52) which indicates the relative timing of the different operations in a cycle corresponding to one revolution of the control shaft 1220. On this chart the double lines indicate the times when the operating fluid is being admitted to the respective cylinders or is being maintained under pressure therein, and the single lines indicate the times when the fluid is being or has been exhausted from the respective cylinders.

Figure 41:
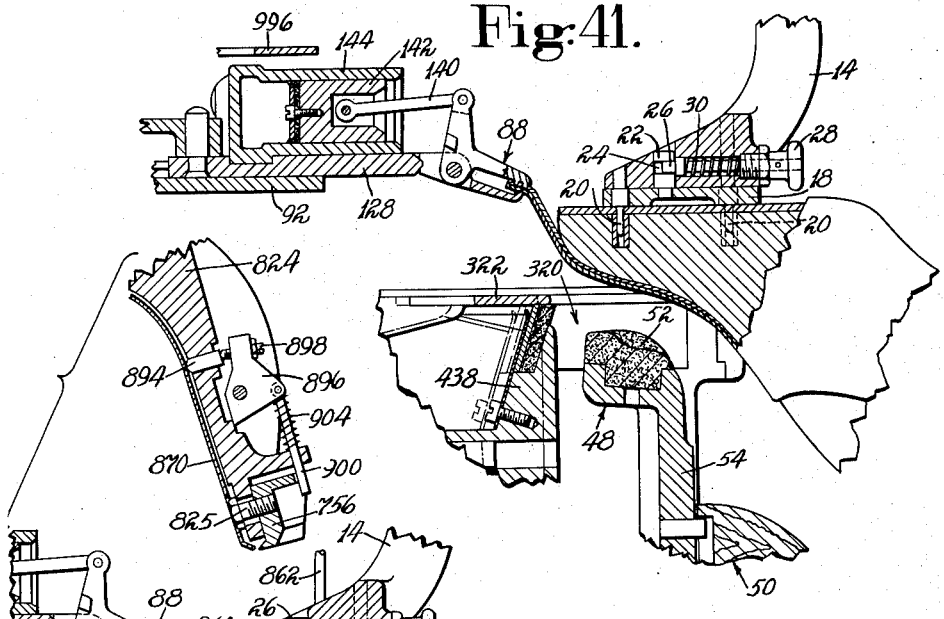

After having presented a shoe in the position determined by the plate 18 and the pins 20 with the outturned margin of the toe end of the upper materials between the open gripper jaws, the operator depresses the treadle 1186, thereby moving the valve 1088 into position to stop the free flow of fluid from the chamber 1072 and moving the valve 165 into position to admit fluid from this chamber to the gripper-closing cylinders 144 and 178. It will be understood that as a result of this depression of the treadle pressure determined by the force of the relief valve spring 1142, is immediately developed by the pump 1078 in the chamber 1072 and the fluid under pressure closes the jaws of the grippers on the upper as illustrated in Fig. 41. If the upper is properly gripped, the operator again depresses the treadle to operate the valve 1286 and thereby to start the operation of the control shaft 1220. If the upper is not properly gripped, the operator moves the push rod 1214 rearwardly by engagement of his foot with the pad 1216 on the front end of the rod to cause the valve 1088 to return into position to relieve the pressure in the chamber 1072, whereupon the jaws of the grippers open by reason of such relief of the pressure. If the machine is provided with the mechanism shown in Fig. 39, the valve 165 as well as the valve 1088 is returned to initial position in response to the movement of the push rod. After having rearranged the margin of the upper in the gripper jaws, the operator again depresses the treadle, whereupon pressure is once more developed in the chamber 1072 and the grippers grip the upper as before. By means of a third depression of the treadle the valve 1286 is then operated to start the operation of the control shaft.

Figure 27:
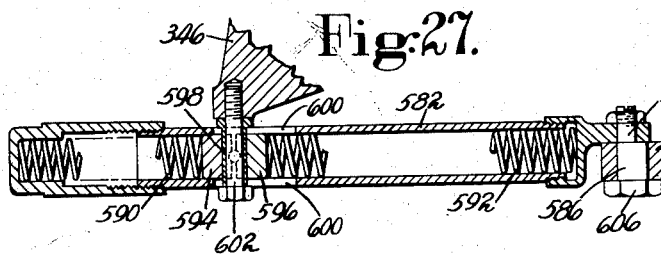
Fig. 27 is a view in horizontal section of a portion of the structure near the left-hand side of Fig. 18.

Immediately upon the starting of the control shaft, as indicated in Fig. 52, the appropriate valves are operated to cause the toe rest 48, with its instep support 50, and also the heel rest 620 to move into engagement with the shoe; and at times in the cycle further indicated in this figure these valves are so controlled as to lock the fluid in the corresponding cylinders to render the toe rest, the instep support and the heel rest substantially positive in their control of the shoe before the shoe receives the maximum pressures which these parts are arranged to resist. At the beginning of the cycle also fluid is admitted to the front end of the cylinder 352 to impart such extra retractive movement to the wiper carri 346 as to cause the toe former 320 to be held by the latch 544 (Fig. 21) in inoperative position if the shaft 564 has been turned to such a position as to render this latch effective since the termination of the preceding cycle of operations. The fluid is thereafter released from the cylinder 352 to cause the wiper carrier again to assume the normal position determined by the springs 590 and 592 (Fig. 27). Shortly after the beginning of the cycle the grippers are operated to pull the upper in outward directions in response to the admission of fluid to the cylinders 222 and 296, fluid under pressure being thereafter maintained in these cylinders to cause the grippers to be retracted to out of the way positions when they release the upper. At this time, if the cylinders 304 are in communication through the valve 318 with the pipe line 228, the members 312 also are operated to impart upward swinging movement to the gripper support 92, so that the grippers are moved heightwise of the last to pull the upper as well as in outward directions. While the grippers are holding the upper under tension the carrier 674 which supports the upper-trimming means and the cement-applying means is moved downwardly to carry the upper-trimming means into position to operate on the shoe in response to the admission of fluid to the cylinder 678, and the toe head 324 which carries the toe former 320 and the wipers 322 is moved upwardly in response to the admission of fluid to the cylinders 332. If the toe former is not under control of the latch 544, it acts in such upward movement of the toe head to wipe the toe-end portion of the upper heightwise of the last while it is held under tension by the grippers. If the toe former, however, is held retracted by the latch 544, the wipers 322 serve to deflect the tensioned upper inwardly toward the last, the toe former being released by the latch and applied in clamping relation to the upper around the toe substantially at the end of the upward movement of the toe head. If the above-mentioned members 312 are not used to impart upward swinging movement to the gripper support 92, this support is raised, by engagement of the screws 608 on the toe head therewith, enough to insure that the grippers will clear the wipers. The time in the cycle when the upper-trimming means has been moved downwardly into operative position and the toe head has completed its upward movement is illustrated by Fig. 42.

The next operation performed is the trimming of the upper in response to the admission of fluid to the cylinder 796. In this operation the side knives 758 are first swung outwardly, and just after these knives begin the upper-trimming operation (Fig. 49) all the grippers are opened to release the upper and are retracted to out-of-the-way positions as above described. It will be understood that these knives, moving in a plane parallel to the wipers 322, cut through all but the outer layer of the upper materials next to the wipers as the margin of the upper is spread outwardly over the wipers. Immediately after the side knives complete their operative movements the middle knife 756, which is swung downwardly into the same plane as the side knives as the latter are operated, is moved lengthwise of the shoe in that plane (Figs. 43 and 44) to complete the severing of the surplus margin of the inner layer or layers of the upper materials. The severed material 892 is retained between the knife 756 and the spring plate 870.

After the trimming of the upper the fluid is released from the cylinder 678 and the carrier 674 is raised by the spring 724 (Fig. 6), the upper-trimming knives also receiving return movements in response to release of the fluid from the cylinder 796. Thereafter the carrier 674 is swung, in response to admission of fluid to the cylinder 694, to bring the cement-applying device 672 into position over the shoe, and fluid is again admitted to the cylinder 678 to move the carrier downwardly. As the carrier is thus moved downwardly, the lever 990 (Fig. 10) of the cement-applying device is operated to compress the spring 1004, and when the carrier has nearly completed its downward movement this spring is released by the lever 1020 to cause it to operate the plunger 978 whereby heated cement from the chamber 924 is forced through the holes 966 in the block 960 into engagement with the margin of the insole. The heated block 960 then engages the insole as illustrated in Fig. 45, the margin of the upper being clamped in outspread position upon the wipers by the retarder plates 1036 which are moved downwardly into such upper-clamping positions also by the downward movement of the carrier 674. The wipers are next advanced and closed, in response to the admission of fluid to the rear end of the cylinder 352, to wipe the margin of the upper inwardly over the insole, pulling the margin of the upper from under the retarder plates 1036 and wedging the block 960, which also acts as a retarder, upwardly until it engages the margin on top of the wipers, as illustrated in Fig. 46. By continued movement the wipers withdraw the margin from under the block 960 and wipe it down on the insole in the manner illustrated in Fig. 47. As the wipers are thus advanced and closed, the member 886 (Fig. 5) is operated in response to the admission of fluid to the cylinder 908 to remove the waste upper material from the knife 756 which is moved downwardly into operative relation to this member by the downward movement of the carrier 674 to carry the cement-applying means toward the shoe, the waste-retaining plate 870 being retracted near the end of such downward movement by the action of the plate 902 on the rod 900. Just after the wipers complete their advancing and closing movements the valve 1286 is released by its latch to cause the control shaft 1220 to come to a stop. Before the shaft comes to a stop, fluid is released from the cylinder 678 to cause the carrier 674 to be moved upwardly by the spring 724, whereupon the fluid is released also from the cylinder 694 to cause the carrier to be swung back to its initial position by the spring 712 (Fig. 3). Just before the control shaft comes to a stop, moreover, fluid is released from the cylinders 332, whereupon the spring 614 (Fig. 21), previously compressed in response to the upward movement of the toe head 324, acts on the toe head to press the wipers more forcibly down on the margin of the upper.

The control shaft 1220 having come to a stop as above described, the wipers dwell on the margin of the upper, as shown in Fig. 47, to allow time for at least a partial setting of the cement, until the valve 1286 is operated automatically, in response to the movement of the piston 1402 in the cylinder 1400, to start the shaft again in operation, fluid having been admitted to this cylinder prior to the stopping of the shaft simultaneously with its admission to the wiper-operating cylinder 352. After such starting of the control shaft the parts of the machine not already in their starting positions are returned to such positions in the order indicated in Fig. 52, the toe head 324 being lifted to relieve the pressure of the wipers on the upper before the wipers are retracted from over the shoe. In the return of the wipers the wiper carrier 346 (Fig. 21) is moved to such a position that if the shaft 564 has already been moved into position to render the latch 544 effective, the latch acts at this time to hold the toe former retracted relatively to the wipers as the wiper carrier finally comes to rest in its normal starting position determined by the springs 590 and 592 (Fig. 27). If the shaft 564 is not turned to render the latch effective until after the machine completes its cycle, the toe former is latched in retracted position in response to the extra retractive movement imparted to the wiper carrier at the beginning of the next cycle, as hereinbefore explained. It will be understood that the control shaft comes to a stop at the end of the cycle by reason of the automatic release of the valve 1286 by the latch 1306 (Fig. 29) which controls it. Following such release of the valve, the spring-operated bar 1428 (Fig. 30), if in use, insures such final movement of the control shaft as to carry the arm 1386 (Fig. 40) past the latch arm 1138 as hereinbefore described.

It will be evident that in the operation of a machine such as described the admission of fluid to a cylinder of comparatively large diameter, or the simultaneous admission of fluid to a plurality of cylinders of substantial diameter, may result momentarily in some reduction of pressure in the chamber 1072. Since the fluid admitted to the cylinder 1228 to operate the control shaft 1220 is of the same pressure as that in the chamber 1072, such momentary reduction of the pressure results in a momentary reduction of the speed of the control shaft. That is, the speed of the control shaft varies inversely as the volume of fluid utilized in operating the mechanisms. By reason of this effect increased insurance is afforded that before the next operation takes place an operation requiring the admission of a comparatively large volume of fluid to a cylinder or cylinders will have been completed.

Novel features of the shoe-supporting means herein shown, including the toe rest 48, the instep support 50, the heel rest 620 and their controlling mechanisms, are claimed in a divisional application Serial No. 435,990, filed on March 24, 1942.

Having described the invention, what I claim as new and desire to secure by Letters Patent of the United States is:

1. In a machine for shaping uppers over lasts, upper-gripping means for gripping the margin of an upper at the toe end of a last and for pulling the upper, upper-trimming means arranged to sever surplus marginal material from the toe end of the upper after such pulling of the upper, means for applying cement to the shoe for securing the margin of the toe end of the upper to an insole on the last, and means for lasting the margin of the trimmed upper over the insole into position to be secured thereto by the cement.

2. In a machine for shaping uppers over lasts, upper-gripping means for gripping at the toe end of a last the margin of the different layers of a multi-ply upper and for pulling the upper, upper-trimming means arranged to sever from the toe end of the upper materials the margin of one or more inner layers of the materials after such pulling of the upper while leaving a margin of the outer layer to overlap an insole on the last, means for applying cement to the shoe for securing the margin of the outer layer to the insole, and means for lasting the margin of the outer layer over the insole into position to be secured thereto by the cement.

3. In a machine for shaping uppers over lasts, upper gripping means for gripping at the toe end of a last the margin of the different layers of a multi-ply upper and for pulling the upper, upper-trimming means arranged to sever from the toe end of the upper materials the margin of one or more inner layers of the materials after such pulling of the upper while leaving a margin of the outer layer to overlap an insole on the last, means for applying cement to the insole after the upper-trimming operation for securing the margin of the outer layer to the insole, and means for thereafter lasting the margin of the outer layer over the insole into position to be secured thereto by the cement.

4. In a machine for shaping uppers over lasts, upper-gripping means for gripping at the toe end of a last the margin of the different layers of a multi-ply upper and for pulling the upper, means for wiping the toe end of the upper heightwise of the last while the upper is held by said upper-gripping means, upper-trimming means for thereafter severing from the toe end of the upper materials the margin of one or more inner layers of the materials while leaving a margin of the outer layer to overlap an insole on the last, means for applying cement to the shoe for securing the margin of the outer layer to the insole, and wipers for wiping the margin of the outer layer over the insole into position to be secured thereto by the cement.

5. In a machine for shaping uppers over lasts, upper-gripping means for gripping at the toe end of a last the margin of the different layers of a multi-ply upper and for pulling the upper with said margin turned outwardly from the last, means for clamping the upper around the toe close to the edge of the last bottom, upper-trimming means movable after the pulling of the upper and while it is thus clamped to sever from the toe end of the upper materials the margin of one or more inner layers of the materials while leaving a margin of the outer layer to overlap an insole on the last, means for applying cement to the shoe after the upper-trimming operation for securing the margin of the outer layer to the insole, and means for wiping the margin of the outer layer over the insole into position to be secured thereto by the cement.

6. In a machine for shaping uppers over lasts, wipers for embracing a multi-ply upper about the toe end of a last, upper-gripping means for gripping the margin of the toe end of the upper and for pulling the upper outwardly over said wipers, upper-trimming means movable in a plane substantially parallel to the plane of said wipers after such pulling of the upper to sever from the toe end of the upper materials the margin of one or more inner layers of the materials while leaving a margin of the outer layer to overlap an insole on the last, means for applying cement to the shoe for securing the margin of the outer layer to the insole, and means for operating said wipers to wipe the margin of the outer layer over the insole into position to be secured thereto by the cement.

7. In a machine for shaping uppers over lasts, mechanism for gripping the margin of an upper at the toe end of a last and for pulling the upper, upper-trimming mechanism arranged to sever surplus marginal material from the toe end of the upper after such pulling of the upper, mechanism for applying cement to the shoe for securing the margin of the toe end of the upper to an insole on the last, mechanism for lasting the margin of the trimmed upper over the insole into position to be secured thereto by the cement, and fluid-operated devices associated respectively with said different mechanisms for operating them.

8. In a machine for shaping uppers over lasts, mechanism for gripping the margin of an upper at the toe end of a last and for pulling the upper, upper-trimming mechanism arranged to sever surplus marginal material from the toe end of the upper after such pulling of the upper, mechanism for applying cement to the shoe for securing the margin of the toe end of the upper to an insole on the last, mechanism for lasting the margin of the trimmed upper over the insole into position to be secured thereto by the cement, fluid-operated devices associated respectively with said different mechanisms for operating them, and automatic means for admitting operating fluid to said devices in a predetermined order.

9. In a machine for shaping uppers over lasts, mechanism for gripping the margin of an upper at the toe end of a last and for pulling the upper, upper-trimming mechanism arranged to sever surplus marginal material from the toe end of the upper after such pulling of the upper, mechanism for applying cement to the shoe for securing the margin of the toe end of the upper to an insole on the last, mechanism for lasting the margin of the trimmed upper over the insole into position to be secured thereto by the cement, fluid-operated devices associated respectively with said different mechanisms for operating them, a source of supply of fluid under pressure, valves for admitting fluid from said source to said devices, and cyclic means for operating said valves in predetermined time relation to one another.

10. In a machine for shaping uppers over lasts, upper-gripping means for gripping at the toe end of a last the margin of the different layers of a multi-ply upper and for pulling the upper with said margin turned outwardly from the last, means for clamping the upper around the toe close to the edge of the last bottom, upper-trimming means movable outwardly from opposite the bottom of the last after the pulling of the upper and while it is thus clamped to sever from the toe end of the upper materials the margin of one or more inner layers of the materials while leaving a margin of the outer layer to overlap an insole on the last, and means for lasting the margin of the outer layer inwardly over the insole after the upper-trimming operation.

11. In a machine for shaping uppers over lasts, upper-gripping means for gripping at the toe end of a last the margin of the different layers of a multi-ply upper and for pulling the upper with said margin turned outwardly from the last, means for clamping the upper around the toe close to the edge of the last bottom, upper-trimming means movable in a plane substantially parallel to the bottom of the toe end of the last after the pulling of the upper and while it is thus clamped to sever from the toe end of the upper materials the margin of one or more inner layers of the materials while leaving a margin of the outer layer to overlap an insole on the last, means for releasing the upper-gripping means from the upper and for withdrawing said upper-gripping means from the path of movement of the upper-trimming means prior to the completion of said movement, and means for lasting the margin of the outer layer of the upper inwardly over the insole after the upper-trimming operation.

12. In a machine for shaping uppers over lasts, upper-gripping means for gripping at the toe end of a last the margin of the different layers of a multi-ply upper and for pulling the upper with said margin turned outwardly from the last, means for clamping the upper around the toe close to the edge of the last bottom, upper-trimming means movable outwardly from opposite the bottom of the last after the pulling of the upper and while it is thus clamped to sever from the toe end of the upper materials the margin of one or more inner layers of the materials while leaving a margin of the outer layer to overlap an insole on the last, means for releasing said upper-gripping means from the upper after the beginning but prior to the completion of the movement of the upper-trimming means, and means for lasting the margin of the outer layer of the upper inwardly over the insole after the upper-trimming operation.

13. In a machine for shaping uppers over lasts, upper-gripping means for gripping at the toe end of a last the margin of the different layers of a multi-ply upper and for pulling the upper, upper-trimming means arranged to sever from the toe end of the upper materials the margin of one or more inner layers of the materials after such pulling of the upper while leaving a margin of the outer layer to overlap an insole on the last, means for wiping the margin of the outer layer over the insole after the upper-trimming operation, and fluid-operated devices associated respectively with said upper-gripping means, upper-trimming means and wiping means for operating them automatically in predetermined time relation to one another.

14. In a machine for shaping uppers over lasts, wipers arranged to embrace the toe end of a multi-ply upper on a last and to support the margin of the different layers of the upper materials in outturned position, upper-gripping means for gripping the margin of the several layers and for pulling the margin outwardly over the wipers, upper-trimming means movable outwardly from opposite the bottom of the last after such pulling of the upper to sever from the toe end of the upper materials the margin of one or more inner layers of the materials while leaving a margin of the outer layer supported on the wipers, and means for operating the wipers thereafter to wipe the margin of the outer layer inwardly over an insole on the last.

15. In a machine for shaping uppers over lasts, wipers arranged to embrace the toe end of a multi-ply upper on a last and to support the margin of the different layers of the upper materials in outturned position, upper-gripping means for gripping the margin of the several layers and for pulling the margin outwardly over the wipers, upper-trimming means movable outwardly from opposite the bottom of the last after such pulling of the upper to sever from the toe end of the upper materials the margin of one or more inner layers of the materials while leaving a margin of the outer layer supported on the wipers, means for releasing the upper-gripping means from the upper and for withdrawing said upper-gripping means from the path of movement of the upper-trimming means after the beginning but prior to the completion of that movement, and means for thereafter operating the wipers to wipe the margin of the outer layer of the upper inwardly over an insole on the last.

16. In a shoe machine, upper-gripping means for gripping at the toe end of a last the margin of the different layers of a multi-ply upper and for pulling the margin outwardly from the last, means for supporting the margin in out-turned position by engagement with the outer layer of the upper materials, and upper-trimming means movable outwardly from opposite the bottom of the last to sever from the toe end of the upper materials the margin of one or more inner layers of the materials while leaving a margin of the outer layer on said supporting means.

17. In a shoe machine, upper-gripping means for gripping at the toe end of a last the margin of the different layers of a multi-ply upper and for pulling the margin outwardly from the last, means for supporting the margin in out-turned position by engagement with the outer layer of the upper materials, upper-trimming means movable outwardly from opposite the bottom of the last to sever from the toe end of the upper materials the margin of one or more inner layers of the materials while leaving a margin of the outer layer on said supporting means, and means for releasing the upper-gripping means from the upper after the beginning of the upper-trimming operation.

18. In a shoe machine, upper-gripping means for gripping at the toe end of a last the margin of the different layers of a multi-ply upper and for pulling the margin outwardly from the last, means for supporting the margin in outturned position by engagement with the outer layer of the upper materials, upper-trimming means movable outwardly from opposite the bottom of the last to sever from the toe end of the upper materials the margin of one or more inner layers of the materials while leaving a margin of the outer layer on said supporting means, and means for releasing the upper-gripping means from the upper and for withdrawing said upper-gripping means from the path of movement of the upper-trimming means after the beginning but prior to the completion of that movement.

19. In a shoe machine, upper-gripping means for gripping at the toe end of a last the margin of the different layers of a multi-ply upper and for pulling the margin outwardly from the last, means for clamping the upper about the toe end of the last and for supporting its margin in out-turned position by engagement with the outer layer of the upper materials, and upper-trimming means movable outwardly from opposite the bottom of the last to sever from the toe end of the upper materials the margin of one or more inner layers of the materials while leaving a margin of the outer layer on the supporting means.

20. In a shoe machine, means for wiping a multi-ply upper about the toe end of a last heightwise of the last and for then holding the upper clamped against the last, upper-gripping means for gripping the margin of the different layers of the toe end of the upper materials and for pulling the margin outwardly from the last, and upper-trimming means movable outwardly from opposite the bottom of the last after such pulling of the upper and while it is thus clamped to sever from the toe end of the upper materials the margin of one or more inner layers of the materials while leaving a margin of the outer layer to be lasted over an insole.

21. In a machine for shaping uppers over lasts, the combination with means for lasting the margin of the toe end of an upper inwardly over an insole on a last, of an upper-trimming device arranged to sever surplus marginal material from the toe end of the upper before the margin of the upper is lasted over the insole, and a device for applying cement to the shoe for securing the margin of the upper to the insole, said upper-trimming device and cement-applying device being movable as a unit to bring the different devices alternately into operating position.

22. In a machine for shaping uppers over lasts, the combination with means for lasting the margin of the toe end of an upper inwardly over an insole on a last, of an upper-trimming device arranged to sever surplus marginal material from the toe end of the upper before the margin of the upper is lasted over the insole, and a device for applying cement to the shoe for securing the margin of the upper to the insole, said upper-trimming device and cement-applying device being movable as a unit to position one of said devices opposite the bottom of the toe end of the shoe after the other has been so positioned and to cause each device when so positioned to approach the shoe heightwise thereof.

23. In a machine for shaping uppers over lasts, the combination with means for lasting the margin of the toe end of a multi-ply upper inwardly over an insole on a last, of an upper-trimming device arranged to sever from the toe end of the upper materials the margin of one or more inner layers of the materials while leaving a margin of the outer layer to overlap the insole, and a device for applying cement to the shoe for securing the margin of the outer layer to the insole, the upper-trimming device and cement-applying device being movable as a unit to bring the different devices alternately into position to operate on the shoe.

24. In a machine for shaping uppers over lasts, the combination with means for lasting the margin of the toe end of a multi-ply upper inwardly over an insole on a last, of an upper-trimming device arranged to sever from the toe end of the upper materials the margin of one or more inner layers of the materials while leaving a margin of the outer layer to overlap the insole, a device for applying cement to the shoe for securing the margin of the outer layer to the insole, and a carrier common to said upper-trimming device and cement-applying device and movable to position the cement-applying device opposite the bottom of the toe end of the shoe after the upper-trimming device has been so positioned, said carrier being also movable heightwise of the shoe to carry each device toward the shoe.

25. In a machine for shaping uppers over lasts, the combination with means for lasting the margin of the toe end of a multi-ply upper inwardly over an insole on a last, of an upper-trimming device arranged to sever from the toe end of the upper materials the margin of one or more inner layers of the materials while leaving a margin of the outer layer to overlap the insole, a device for applying cement to the shoe for securing the margin of the outer layer to the insole, and a carrier common to said upper-trimming device and cement-applying device and movable about an axis extending heightwise of the shoe to position the cement-applying device opposite the bottom of the toe end of the shoe after the upper-trimming device has been so positioned, said carrier being also movable axially heightwise of the shoe to carry each device toward the shoe.

26. In a machine for shaping uppers over lasts, the combination with means for lasting the margin of the toe end of an upper inwardly over an insole on a last, of an upper-trimming device arranged to sever surplus marginal material from the toe end of the upper before the margin of the upper is lasted over the insole, a device for applying cement to the shoe for securing the margin of the upper to the insole, and fluid-operated means for moving said upper-trimming device and cement-applying device alternately into position to operate on the shoe.

27. In a machine for shaping uppers over lasts, the combination with means for lasting the margin of the toe end of an upper inwardly over an insole on a last, of an upper-trimming device arranged to sever surplus marginal material from the toe end of the upper before the margin of the upper is lasted over the insole, a device for applying cement to the shoe for securing the margin of the upper to the insole, fluid-operated means for moving said devices as a unit to position the cement-applying device opposite the bottom of the toe end of the shoe after the upper-trimming device has been so positioned, and additional fluid-operated means for moving each of said devices toward the shoe heightwise thereof.

28. In a machine for shaping uppers over lasts, the combination with means for lasting the margin of the toe end of a multi-ply upper inwardly over an insole on a last, of an upper-trimming device arranged to sever from the toe end of the upper materials the margin of one or more inner layers of the materials while leaving a margin of the outer layer to overlap the insole, a device for applying cement to the shoe for securing the margin of the outer layer to the insole, fluid-operated mechanism for moving said devices as a unit to position the cement-applying device opposite the bottom of the toe end of the shoe after the upper-trimming device has been so positioned, additional fluid-operated mechanism for moving said devices each heightwise of the shoe, and automatic means for controlling admission of operating fluid to said different fluid-operated mechanisms to cause them to operate in predetermined time relation.

29. In a machine for shaping uppers over lasts, the combination with means for lasting the margin of the toe end of a multi-ply upper inwardly over an insole on a last, of an upper-trimming device arranged to sever from the toe end of the upper materials the margin of one or more inner layers of the materials while leaving a margin of the outer layer to overlap the insole, a device for applying cement to the shoe for securing the margin of the outer layer to the insole, a carrier common to said upper-trimming device and cement-applying device and movable to position the cement-applying device opposite the bottom of the toe end of the shoe after the upper-trimming device has been so positioned, said carrier being also movable heightwise of the shoe to carry each device toward the shoe, and cylinder-and-piston mechanisms for imparting respectively to the carrier its different movements by fluid pressure.

30. In a machine for shaping uppers over lasts, the combination with means for lasting the margin of the toe end of a multi-ply upper inwardly over an insole on a last, of an upper-trimming device arranged to sever from the toe end of the upper materials the margin of one or more inner layers of the materials while leaving a margin of the outer layer to overlap the insole, a device for applying cement to the shoe for securing the margin of the outer layer to the insole, a carrier common to said upper-trimming device and cement-applying device and movable about an axis extending heightwise of the shoe to position the cement-applying device opposite the bottom of the toe end of the shoe after the upper-trimming device has been so positioned, said carrier being also movable axially heightwise of the shoe to carry each device toward the shoe, cylinder-and-piston mechanisms for imparting respectively to the carrier its different movements by fluid pressure, and spring means for imparting return movements to the carrier.

31. In a machine for shaping uppers over lasts, upper-gripping means for gripping the margin of an upper at the toe end of a last and for pulling the upper, means for applying cement to the shoe for securing the margin of the toe end of the upper to an insole on the last, and toe-embracing wipers for wiping the margin of the toe end of the upper inwardly over the insole into position to be secured thereto by the cement.

32. In a machine for shaping uppers over lasts, upper-gripping means for gripping the margin of an upper at the toe end of a last and for pulling the upper, means for applying cement to the shoe for securing the margin of the toe end of the upper to an insole on the last, toe-embracing wipers for wiping the margin of the toe end of the upper inwardly over the insole into position to be secured thereto by the cement, and automatic means for operating said upper-gripping means, cement-applying means and wipers in predetermined time relation to one another.

33. In a machine for shaping uppers over lasts, upper-gripping means for gripping the margin of an upper at the toe end of a last and for pulling the upper, means for applying cement to the shoe for securing the margin of the toe end of the upper to an insole on the last, toe-embracing wipers for wiping the margin of the toe end of the upper inwardly over the insole into position to be secured thereto by the cement, and fluid-operated devices associated respectively with said upper-gripping means, cement-applying means and wipers for operating them in predetermined time relation to one another.

34. In a machine for shaping uppers over lasts, the combination with means for wiping the margin of an upper inwardly over an insole on a last, of a device for applying cement to the shoe for securing the margin of the upper to the insole, said device comprising a member arranged to engage the insole and having a face inclined relatively to the insole to be engaged by the margin of the upper to force the member heightwise of the shoe away from the insole as the margin of the upper is wiped inwardly by the wiping means.

35. In a machine for shaping uppers over lasts, the combination with means for wiping the margin of an upper inwardly over an insole on a last, of a device for applying cement to the shoe for securing the margin of the upper to the insole, said device comprisng a member arranged to act as a retarder in engagement with the margin of the upper as the margin is wiped inwardly by the wiping means, and means for maintaining said member in a heated condition.

36. In a machine for shaping uppers over lasts, the combination with means for wiping the margin of an upper inwardly over an insole on a last, of a device for applying cement to the shoe for securing the margin of the upper to the insole, said device comprising a member arranged to act as a retarder in engagement with the margin of the upper as the margin is wiped inwardly by the wiping means, and a pump for forcing cement from said member.

37. In a machine for shaping uppers over lasts, the combination with means for wiping the margin of an upper inwardly over an insole on a last, of a device for applying cement to the shoe for securing the margin of the upper to the insole, said device comprising a member having a face inclined relatively to the insole to be engaged by the margin of the upper to force the member heightwise of the shoe away from the insole as the margin of the upper is wiped inwardly by the wiping means, a pump for forcing cement from said member, and means for maintaining said member in a heated condition.

38. In a machine for shaping uppers over lasts, the combination with means for wiping the margin of an upper inwardly over an insole on a last, of a device for applying cement to the shoe for securing the margin of the upper to the insole, said device comprising a cement receptacle and a pump for delivering cement from the receptacle, the pump and receptacle being displaceable as a unit in response to pressure of the margin of the upper on said device as the margin is wiped inwardly over the insole.

39. In a machine for shaping uppers over lasts, the combination with means movable to wipe the margin of an upper inwardly over an insole on a last, of a device for applying cement to the shoe for securing the margin of the upper to the insole, said device comprising a cement receptacle and a pump for delivering cement from said receptacle and including also a member arranged to be engaged by the margin of the upper to force said receptacle and pump as a unit heightwise of the shoe away from the insole in response to the inward wiping movement of the wiping means.

40. In a machine for shaping uppers over lasts, the combination with means for wiping the margin of an upper inwardly over an insole on a last, of a device for applying cement to the shoe for securing the margin of the upper to the insole, said device comprising a cement receptacle, a pump for delivering cement from the receptacle, and a member through which the cement is forced by the pump, said member being arranged to act as a retarder in engagement with the margin of the upper as the margin is wiped inwardly by the wiping means, and means for maintaining said member and the receptacle in a heated condition.

41. In a machine for shaping uppers over lasts, the combination with means for wiping the margin of an upper inwardly over an insole on a last, of a device for applying cement to the shoe for securing the margin of the upper to the insole, and parallel links spaced apart heightwise of the shoe and supporting said device for movement heightwise of the shoe, the device being thus movable in response to pressure of the margin of the upper thereon as the margin is wiped inwardly by the wiping means.

42. In a machine for shaping uppers over lasts, the combination with means for wiping the margin of an upper inwardly over an insole on a last, of a device for applying cement to the shoe for securing the margin of the upper to the insole, said device comprising a cement receptacle and a pump for delivering cement from the receptacle, and parallel links spaced apart heightwise of the shoe and supporting said device for movement heigthwise of the shoe, the pump and receptacle being thus movable as a unit in response to pressure of the margin of the upper on the device as the margin is wiped inwardly by the wiping means.

43. In a machine for shaping uppers over lasts, the combination with means for wiping the margin of an upper inwardly over an insole on a last, of a device for applying cement to the shoe for securing the margin of the upper to the insole, a support for said device movable heightwise of the shoe to carry the device toward the shoe, parallel links spaced apart heightwise of the shoe and on which said device is mounted to move relatively to said support, the device being thus movable in response to pressure of the margin of the upper thereon as the margin is wiped inwardly over the insole, and a spring for yieldingly resisting such movement of the device.

44. In a machine for shaping uppers over lasts, the combination with wipers movable to wipe the margin of an upper around the toe end of a last inwardly over an insole on the last, of a device for applying cement to the shoe for securing the margin of the upper to the insole, said device comprising a member arranged to act as a retarder in engagement with the margin of the upper as the margin is wiped inwardly by the wipers, and additional means for clamping the margin of the upper outspread on the wipers independently of said device prior to the wiping movements of the wipers and for controlling said margin in the wiping operation.

45. In a machine for shaping uppers over lasts, the combination with wipers movable to wipe the margin of an upper around the toe end of a last inwardly over an insole on the last, of a device for applying cement to the shoe for securing the margin of the upper to the insole, said device being arranged to engage the insole and being displaceable heightwise of the shoe by pressure of the margin of the upper thereon in response to the inward wiping movements of the wipers, and additional means for clamping the margin of the upper outspread on the wipers independently of said device prior to the wiping movements of the wipers and for controlling said margin in the wiping operation.

46. In a machine for shaping uppers over lasts, the combination with wipers for wiping the margin of an upper around the toe end of a last inwardly over an insole on the last, of a device for applying cement to the shoe for securing the margin of the upper to the insole, said device being arranged to act as a retarder in engagement with the margin of the upper as the margin is wiped inwardly by the wipers, and an additional retarder arranged to clamp the margin of the upper outspread on the wipers continuously around the toe independently of said device and to control said margin in the wiping operation.

47. In a machine for shaping uppers over lasts, the combination with wipers for wiping the margin of an upper around the toe end of a last inwardly over an insole on the last, of a device for applying cement to the shoe for securing the margin of the upper to the insole, said device being arranged to act as a retarder in engagement with the margin of the upper as the margin is wiped inwardly by the wipers, and an additional retarder arranged to clamp the margin of the upper outspread on the wipers independently of said device and to control said margin in the wiping operation, said device and the additional retarder being movable as a unit into their operating positions.

48. In a machine for shaping uppers over lasts, the combination with wipers for wiping the margin of an upper around the toe end of a last inwardly over an insole on the last, of a device for applying cement to the shoe for securing the margin of the upper to the insole, said device being arranged to act as a retarder in engagement with the margin of the upper as the margin is wiped inwardly by the wipers, and an additional retarder arranged to clamp the margin of the upper outspread on the wipers and to control said margin in the wiping operation, said device and the additional retarder being each yieldable heightwise of the shoe independently of the other.

49. In a machine for shaping uppers over lasts, the combination with wipers for wiping the margin of an upper around the toe end of a last inwardly over an insole on the last, of a device for applying cement to the shoe for securing the margin of the upper to the insole, said device being arranged to act as a retarder in engagement with the margin of the upper as the margin is wiped inwardly by the wipers, an additional retarder arranged to clamp the margin of the upper outspread on the wipers and to control said margin in the wiping operation, and a support common to said device and the additional retarder and movable heightwise of the shoe to carry them into their operating positions, said device and the additional retarder being each independently yieldable heightwise of the shoe relatively to said support.

50. In a machine for shaping uppers over lasts, the combination with wipers for wiping the margin of an upper around the toe end of a last inwardly over an insole on the last, of a device for applying cement to the shoe for securing the margin of the upper to the insole, said device being arranged to act as a retarder in engagement with the margin of the upper as the margin is wiped inwardly by the wipers, parallel links spaced apart heightwise of the shoe and supporting said device for movement heightwise of the shoe in response to pressure of the margin of the upper thereon, an additional retarder arranged to clamp the margin of the upper outspread on the wipers and to control said margin in the wiping operation, and other parallel links spaced apart heightwise of the shoe and movably supporting said additional retarder.

51. In a machine for shaping uppers over lasts, a plurality of grippers for gripping the margin of an upper about the toe end of a last, each of said grippers comprising a pair of upper-gripping jaws and a cylinder-and-piston device for closing the jaws on the upper by fluid pressure, and additional cylinder-and-piston devices formed as units distinct from the jaw-closing devices for moving said grippers to pull the upper.

52. In a machine for shaping uppers over lasts, a plurality of grippers for gripping the margin of an upper about the toe end of a last, each of said grippers comprising a pair of upper-gripping jaws and a cylinder-and-piston device for closing the jaws on the upper by fluid pressure, the grippers being movable outwardly in directions substantially parallel to the bottom of the last to pull the upper, and means for thus moving the grippers.

53. In a machine for shaping uppers over lasts, a plurality of grippers for gripping the margin of an upper about the toe end of a last, each of said grippers comprising a pair of upper-gripping jaws and a cylinder-and-piston device for closing the jaws on the upper by fluid pressure, and additional cylinder-and-piston devices for moving the grippers outwardly in directions substantially parallel to the bottom of the last to pull the upper.

54. In a machine for shaping uppers over lasts, a plurality of grippers for gripping the margin of an upper about the toe end of a last, each of said grippers comprising a pair of upper-gripping jaws and a cylinder-and-piston device for closing the jaws on the upper by fluid pressure, slides supporting said grippers and movable outwardly in directions substantially parallel to the bottom of the last to cause the grippers to pull the upper, and fluid-operated means for thus moving said slides.

55. In a machine for shaping uppers over lasts, a plurality of grippers for gripping the margin of an upper about the toe end of a last, each of said grippers comprising a pair of upper-gripping jaws and a cylinder-and-piston device for closing the jaws on the upper by fluid pressure, the grippers being movable outwardly in directions transverse to the height of the last to pull the upper, levers for thus moving the grippers, and springs for transmitting the force of said levers to the grippers.

56. In a machine for shaping uppers over lasts, a plurality of grippers for gripping the margin of an upper about the toe end of a last, each of said grippers comprising a pair of upper-gripping jaws and a cylinder-and-piston device for closing the jaws on the upper by fluid pressure, the grippers being movable outwardly in directions transverse to the height of the last to pull the upper, levers for thus moving the grippers, and fluid-operated means for operating said levers.

57. In a machine for shaping uppers over lasts, a plurality of grippers for gripping the margin of an upper about the toe end of a last, the grippers being movable outwardly in directions substantially parallel to the bottom of the last to pull the upper, and fluid-operated means for thus moving the grippers.

58. In a machine for shaping uppers over lasts, a plurality of grippers for gripping the margin of an upper about the toe end of a last, the grippers being movable outwardly in directions substantially parallel to the bottom of the last to pull the upper, levers for thus operating the grippers, and fluid-operated devices for operating said levers.

59. In a machine for shaping uppers over lasts, a plurality of grippers for gripping the margin of an upper about the toe end of a last, the grippers being movable outwardly in directions substantially parallel to the bottom of the last to pull the upper, levers for thus operating the grippers, springs for transmitting the force of said levers to the grippers, and means for operating said levers.

60. In a machine for shaping uppers over lasts, means for gripping the margin of an upper at the toe end of a last and for pulling the upper, said upper-gripping means comprising a pair of grippers movable outwardly in directions transverse to the height of the last to pull the upper, a cylinder and a piston movable relatively to each other by fluid admitted to the cylinder, means for operating one of said grippers by the movement of the piston, and means for operating the other gripper by the movement of the cylinder.

61. In a machine for shaping uppers over lasts, means for gripping the margin of an upper about the toe end of a last and for pulling the upper, said upper-gripping means comprising a gripper at the end of the toe and other grippers at the sides of the toe all movable outwardly in directions transverse to the height of the last to pull the upper, a cylinder and a piston movable relatively to each other by fluid admitted to the cylinder, means for operating the end gripper and one of the side grippers by the movements of the cylinder and the piston respectively, and an additional fluid-operated device for operating the other side gripper.

62. In a machine for shaping uppers over lasts, a gripper for gripping the margin of an upper on a last, said gripper comprising a pair of upper-gripping jaws and a cylinder-and-piston device for closing the jaws on the upper by fluid pressure, and means for moving the gripper outwardly in a direction substantially parallel to the bottom of the last to pull the upper.

63. In a machine for shaping uppers over lasts, a gripper for gripping the margin of an upper on a last, said gripper comprising a pair of upper-gripping jaws and a cylinder-and-piston device for closing the jaws on the upper by fluid pressure, and an additional cylinder-and-piston device for moving the gripper outwardly in a direction substantially parallel to the bottom of the last to pull the upper.

64. In a machine for shaping uppers over lasts, a gripper for gripping the margin of an upper on a last, said gripper being movable outwardly in a direction substantially parallel to the bottom of the last to pull the upper, and a cylinder-and-piston device for thus moving the gripper by fluid pressure.

65. In a machine for shaping uppers over lasts, a gripper for gripping the margin of an upper on a last, said gripper being movable outwardly in a direction substantially parallel to the bottom of the last to pull the upper, a lever for thus moving the gripper, and a spring for transmitting the force of said lever to the gripper.

66. In a machine for shaping uppers over lasts, a gripper for gripping the margin of an upper on a last, said gripper being movable outwardly in a direction substantially parallel to the bottom of the last to pull the upper, a lever for thus moving the gripper, and a cylinder-and-piston device for operating said lever by fluid pressure.

67. In a machine for shaping uppers over lasts, a gripper for gripping the margin of an upper on a last, said gripper being movable to pull the upper, a link connected to said gripper for thus moving it, a slide movable along said link, a spring for transmitting the force of the slide to the link, means for operating the slide, and means for closing the gripper on the upper independently of the movements of said slide and link.

68. In a machine for shaping uppers over lasts, a gripper for gripping the margin of an upper on a last, said gripper being movable to pull the upper, a link connected to said gripper for thus moving it, a slide movable along said link, a spring for transmitting the force of the slide to the link, a lever for operating the slide, and a fluid-operated device for operating the lever.

69. In a machine for shaping uppers over lasts, a gripper for gripping the margin of an upper on a last, said gripper being movable to pull the upper, a lever for thus moving said gripper, a second lever movable about the same axis as said first-named lever, a spring for operating the first-named lever by said second lever, and means for operating the second lever.

70. In a machine for shaping uppers over lasts, a gripper for gripping the margin of an upper on a last, said gripper being movable to pull the upper, a lever for thus moving said gripper, a second lever movable about the same axis as said first-named lever, a spring for operating the first-named lever by said second lever, and a fluid-operated device for operating the second lever.

71. In a machine for shaping uppers over lasts, a gripper for gripping the margin of an upper on a last, said gripper being movable to pull the upper, a three-armed lever having one of its arms connected to the gripper for thus moving it, a pivotal support for another arm of said lever, a second lever mounted to swing about the same axis as said three-armed lever, a spring for operating the three-armed lever by said second lever, and an adjustable stop for engaging the third arm of the three-armed lever to vary the initial position of the gripper.

72. In a machine for shaping uppers over lasts, a plurality of grippers for gripping the margin of an upper about the toe end of a last, a support common to said grippers, means for moving the grippers bodily along said support in outward directions transverse to the height of the last to pull the upper, and means for moving said support heightwise of the last to cause the grippers to pull the upper also in that direction.

73. In a machine for shaping uppers over lasts, a plurality of grippers for gripping the margin of an upper about the toe end of a last, a support common to said grippers mounted for swinging movement heightwise of the last, means for moving the grippers bodily along said support in outward directions transverse to the height of the last to pull the upper, and additional means for imparting swinging movement to said support to cause the grippers to pull the upper also heightwise of the last.

74. In a machine for shaping uppers over lasts, a plurality of grippers for gripping the margin of an upper about the toe end of a last, a support common to said grippers, fluid-operated means on said support for moving the grippers outwardly in directions transverse to the height of the last to pull the upper, and additional fluid-operated means for moving said support heightwise of the last to cause the grippers to pull the upper also in that direction.

75. In a machine for shaping uppers over lasts, upper-gripping means for gripping the margin of an upper on a last, power-operated means for operating said upper-gripping means to pull the upper outwardly in a direction transverse to the height of the last, and additional power-operated means arranged for optional use to move the upper-gripping means heightwise of the last to pull the upper also in that direction.

76. In a machine for shaping uppers over lasts, upper-gripping means for gripping the margin of an upper on a last, fluid-operated means for operating said upper-gripping means to pull the upper outwardly in a direction transverse to the height of the last, additional fluid-operated means for moving the upper-gripping means heightwise of the last to pull the upper also in that direction, and means movable at the will of the operator to prevent flow of operating fluid to said additional fluid-operated means without interfering with the flow of fluid to said first-named fluid-operated means.

77. In a machine for shaping uppers over lasts, a plurality of grippers for gripping the margin of an upper about the toe end of a last, a support for said grippers, power-operated means for moving the grippers bodily along said support in outward directions transverse to the height of the last to pull the upper, and additional power-operated means arranged for optional use to move said support heightwise of the last to cause the grippers to pull the upper also in that direction.

78. In a machine for shaping uppers over lasts, a plurality of grippers for gripping the margin of an upper about the toe end of a last, a support for said grippers, fluid-operated means on said support for moving the grippers outwardly in directions transverse to the height of the last to pull the upper, additional fluid-operated means for moving said support heightwise of the last to cause the grippers to pull the upper also in that direction, and means movable at the will of the operator to prevent the operation of said additional fluid-operated means without interfering with the operation of said first-named fluid-operated means.

79. In a machine for shaping uppers over lasts, a plurality of grippers for gripping the margin of an upper about the toe end of a last, a support for said grippers, fluid-operated means on said support for moving the grippers outwardly in directions transverse to the height of the last to pull the upper, additional fluid-operated means for moving said support heightwise of the last to cause the grippers to pull the upper also in that direction, means for admitting operating fluid simultaneously to both said fluid-operated means, and means movable at the will of the operator to prevent the flow of fluid to said additional fluid-operated means without interfering with the flow to said first-named means.

80. In a machine for shaping uppers over lasts, upper-gripping means for gripping the margin of an upper at the toe end of a last and for pulling the upper, wipers for wiping the margin of the toe end of the upper inwardly over an insole on the last, means for moving said wipers heightwise of the last before they wipe the margin of the upper inwardly, and means movable with said wipers for imparting to said upper-gripping means movement heightwise of the last in the same direction as the wipers near the end of that movement of the wipers to insure clearance between the wipers and the upper-gripping means.

81. In a machine for shaping uppers over lasts, upper-gripping means for gripping the margin of an upper at the toe end of a last and for pulling the upper, a support for said upper-gripping means, wipers for wiping the margin of the toe end of the upper inwardly over an insole on the last, a support for said wipers, and means for moving said wiper support heightwise of the last before the wipers wipe the margin of the upper inwardly, the support for the upper-gripping means being movable heightwise of the last by the action of the wiper support thereon near the end of the movement of the wiper support in that direction to prevent interference between the wipers and the upper-gripping means.

82. In a machine for shaping uppers over lasts, a plurality of grippers for gripping the margin of an upper about the toe end of a last, a support for said grippers, means for moving said grippers relatively to said support to pull the upper outwardly in directions transverse to the height of the last, wipers for wiping the margin of the toe end of the upper inwardly over an insole on the last, a support for said wipers, means for moving said wiper support heightwise of the last before the wipers wipe the margin of the upper inwardly, and means carried by said wiper support for engaging the gripper support and moving it heightwise of the last near the end of the movement of the wiper support in that direction.

83. In a machine for shaping uppers over lasts, means for wiping the toe end of an upper heightwise of a last, substantially parallel links spaced apart heightwise of the last and on which said wiping means is supported, and mechanism for moving said wiping means heightwise of the last while swinging said links.

84. In a machine for shaping uppers over lasts, wipers for wiping the margin of the toe end of an upper inwardly over an insole on a last, a toe former for wiping the toe end of the upper heightwise of the last, a support common to said wipers and toe former, substantially parallel links spaced apart heightwise of the last and on which said support is mounted, and means for moving said support heightwise of the last while swinging said links.

85. In a machine for shaping uppers over lasts, wipers for wiping the margin of the toe end of an upper inwardly over an insole on a last, a toe former for wiping the toe end of the upper heightwise of the last, a support common to said wipers and toe former, fluid-operated means for moving said support heightwise of the last, and stop mechanism for limiting such movement of the support.

86. In a machine for shaping uppers over lasts, wipers for wiping the margin of the toe end of an upper inwardly over an insole on a last, a toe former for wiping the toe end of the upper heightwise of the last, a support common to said wipers and toe former, and a pair of cylinder-and-piston devices spaced apart widthwise of the last for moving said support heightwise of the last by fluid pressure.

87. In a machine for shaping uppers over lasts, wipers for wiping the margin of an upper inwardly over an insole on a last around an end of the last, and substantially parallel links spaced apart heightwise of the last for supporting said wipers, said links being mounted to swing in directions heightwise of the last to permit movements of the wipers in those directions.

88. In a machine for shaping uppers over lasts, wipers movable to wipe the margin of an upper inwardly over an insole on a last around an end of the last, means for moving said wipers heightwise of the last before they wipe the margin of the upper inwardly, a spring arranged to be subjected to stress in response to such movement of the wipers heightwise of the last for thereafter moving them reversely to increase their pressure on the margin of the upper, and automatic means for rendering said spring thus effective on the wipers only after they have substantially completed their inward wiping movements.

89. In a machine for shaping uppers over lasts, wipers for wiping the margin of an upper inwardly over an insole on a last around an end of the last, fluid-operated means for moving said wipers heightwise of the last before they wipe the margin of the upper inwardly, a spring arranged to be subjected to stress by such movement of the wipers heightwise of the last for moving them reversely to press the margin of the upper on the insole when they are over the insole, and means for releasing the fluid from said fluid-operated means to render the spring thus effective.

90. In a machine for shaping uppers over lasts, wipers for wiping the margin of an upper inwardly over an insole on a last around the toe end of the last, a toe former for wiping the toe end of the upper heightwise of the last, a support common to said wipers and toe former, fluid-operated means for moving said support heightwise of the last to cause the toe former thus to wipe the upper, a spring arranged to be subjected to stress by such movement of the support for thereafter pressing the wipers upon the upper heightwise of the last when they are over the insole, and means for releasing the fluid from said fluid-operated means to render the spring thus effective.

91. In a machine for shaping uppers over lasts, wipers for wiping the margin of an upper inwardly over an insole on a last around an end of the last, a support for said wipers movable to carry them heightwise of the last before they wipe the margin of the upper inwardly, a double-acting cylinder-and-piston device carried by said support for moving the wipers inwardly over the insole and for thereafter retracting them by fluid pressure, and automatic means for admitting operating fluid to said device thus to move and retract the wipers.

92. In a machine for shaping uppers over lasts, wipers for wiping the margin of an upper inwardly over an insole on a last around an end of the last, a support for said wipers movable to carry them heightwise of the last before they wipe the margin of the upper inwardly, fluid-operated mechanism for thus moving said support, other fluid-operated mechanism carried by said support for moving the wipers inwardly over the insole and for thereafter retracting them by fluid pressure, and automatic means for timing the admission and exhaust of operating fluid to and from said fluid-operated mechanisms.

93. In a machine for shaping uppers over lasts, wipers for wiping the margin of an upper inwardly over an insole on a last around an end of the last, a cylinder arranged to extend axially lengthwise of the last opposite the end of the last when the wipers thus act on the upper, a piston in said cylinder, said piston and cylinder being relatively movable to operate the wipers, and power-operated controlling means for admitting operating fluid to the opposite ends of said cylinder in automatically determined sequence to move the wipers inwardly over the insole and thereafter to retract them by fluid pressure.

94. In a machine for shaping uppers over lasts, wipers for wiping the margin of an upper inwardly over an insole on a last around an end of the last, a wiper carrier supporting said wipers and movable lengthwise of the last, means for closing and opening the wipers by movements of the wiper carrier, a cylinder arranged to extend axially lengthwise of the last opposite the end of the last when the wipers thus act on the upper, a piston in said cylinder connected directly to said wiper carrier, and automatically controlled valve means for admitting operating fluid to the opposite ends of said cylinder in predetermined sequence to move the wiper carrier in opposite directions by movements of said piston.

95. In a machine for shaping uppers over lasts, wipers for wiping the margin of the toe end of an upper inwardly over an insole on a last, wiper holders supporting said wipers and movable to close the wipers inwardly over the insole widthwise of the last, a toe former supported by said wiper holders and relatively to which said holders are movable thus to operate the wipers, and means for effecting relative movement of the last and the wiper holders to cause the toe former to wipe the upper heightwise of the last before the wipers wipe the margin of the upper inwardly.

96. In a machine for shaping uppers over lasts, wipers for wiping the margin of the toe end of an upper inwardly over an insole on a last, wiper holders supporting said wipers and movable to close the wipers inwardly over the insole widthwise of the last, a substantially U-shaped flexible band for embracing the upper about the toe end of the last, a plurality of members supporting said band and resting on said wiper holders while permitting the holders to move relatively to them in operating the wipers, and means for effecting relative movement of the last and the wiper holders to cause said band to wipe the upper heightwise of the last before the wipers wipe the margin of the upper inwardly.

97. In a machine for shaping uppers over lasts, wipers for wiping the margin of an upper inwardly over an insole on a last around an end of the last, wiper holders supporting said wipers and movable to close the wipers inwardly over the insole widthwise of the last, and a substantially U-shaped band supported by said wiper holders for embracing and clamping the upper around the end of the last and relatively to which said holders are movable in thus operating the wipers.

98. In a machine for shaping uppers over lasts, wipers for wiping the margin of an upper inwardly over an insole on a last around an end of the last, wiper holders supporting said wipers and movable to close the wipers inwardly over the insole widthwise of the last, a substantially U-shaped band for embracing and clamping the upper around the end of the last, and members for supporting respectively the intermediate portion and the end portions of said band, said members being arranged to rest on said wiper holders while permitting the holders to move relatively to them in operating the wipers.

99. In a machine for shaping uppers over lasts, the combination with wipers for wiping the margin of the toe end of an upper inwardly over an insole on a last, of a substantially U-shaped flexible band for embracing the upper about the toe end of the last and wiping the upper heightwise of the last, members arranged to extend lengthwise of the last and connected to the end portions of said band, springs against the resistance of which the band is bodily movable relatively to said members and the wipers lengthwise of the last in response to pressure of the upper thereon, and additional spring means against the resistance of which the end portions of the band are movable widthwise of the last in response to pressure of the upper thereon.

100. In a machine for shaping uppers over lasts, the combination with wipers for wiping the margin of the toe end of an upper inwardly over an insole on a last, of a substantially U-shaped flexible band for embracing the upper about the toe end of the last and wiping the upper heightwise of the last, members arranged to extend lengthwise of the last and connected to the end portions of said band, springs against the resistance of which the band is bodily movable relatively to said members and the wipers lengthwise of the last in response to pressure of the upper thereon, members arranged to extend widthwise of the last and also connected to the end portions of the band, and springs against the resistance of which said last-named members are movable widthwise of the last in response to pressure of the upper on the end portions of the band.

101. In a machine for shaping uppers over lasts, the combination with wipers for wiping the margin of the toe end of an upper inwardly over an insole on a last, of a substantially U-shaped flexible band for embracing the upper around the toe end of the last and wiping the upper heightwise of the last, spring means against the resistance of which said band is bodily yieldably lengthwise of the last relatively to the wipers in response to pressure of the upper thereon, members connected to the opposite end portions of the band, levers for adjusting said end portions widthwise of the last through said members, and springs against the resistance of which said members are yieldable widthwise of the last relatively to said levers in response to pressure of the upper on the end portions of the band.

102. In a machine for shaping uppers over lasts, wipers for wiping the margin of the toe end of an upper inwardly over an insole on a last, a toe former for wiping the toe end of the upper heightwise of the last, and mechanism for rendering said toe former at the will of the operator either effective or ineffective thus to wipe the upper heightwise of the last in the operation of the machine.

103. In a machine for shaping uppers over lasts, wipers for wiping the margin of the toe end of an upper inwardly over an insole on a last, a toe former for wiping the toe end of the upper heightwise of the last, a device for holding said toe former in a retracted position to prevent it from thus acting on the upper in the operation of the machine, and means for rendering said device either operative or inoperative at the will of the operator.

104. In a machine for shaping uppers over lasts, wipers for wiping the margin of the toe end of an upper inwardly over an insole on a last, a toe former for wiping the toe end of the upper heightwise of the last, a support for said toe former, means for effecting relative movement of the last and said support to cause the toe former thus to act on the upper, and mechanism arranged for optional use to hold the toe former in a retracted inoperative position substantially throughout said relative movement.

105. In a machine for shaping uppers over lasts, wipers for wiping the margin of the toe end of an upper inwardly over an insole on a last, a toe former for wiping the toe end of the upper heightwise of the last, spring means tending to move said toe former toward the upper and arranged to maintain it in position for thus wiping the upper heightwise of the last, and mechanism arranged for optional use to hold the toe former retracted against the resistance of said spring means to prevent it from thus acting on the upper.

106. In a machine for shaping uppers over lasts, wipers for wiping the margin of the toe end of an upper inwardly over an insole on a last, a toe former for wiping the toe end of the upper heightwise of the last, a spring tending to move said toe former toward the upper lengthwise of the last and arranged to maintain it in position thus to act on the upper, a lever connected to the toe former, and a member arranged to act on said lever at the will of the operator to hold the toe former retracted against the resistance of said spring and thereby to prevent it from wiping the upper heightwise of the last in the operation of the machine.

107. In a machine for shaping uppers over lasts, wipers for wiping the margin of the toe end of an upper inwardly over an insole on a last, a toe former for wiping the toe end of the upper heightwise of the last, means for effecting relative movement of the last and the toe former to cause the toe former thus to act on the upper, mechanism arranged for optional use to hold the toe former in a retracted inoperative position until near the end of said relative movement and then to release it, and means for applying the toe former in clamping relation to the upper when it is thus released.

108. In a machine for shaping uppers over lasts, wipers for wiping the margin of the toe end of an upper inwardly over an insole on a last, a toe former for wiping the toe end of the upper heightwise of the last, means for effecting relative movement of the last and the toe former to cause the toe former thus to act on the upper, spring means tending to move the toe former toward the upper lengthwise of the last, a device arranged for optional use to hold the toe former retracted against the resistance of said spring means and thus to render it ineffective to wipe the upper heightwise of the last, and means for releasing the toe former from said device substantially at the end of said relative movement of the last and the toe former to cause said spring means to apply the toe former in clamping relation to the upper.

109. In a machine for shaping uppers over lasts, wipers for wiping the margin of the toe end of an upper inwardly over an insole on a last, a toe former for wiping the toe end of the upper heightwise of the last, a support for said wipers and toe former, means for moving said support heightwise of the last to cause the toe former thus to act on the upper, a device arranged for optional use to hold the toe former in a retracted inoperative position substantially throughout the movement of said support, means for releasing the toe former from said device by the movement of said support substantially at the end of that movement, and spring means for applying the toe former in clamping relation to the upper when it is thus released.

110. In a machine for shaping uppers over lasts, wipers for wiping the margin of the toe end of an upper inwardly over an insole on a last, a toe former for wiping the toe end of the upper heightwise of the last, a support for said wipers and toe former, means for moving said support heightwise of the last to cause the toe former thus to act on the upper, a latch arranged for optional use to hold the toe former in a retracted inoperative position substantially throughout the movement of said support, a member arranged to act on said latch to release the toe former substantially at the end of that movement, and spring means for applying the toe former in clamping relation to the upper when it is thus released.

111. In a machine for shaping uppers over lasts, wipers for wiping the margin of the toe end of an upper inwardly over an insole on a last, a toe former for wiping the toe end of the upper heightwise of the last, means for effecting relative movement of the last and the toe former to cause the toe former thus to act on the upper, a device arranged for optional use to hold the toe former in a retracted inoperative position until near the end of said relative movement and then automatically to release it, spring means for applying the toe former in clamping relation to the upper when it is thus released, and automatic means for thereafter returning the toe former into position to be held by said device.

112. In a machine for shaping uppers over lasts, wipers for wiping the margin of the toe end of an upper inwardly over an insole on a last, means for thus operating said wipers and for also retracting them, a toe former for wiping the toe end of the upper heightwise of the last, means for effecting relative movement of the last and the toe former to cause the toe former thus to act on the upper, means for retracting the toe former from its normal operating position by wiper-retracting movement of said wiper-operating means, and mechanism arranged for optional use to hold the toe former thus retracted and thereby to prevent it from wiping the upper heightwise of the last in the operation of the machine.

113. In a machine for shaping uppers over lasts, wipers for wiping the margin of the toe end of an upper inwardly over an insole on a last, means for thus operating said wipers and for also retracting them, a toe former for wiping the toe end of the upper heightwise of the last, means for effecting relative movement of the last and the toe former to cause the toe former thus to act on the upper, means for retracting the toe former from its normal operating position by wiper-retracting movement of said wiper-operating means, a device arranged for optional use to hold the toe former thus retracted substantially throughout the relative movement of the last and the toe former and then to release it, and spring means for applying the toe former in clamping relation to the upper when it is thus released.

114. In a machine for shaping uppers over lasts, wipers for wiping the margin of the toe end of an upper inwardly over an insole on a last, a wiper carrier supporting said wipers, means for moving said wiper carrier lengthwise of the last thus to operate the wipers and for also retracting it, a toe former for wiping the toe end of the upper heightwise of the last, means for retracting the toe former from its normal operating position by retractive movement of said wiper carrier, and a device arranged for optional use to hold the toe former thus retracted and thereby to prevent it from wiping the upper heightwise of the last in the operation of the machine.

115. In a machine for shaping uppers over lasts, wipers for wiping the margin of the toe end of an upper inwardly over an insole on a last, a wiper carrier supporting said wipers, means for moving said wiper carrier lengthwise of the last thus to operate the wipers and for also retracting it beyond its normal starting position, a toe former for wiping the toe end of the upper heightwise of the last, means for retracting the toe former from its normal operating position by such retractive movement of the wiper carrier, and a device arranged for optional use to hold the toe former thus retracted and thereby to prevent it from wiping the upper heightwise of the last in the operation of the machine, the wiper carrier being reversely movable to its normal starting position while the toe former is held by said device.

116. In a machine for shaping uppers over lasts, wipers for wiping the margin of the toe end of an upper inwardly over an insole on a last, a wiper carrier supporting said wipers, means for moving said wiper carrier lengthwise of the last thus to operate the wipers and for also retracting it beyond its normal starting position, a toe former for wiping the toe end of the upper heightwise of the last, means for retracting the toe former from its normal operating position by such retractive movement of the wiper carrier, a device arranged for optional use to hold the toe former thus retracted and thereby to prevent it from wiping the upper heightwise of the last in the operation of the machine, and spring means for moving the wiper carrier reversely to its normal starting position while the toe former is held by said device.

117. In a machine for shaping uppers over lasts, wipers for wiping the margin of the toe end of an upper inwardly over an insole on a last, a wiper carrier supporting said wipers, fluid-operated means for moving said wiper carrier lengthwise of the last thus to operate the wipers and for also retracting it beyond its normal starting position, a toe former for wiping the toe end of the upper heightwise of the last, means for retracting the toe former from its normal operating position by such retractive movement of the wiper carrier, a device arranged for optional use to hold the toe former thus retracted and thereby to prevent it from wiping an upper heightwise of the last in the operation of the machine, and spring means for moving the wiper carrier reversely to its normal starting position upon release of operating fluid from said fluid-operated means.

118. In a power-operated machine for shaping uppers over lasts, means for gripping the margin of an upper on a last, power-operated mechanism for effecting relative movement of said upper-gripping means and the last to pull the upper in the course of a cycle of automatic operations of the machine, fluid-operated mechanism for closing said upper-gripping means on the upper, a source of supply of operating fluid, and means for causing the upper-gripping means to grip the upper and optionally to release it and grip it again prior to the starting of the cycle of operations of the machine by control of the fluid for operating said fluid-operated mechanism.

119. In a power-operated machine for shaping uppers over lasts, means for gripping the margin of an upper on a last, power-operated mechanism for effecting relative movement of said upper-gripping means and the last to pull the upper in the course of a cycle of automatic operations of the machine, fluid-operated mechanism for closing said upper-gripping means on the upper, and means controlled by the operator for admitting operating fluid to said fluid-operated mechanism and for optionally releasing the fluid therefrom and admitting it thereto a second time prior to the starting of the cycle of operations.

120. In a power-operated machine for shaping uppers over lasts, means for gripping the margin of an upper on a last, power-operated mechanism for effecting relative movement of said upper-gripping means and the last to pull the upper in the course of a cycle of automatic operations of the machine, fluid-operated mechanism for closing said upper-gripping means on the upper, and a valve for admitting operating fluid to said fluid-operated mechanism and for releasing the fluid therefrom, said valve being movable to admit the fluid and optionally to release it and admit it again prior to the starting of the cycle of operations.

121. In a power-operated machine for shaping uppers over lasts, means for gripping the margin of an upper on a last, power-operated mechanism for effecting relative movement of said upper-gripping means and the last to pull the upper in the course of a cycle of automatic operations of the machine, fluid-operated mechanism for closing said upper-gripping means on the upper, a valve for admitting operating fluid to said fluid-operated mechanism and for releasing the fluid therefrom, means controlled by the operator for moving said valve into position to admit the fluid prior to the starting of the cycle of operations of the machine, and additional means arranged for optional use to cause the valve to move into position to release the fluid preparatory to movement once more into position to admit it prior to the starting of the cycle of operations.

122. In a power-operated machine for shaping uppers over lasts, means for gripping the margin of an upper on a last, power-operated mechanism for effecting relative movement of said upper-gripping means and the last to pull the upper in the course of a cycle of automatic operations of the machine, fluid-operated mechanism for closing said upper-gripping means on the upper, a valve movable from exhaust to inlet position to admit operating fluid to said fluid-operated mechanism, means for thus moving the valve prior to the starting of the cycle of operations of the machine, a device for retaining the valve in inlet position, a spring for returning the valve to exhaust position to release the fluid from said mechanism when the valve is released by said retaining device, and means optionally movable to cause said device to release the valve preparatory to its movement once more to inlet position prior to the starting of the cycle of operations.

123. In a power-operated machine for shaping uppers over lasts, means for gripping the margin of an upper on a last, power-operated mechanism for effecting relative movement of said upper-gripping means and the last to pull the upper in the course of a cycle of automatic operations of the machine, fluid-operated mechanism for closing said upper-gripping means on the upper, a valve movable from exhaust to inlet position to admit operating fluid to said fluid-operated mechanism, means comprising a two-part lever movable as a whole to move the valve to inlet position prior to the starting of the cycle of operations, a device for retaining the valve in inlet position, a spring for returning the valve to exhaust position to release the fluid from said mechanism when the valve is released by said retaining device, and means for optionally moving said device to release the valve by relative movement of the parts of said two-part lever to cause the valve to return to exhaust position preparatory to its movement once more to inlet position prior to the starting of the cycle of operations.

124. In a power-operated machine for shaping uppers over lasts, means for gripping the margin of an upper on a last, power-operated mechanism for effecting relative movement of said upper-gripping means and the last to pull the upper in the course of a cycle of automatic operations of the machine, fluid-operated mechanism for closing said upper-gripping means on the upper, a valve initially positioned to release operating fluid from said mechanism but movable to a second position to admit the fluid thereto, a pump for delivering operating fluid for use in said mechanism, another valve initially positioned to permit free circulation of the fluid without substantial pressure but movable to a second position to obstruct such free circulation and thus to cause the pump to develop fluid pressure, means for moving both said valves to their second positions prior to the starting of the cycle of operations, and additional means optionally movable to cause both valves to return to their initial positions preparatory to movements once more to their second positions prior to the starting of the cycle.

125. In a power-operated machine for shaping uppers over lasts, means for gripping the margin of an upper on a last, power-operated mechanism for effecting relative movement of said upper-gripping means and the last to pull the upper in the course of a cycle of automatic operations of the machine, fluid-operated mechanism for closing said upper-gripping means on the upper, a valve movable to inlet position to admit operating fluid to said fluid-operated mechanism, a pump for delivering operating fluid for use in said mechanism, another valve normally permitting free circulation of the fluid without substantial pressure but movable to obstruct such free circulation and thus to cause the pump to develop fluid pressure, and means for thus moving said other valve and for also moving the first-named valve to inlet position prior to the starting of the cycle of operations, said other valve being optionally movable also prior to the starting of the cycle to cause the upper-gripping means to release and thereafter again to grip the upper by relieving and then reestablishing the pressure of the operating fluid while said first-named valve remains in inlet position.

126. In a power-operated machine for shaping uppers over lasts, means for gripping the margin of an upper on a last, power-operated mechanism for effecting relative movement of said upper-gripping means and the last to pull the upper in the course of a cycle of automatic operations of the machine, fluid-operated mechanism for closing said upper-gripping means on the upper prior to the starting of the cycle of operations, a pump for delivering operating fluid for use in said mechanism, a valve normally permitting free circulation of the fluid without substantial pressure but movable to obstruct such free circulation and thus to cause the pump to develop fluid pressure, and means for thus moving the valve prior to the starting of the cycle of operations, the valve being optionally movable also prior to the starting of the cycle to cause the upper-gripping means to release and thereafter again to grip the upper by relieving and then reestablishing the pressure of the operating fluid.

127. In a power-operated machine for shaping uppers over lasts, means for gripping the margin of an upper on a last, power-operated mechanism for effecting relative movement of said upper-gripping means and the last to pull the upper in the course of a cycle of automatic operations of the machine, fluid-operated mechaism for closing said upper-gripping means on the upper prior to the starting of the cycle of operations, a pump for delivering operating fluid for use in said mechanism, a valve initially positioned to permit free circulation of the fluid without substantial pressure but movable to a second position to obstruct such free circulation and thus to cause the pump to develop fluid pressure, means for moving the valve to its second position prior to the starting of the cycle of operations, a device for retaining the valve in that position, a spring for returning the valve to its initial position when the valve is released by said device, and means optionally movable to cause said device to release the valve and thereby to cause the upper-gripping means to release the upper preparatory to movement of the valve once more to its second position prior to the starting of the cycle of operations.

128. In a power-operated machine for shaping uppers over lasts, means for gripping the margin of an upper on a last, power-operated mechanism for effecting relative movement of said upper-gripping means and the last to pull the upper in the course of a cycle of automatic operations of the machine, fluid-operated mechanism for closing said upper-gripping means on the upper prior to the starting of the cycle of operations, a pump for delivering operating fluid for use in said mechanism, a valve initially positioned to permit free circulation of the fluid without substantial pressure but movable to a second position to obstruct such free circulation and thus to cause the pump to develop fluid pressure, means comprising a two-part lever movable as a whole to move said valve to its second position prior to the starting of the cycle of operations, a device for retaining the valve in that position, a spring for returning the valve to its initial position when the valve is released by said device, and means for optionally moving said device to release the valve by relative movement of the parts of said two-part lever and for thereby causing the upper-gripping means to release the upper preparatory to movement of the valve once more to its second position prior to the starting of the cycle of operations.

129. In a power-operated machine for shaping uppers over lasts, means for gripping the margin of an upper on a last, power-operated mechanism for effecting relative movement of said upper-gripping means and the last to pull the upper in the course of a cycle of automatic operations of the machine, fluid-operated mechanism for closing said upper-gripping means on the upper prior to the starting of the cycle of operations, a source of supply of operating fluid under pressure, and means optionally movable prior to the starting of the cycle of operations to cause the upper-gripping means to release and thereafter again to grip the upper by relieving and then reestablishing the pressure of the operating fluid at said source.

130. In a power-operated machine for shaping uppers over lasts, means for gripping the margin of an upper on a last, power-operated mechanism for effecting relative movement of said upper-gripping means and the last to pull the upper in the course of a cycle of automatic operations of the machine, fluid-operated mechanism for closing said upper-gripping means on the upper, a valve initially positioned to release operating fluid from said mechanism but movable to a second position to admit the fluid thereto, a pump for delivering operating fluid for use in said mechanism, another valve initially positioned to permit free circulation of the fluid without substantial pressure but movable to a second position to obstruct such free circulation and thus to cause the pump to develop fluid pressure, a member common to both valves and movable in one direction to move them to said second positions, means for preventing return movement of said member until said other valve returns to its initial position, and means for releasing said first-named valve from control of said member to permit that valve to be returned automatically to its initial position in the course of the cycle of operations prior to said other valve.

131. In a power-operated machine for shaping uppers over lasts, means for gripping the margin of an upper on a last, power-operated mechanism for effecting relative movement of said upper-gripping means and the last to pull the upper in the course of a cycle of automatic operations of the machine, fluid-operated mechanism for closing said upper-gripping means on the upper, a valve initially positioned to release operating fluid from said mechanism but movable to a second position to admit the fluid thereto, a pump for delivering operating fluid for use in said mechanism, another valve initially positioned to permit free circulation of the fluid without substantial pressure but movable to a second position to obstruct such free circulation and thus to cause the pump to develop fluid pressure, a member common to both valves and movable in one direction to move them to said second positions, means for preventing return movement of said member until said other valve returns to its initial position, a swinging arm operated by said member, a rod operated by said arm for operating said first-named valve, and means for releasing the rod from control of said arm by the movement of the arm to permit said first-named valve to be returned automatically to its initial position in the course of the cycle of operations prior to said other valve.

132. In a power-operated machine for shaping uppers over lasts, means for gripping the margin of an upper on a last, power-operated mechanism for effecting relative movement of said upper-gripping means and the last to pull the upper in the course of a cycle of automatic operations of the machine, fluid-operated mechanism for closing said upper-gripping means on the upper, means including a member movable by the operator to render said fluid-operated mechanism effective to close the upper-gripping means prior to the starting of the cycle of operations, and means for starting the cycle of operations by another movement of said member in the same path as its first movement.

133. In a power-operated machine for shaping uppers over lasts, means for gripping the margin of an upper on a last, power-operated mechanism for effecting relative movement of said upper-gripping means and the last to pull the upper in the course of a cycle of automatic operations of the machine, fluid-operated mechanism for closing said upper-gripping means on the upper, a valve for admitting operating fluid to said fluid-operated mechanism, a member movable in one direction by the operator to move said valve into position to admit the fluid, said member being thereafter reversely movable, and means for starting the cycle of operations of the machine by another movement of said member in the same direction as its first movement after its reverse movement.

134. In a power-operated machine for shaping uppers over lasts, means for gripping the margin of an upper on a last, power-operated mechanism for effecting relative movement of said upper-gripping means and the last to pull the upper in the course of a cycle of automatic operations of the machine, fluid-operated mechanism for closing said upper-gripping means on the upper, means including a member movable in one direction by the operator to render said fluid-operated mechanism effective to close the upper-gripping means prior to the starting of the cycle of operations, said member being thereafter reversely movable, and means for starting the cycle of operations by another movement of said member in the same direction as its first movement after its reverse movement, said starting means comprising parts relatively movable in response to the first movement of said member to render them operatively effective only in response to said other movement of the member.

135. In a power-operated machine for shaping uppers over lasts, means for gripping the margin of an upper on a last, power-operated mechanism for effecting relative movement of said upper-gripping means and the last to pull the upper in the course of a cycle of automatic operations of the machine, fluid-operated mechanism for closing said upper-gripping means on the upper, means including a member movable in one direction by the operator to render said fluid-operated mechanism effective to close the upper-gripping means prior to the starting of the cycle of operations, said member being thereafter reversely movable, means for starting the cycle of operations by another movement of said member in the same direction as its first movement after its reverse movement, said starting means comprising a rod and a lever operated by the rod, and means for maintaining the rod out of operative relation to the lever during the first movement of said member.

136. In a power-operated machine for shaping uppers over lasts, means for gripping the margin of an upper on a last, power-operated mechanism for effecting relative movement of said upper-gripping means and the last to pull the upper in the course of a cycle of automatic operations of the machine, fluid-operated mechanism for closing said upper-gripping means on the upper, fluid-operated controlling means movable to initiate the different operations of the cycle in predetermined time relation to one another, and means for starting the operation of said controlling means after the gripping of the upper by said upper-gripping means.

137. In a power-operated machine for shaping uppers over lasts, means for gripping the margin of an upper on a last, power-operated mechanism for effecting relative movement of said upper-gripping means and the last to pull the upper in the course of a cycle of automatic operations of the machine, fluid-operated mechanism for closing said upper-gripping means on the upper, fluid-operated controlling means movable to initiate the different operations of the cycle in predetermined time relation to one another, a valve movable to render said fluid-operated mechanism effective to close the upper-gripping means, and another valve movable to admit fluid to operate said controlling means after the gripping of the upper by the upper-gripping means.

138. In a power-operated machine for shaping uppers over lasts, means for gripping the margin of an upper on a last, power-operated mechanism for effecting relative movement of said upper-gripping means and the last to pull the upper in the course of a cycle of automatic operations of the machine, fluid-operated mechanism for closing said upper-gripping means on the upper, fluid-operated controlling means movable to initiate the different operations of the cycle in predetermined time relation to one another, a member movable to render said fluid-operated mechanism effective to close the upper-gripping means, and means for also starting the operation of said controlling means by movement of said member.

139. In a power-operated machine for shaping uppers over lasts, means for gripping the margin of an upper on a last, power-operated mechanism for effecting relative movement of said upper-gripping means and the last to pull the upper in the course of a cycle of automatic operations of the machine, fluid-operated mechanism for closing said upper-gripping means on the upper, fluid-operated controlling means movable to initiate the different operations of the cycle in predetermined time relation to one another, a valve movable to render said fluid-operated mechanism effective to close the upper-gripping means on the upper, another valve movable to admit fluid to operate said controlling means, an operating member common to said valves, and means for operating said valves in sequence by said member.

140. In a fluid-operated machine, a plurality of fluid-operated mechanisms, valves for controlling the admission of fluid respectively to said different mechanisms, controlling means movable to initiate the operations of the different mechanisms in predetermined time relation to one another by control of said valves, a fluid-operated device comprising a member movable in one direction by fluid pressure to operate said controlling means, valve means for admitting operating fluid to said device and for releasing the fluid therefrom, and means for imparting return movement to said member when the fluid is released from said device while said controlling means is stationary.

141. In a fluid-operated machine, a plurality of fluid-operated mechanisms, valves for controlling the admission of fluid respectively to said different mechanisms, controlling means movable to initiate the operations of the different mechanisms in predetermined time relation to one another by control of said valves, a fluid-operated device comprising a member movable in one direction by fluid pressure to operate said controlling means, valve means for admitting operating fluid to said device and for releasing the fluid therefrom, a spring for returning said member when the fluid is released from said device, and means for preventing reverse movement of said controlling means when said member is thus returned.

142. In a fluid-operated machine, a plurality of fluid-operated mechanisms, valves for controlling the admission of fluid respectively to said different mechanisms, controlling means rotatable to initiate the operations of the different mechanisms in predetermined time relation to one another by control of said valves, a fluid-operated device comprising a member movable in one direction by fluid pressure to rotate said controlling means, and mechanism for thus rotating the controlling means by said member, said mechanism comprising parts relatively movable to permit return movement of said member without rotating the controlling means.

143. In a fluid-operated machine, a plurality of fluid-operated mechanisms, valves for controlling the admission of fluid respectively to said different mechanisms, controlling means rotatable to initiate the operations of the different mechanisms in predetermined time relation to one another by control of said valves, a fluid-operated device comprising a member movable in one direction by fluid pressure to rotate said controlling means, mechanism for thus rotating the controlling means by said member, said mechanism comprising parts relatively movable to permit return movement of said member without rotating the controlling means, valve means for admitting operating fluid to said device and for releasing the fluid therefrom, and means for imparting return movement to said member when the fluid is released from said device.

144. In a fluid-operated machine, a plurality of fluid-operated mechanisms, valves for controlling the admission of fluid respectively to said different mechanisms, controlling means rotatable to initiate the operations of the different mechanisms in predetermined time relation to one another by control of said valves, a fluid-operated device comprising a member movable in one direction by fluid pressure to rotate said controlling means, a clutch for thus rotating the controlling means by said member, and rack-and-pinion mechanism for operating the clutch by said member, the clutch comprising parts relatively movable to permit return movement of said member without rotating the controlling means.

145. In a fluid-operated machine, a plurality of fluid-operated mechanisms, valves for controlling the admission of fluid respectively to said different mechanisms, controlling means movable to initiate the operations of the different mechanisms in predetermined time relation to one another by control of said valves, a fluid-operated device comprising a member movable by fluid pressure to operate said controlling means, a valve for admitting operating fluid to said device, and automatic means for operating said valve in response to the movement of said controlling means to terminate the admission of fluid to said device and thereby to stop the operation of the machine.

146. In a fluid-operated machine, a plurality of fluid-operated mechanisms, valves for controlling the admission of fluid respectively to said different mechanisms, controlling means movable to initiate the operations of the different mechanisms in predetermined time relation to one another by control of said valves, a fluid-operated device comprising a member movable by fluid pressure to operate said controlling means, a valve for controlling the admission of operating fluid to said device, means movable by the operator to cause said valve to admit the fluid and thereby to start the operation of said controlling means, and means for operating said valve automatically in response to the movement of said controlling means to stop the admission of fluid to said device and thereby to stop the operation of the machine.

147. In a fluid-operated machine, a plurality of fluid-operated mechanisms, valves for controlling the admission of fluid respectively to said different mechanisms, controlling means movable to initiate the operations of the different mechanisms in predetermined time relation to one another by control of said valves, a fluid-operated device comprising a member movable by fluid pressure to operate said controlling means, mechanism controlled by the operator for admitting operating fluid to said device to start the operation of said controlling means, and additional mechanism for automatically stopping the admission of fluid and for releasing the fluid from said device in response to the movement of said controlling means.

148. In a fluid-operated machine, a plurality of fluid-operated mechanisms, valves for controlling the admission of fluid respectively to said different mechanisms, controlling means movable to initiate the operations of the different mechanisms in predetermined time relation to one another by control of said valves, a fluid-operated device comprising a member movable by fluid pressure to operate said controlling means, valve mechanism for admitting operating fluid to said device and for releasing the fluid therefrom, automatic means for operating said valve mechanism thus to release the fluid in response to the movement of said controlling means after a series of operations of said fluid-operated mechanisms, and means for imparting return movement to said member independently of said controlling means when the fluid is thus released from said device.

149. In a fluid-operated machine, a plurality of fluid-operated mechanisms, valves for controlling the admission of fluid respectively to said different mechanisms, controlling means movable to initiate the operations of the different mechanisms in predetermined time relation to one another by control of said valves, a fluid-operated device comprising a member movable by fluid pressure to operate said controlling means, and means for variably controlling the speed of movement of said member to vary the speed of operation of the machine.

150. In a fluid-operated machine, a plurality of fluid-operated mechanisms, valves for controlling the admission of fluid respectively to said different mechanisms, controlling means movable to initiate the operations of the different mechanisms in predetermined time relation to one another by control of said valves, a fluid-operated device comprising a member movable by fluid pressure to operate said controlling means, and a fluid check for varying the speed of movement of said member to vary the speed of operation of the machine.

151. In a fluid-operated machine, a plurality of fluid-operated mechanisms, valves for controlling the admission of fluid respectively to said different mechanisms, controlling means rotatable to initiate the operations of the different mechanisms in predetermined time relation to one another by control of said valves, a fluid-operated device comprising a member movable by fluid pressure to rotate said controlling means, and a fluid check for controlling the movement of said member, said fluid check having means providing for a variably restricted flow of fluid in response to the movement of said member to vary the speed of operation of the machine.

152. In a fluid-operated machine, a plurality of fluid-operated mechanisms, valves for controlling the admission of fluid respectively to said different mechanisms, controlling means rotatable to initiate the operations of the different mechanisms in predetermined time relation to one another by control of said valves, a cylinder having a piston therein movable by fluid pressure to rotate said controlling means, another fluid-containing cylinder having a piston therein movable with said first-named piston, means providing an outlet from said other cylinder through which fluid is forced in response to the movement of said first-named piston, and a valve for variably restricting the flow of fluid through said outlet.

153. In a fluid-operated machine, a plurality of fluid-operated mechanisms, valves for controlling the admission of fluid respectively to said different mechanisms, a rotatable control shaft having thereon members for initiating the operations of said different mechanisms in predetermined time relation to one another by control of said valves, a fluid-operated device comprising a member movable in one direction by fluid pressure to rotate said shaft, valve means for admitting operating fluid to said device and for releasing the fluid therefrom, means for imparting return movement to said member when the fluid is released from said device, and means for preventing reverse rotation of said shaft when said member is thus returned.

154. In a fluid-operated machine, a plurality of fluid-operated mechanisms, valves for controlling the admission of fluid respectively to said different mechanisms, a rotatable control shaft having thereon members for initiating the operations of said different mechanisms in predetermined time relation to one another by control of said valves, a fluid-operated device comprising a member movable in one direction by fluid pressure to rotate said shaft, valve means for admitting operating fluid to said device and for releasing the fluid therefrom, a clutch for rotating the shaft by said member, said clutch comprising parts relatively movable to permit return movement of said member independently of the shaft, a spring for thus returning said member when the fluid is released from said device, and a brake for holding the shaft against reverse movement.

155. In a fluid-operated machine, a plurality of fluid-operated mechanisms, valves for controlling the admission of fluid respectively to said different mechanisms, controlling means movable to initiate the operations of the different mechanisms in predetermined time relation to one another by control of said valves, a fluid-operated device comprising a member movable by fluid pressure to operate said controlling means, a valve movable to admit operating fluid to said device, a spring arranged to be subjected to stress for thus moving said valve, and means for preventing the movement of the valve until the spring has been subjected to stress and for then rendering the spring effective on the valve.

156. In a fluid-operated machine, a plurality of fluid-operated mechanisms, valves for controlling the admission of fluid respectively to said different mechanisms, controlling means movable to initiate the operations of the different mechanisms in predetermined time relation to one another by control of said valves, a fluid-operated device comprising a member movable by fluid pressure to operate said controlling means, a valve movable to admit operating fluid to said device, a valve-operating member for thus moving the valve, a spring arranged to be subjected to stress for moving the valve-operating member, and means for holding the valve-operating member against movement until the spring has been subjected to stress and for then releasing it to the action of the spring.

157. In a fluid-operated machine, a plurality of fluid-operated mechanisms, valves for controlling the admission of fluid respectively to said different mechanisms, controlling means movable to initiate the operations of the different mechanisms in predetermined time relation to one another by control of said valves, a fluid-operated device comprising a member movable by fluid pressure to operate said controlling means, a valve movable to admit operating fluid to said device, a valve-operating member for thus moving the valve, mechanism for moving the valve-operating member, said mechanism comprising relatively movable parts and a spring arranged to be subjected to stress by their relative movement for thereafter imparting movement to the valve-operating member, a latch for holding said valve-operating member initially against movement by said mechanism, and means for operating said latch to release said member after said spring has been subjected to stress.

158. In a fluid-operated machine, a plurality of fluid-operated mechanisms, valves for controlling the admission of fluid respectively to said different mechanisms, controlling means movable to initiate the operations of the different mechanisms in predetermined time relation to one another by control of said valves, a fluid-operated device comprising a member movable by fluid pressure to operate said controlling means, a valve movable to admit operating fluid to said device, a valve-operating member for thus moving the valve, a lever for operating said valve-operating member, connections between said lever and the valve-operating member including a spring arranged to be subjected to stress by the movement of the lever for thereafter imparting movement to the valve-operating member, a latch for holding said valve-operating member initially against movement by the lever, and means for operating said latch also by movement of said lever to release said member only after the spring has been subjected to stress.

159. In a fluid-operated machine, the combination with a fluid-operated device, of a valve movable to admit operating fluid to said device, a member for thus moving the valve, a valve-operating lever, a spring arranged to be subjected to stress by movement of said lever for thereafter operating said member, a latch for holding said member against movement until the spring has been subjected to stress, and means for then operating the latch by said lever to release said member.

160. In a fluid-operated machine, a plurality of fluid-operated mechanisms, valves associated respectively with said different mechanisms, levers for moving said valves into inlet positions to admit fluid to said mechanisms, devices for holding said levers against return movements to retain the valves in those positions, springs for moving said devices into their holding positions, the valves beng reversely movable when the levers are released by said devices, and rotatable controlling means comprising members for operating said levers to move the valves into inlet positions in predetermined time relation to one another and also members for moving said devices against resistance of their springs to release said levers and permit return movements of the valves.

161. In a fluid-operated machine, a plurality of fluid-operated mechanisms, valves associated respectively with said different mechanisms, levers for moving said valves into inlet positions to admit fluid to said mechanisms, devices for holding said levers against return movements to retain the valves in those positions, the valves being reversely movable when the levers are released by said devices, and rotatable controlling means comprising members arranged to act directly on said levers to move the valves into inlet positions in predetermined time relation to one another and also members for operating said devices to release the levers and permit return movements of the valves.

162. In a fluid-operated machine, a plurality of fluid-operated mechanisms, valves associated respectively with said different mechanisms, levers for moving said valves into inlet positions to admit fluid to said mechanisms, spring-controlled latches for holding said levers against return movements to retain the valves in those positions, springs for returning the valves when the levers are released by said latches, and rotatable controlling means comprising members for operating said levers to move the valves into inlet positions in predetermined time relation to one another and also members for operating said latches to release the levers and permit return movements of the valves.

163. In a fluid-operated machine, a plurality of fluid-operated mechanisms, valves associated respectively with said different mechanisms, levers for moving said valves into inlet positions to admit fluid to said mechanisms, devices for holding said levers against return movements to retain the valves in those positions, the valves being reversely movable when the levers are released by said devices, and a rotatable control shaft having thereon members arranged to act directly on said levers to move the valves into inlet positions in predetermined time relation to one another and also members for operating said devices to release the levers and permit return movements of the valves, said members being relatively adjustable about said shaft to vary the times when the levers are operated and also the times when said devices are operated to release the levers.

164. In a fluid-operated machine, the combination with fluid-operated mechanism, of a valve for controlling flow of the operating fluid, a lever movable in one direction to move said valve from one position to a second position, a retaining device for holding the lever against return movement to retain the valve in its second position, and a rotatable control shaft having thereon a member arranged to act directly on said lever to move the valve to its second position and another member for thereafter actuating said retaining device to release the lever and permit return movement of the valve.

165. In a fluid-operated machine, the combination with fluid-operated mechanism, of a valve for controlling flow of the operating fluid, a lever movable in one direction to move said valve from one position to a second position, a retaining device for holding the lever against return movement to retain the valve in its second position, and a rotatable control shaft having thereon a member arranged to act directly on said lever to move the valve to its second position and another member for thereafter actuating said retaining device to release the lever and permit return movement of the valve, said members being relatively adjustable about the shaft to vary the time between the movement of the valve to its second position and its return movement.

166. In a fluid-operated machine, the combination with fluid-operated mechanism, of a valve for controlling flow of the operating fluid, a lever movable in one direction to move said valve from one position to a second position, a spring-controlled latch for holding the lever against return movement, means for returning the valve when the lever is released by said latch, and rotatable controlling means comprising members for operating said lever and latch respectively in predetermined time relation to each other to move the valve to its second position and thereafter to release the lever and permit return movement of the valve.

167. In a fluid-operated machine, the combination with fluid-operated mechanism, of a valve for controlling flow of the operating fluid, a lever movable in one direction to move said valve from one position to a second position, an arm mounted for swinging movement and arranged to be operated by said lever thus to operate the valve, a spring for transmitting the force of the lever to the arm, means for limiting the movement of the valve independently of the movement of the lever, a latch for holding the lever against return movement, and a spring for returning the valve when the lever is released by said latch.

168. In a fluid-operated machine, the combination with fluid-operated mechanism, of a valve for controlling flow of the operating fluid, a lever movable in one direction to move said valve from one position to a second position, spring means for transmitting the force of the lever to the valve thus to operate the valve, a device for holding the lever against return movement, and a spring for returning the valve when the lever is released by said device.

169. In a fluid-operated machine, the combination with fluid-operated mechanism, of a valve for controlling flow of the operating fluid, a lever movable in one direction to move said valve from one position to a second position, an arm mounted to swing independently of the lever and arranged to transmit the force of the lever to the valve thus to operate the valve by the movement of the lever, a device for holding the lever against return movement, and means for returning the valve when the lever is released by said device.

170. In a fluid-operated machine, the combination with fluid-operated mechanism, of a valve for controlling flow of the operating fluid, a lever movable in one direction to move said valve from one position to a second position, an arm mounted for swinging movement thus to operate the valve by the movement of the lever, a spring for transmitting the force of the lever to the arm, and means for limiting the movement of the valve, said spring being yieldable to permit further movement of the lever after movement of the valve is stopped by said limiting means.

171. In a fluid-operated machine, the combination with fluid-operated mechanism, of a valve for controlling flow of the operating fluid, a lever movable in one direction to move said valve from one position to a second position, an arm mounted for swinging movement thus to operate the valve by the movement of the lever, a spring for transmitting the force of the lever to the arm, and a stop for engaging the arm to limit the movement of the valve, said spring being yieldable to permit further movement of the lever after the arm has engaged said stop.

172. In a fluid-operated machine, the combination with fluid-operated mechanism, of a valve for controlling flow of the operating fluid, means comprising a two-part lever movable as a whole in one direction to move said valve from one position to a second position, and a device for retaining the valve in its second position, said device being movable to release the valve in response to relative movement of the parts of said two-part lever.

173. In a fluid-operated machine, the combination with fluid-operated mechanism, of a valve for controlling flow of the operating fluid, means comprising a two-part lever movable as a whole in one direction to move said valve from one position to a second position, and a device for holding said lever against return movement and for thereby retaining the valve in said second position, said device being movable to release the two-part lever in response to reverse movement of one part of the lever relatively to the other part.

174. In a fluid-operated machine, the combination with fluid-operated mechanism, of a valve for controlling flow of the operating fluid, means comprising a two-part lever movable as a whole in one direction to move said valve from one position to a second position, a latch carried by said lever for holding the lever against return movement and for thereby retaining the valve in said second position, said latch being movable to release the lever in response to reverse movement of one part of the lever relatively to the other part, and a spring for returning the valve when the lever is thus released.

175. In a fluid-operated machine, the combination with fluid-operated mechanism, of a valve for controlling flow of the operating fluid, a two-part lever for controlling said valve, a spring for maintaining the parts of said lever normally in fixed relation to each other, the lever being movable as a whole in one direction to move said valve from one position to a second position, and a device for holding the lever against return movement and for thereby retaining the valve in said second position, said device being movable to release the lever in response to reverse movement of one part of the lever relatively to the other part against the resistance of said spring.

176. In a fluid-operated machine, a plurality of fluid-operated mechanisms, a source of supply of fluid under pressure, the pressure of the fluid at said source being subject to variations resulting from variations in the volume of fluid required by said mechanisms, and fluid-operated controlling means movable to admit fluid to the different mechanisms in a predetermined order, the fluid acting on said controlling means being subject to the same variations of pressure as at said source to cause the speed of operation of the controlling means to vary inversely as the volume of fluid required to operate said mechanisms.

177. In a fluid-operated machine, a plurality of fluid-operated mechanisms, a chamber containing fluid for operating said mechanisms, a pump for maintaining the fluid in said chamber under pressure throughout the operation of the machine, the pressure of the fluid in said chamber being subject to variations resulting from variations in the volume of fluid required by said mechanisms, and fluid-operated controlling means movable to admit fluid to the different mechanisms in a predetermined order, the fluid acting on said controlling means being subject to the same variations of pressure as in said chamber to cause the speed of operation of the controlling means to vary inversely as the volume of fluid required to operate said mechanisms.

178. In a fluid-operated machine, a plurality of fluid-operated mechanisms, a source of supply of fluid under pressure, the pressure of the fluid at said source being subject to variations resulting from variations in the volume of fluid required by said mechanisms, valves for admitting fluid respectively to said different mechanisms, controlling means movable to initiate the operations of the different mechanisms by control of said valves, and a fluid-operated member movable to operate said controlling means, the fluid acting on said member being subject to the same variations of pressure as at said source to cause the speed of operation of the controlling means to vary inversely as the volume of fluid required to operate said mechanisms.

179. In a fluid-operated machine, a plurality of fluid-operated mechanisms, a source of supply of fluid under pressure, the pressure of the fluid at said source being subject to variations resulting from variations in the volume of fluid required by said mechanisms, valves for admitting fluid respectively to said different mechanisms, controlling means rotatable to initiate the operations of the different mechanisms by control of said valves, and a fluid-operated member movable to rotate said controlling means, the fluid acting on said member being subject to the same variations of pressure as at said source to cause the speed of rotation of the controlling means to vary inversely as the volume of fluid required to operate said mechanisms.

180. In a fluid-operated machine, a plurality of fluid-operated mechanisms, a chamber containing fluid for operating said mechanisms, a pump for maintaining the fluid in said chamber continuously under pressure throughout the operation of the machine, the pressure of the fluid in said chamber being subject to variations resulting from variations in the volume of fluid required by said mechanisms, valves for admitting fluid respectively to said different mechanisms, a rotatable control shaft having means thereon for actuating said valves to admit the fluid, and a fluid-operated member movable to rotate said shaft, the fluid acting on said member being subject to the same variations of pressure as in said chamber to cause the speed of rotation of the shaft to vary inversely as the volume of fluid required to operate said mechanisms.

181. In a fluid-operated machine, a plurality of fluid-operated mechanisms, valves for controlling the admission of fluid respectively to said different mechanisms, controlling means movable to initiate the operations of the different mechanisms by control of said valves, a fluid-operated member movable to operate said controlling means, automatic means for terminating the operation of the controlling means by said member by control of the fluid acting on said member, and additional fluid-actuated mechanism for further moving said controlling means automatically to a predetermined position if it is not moved to that position by said member.

182. In a fluid-operated machine, a plurality of fluid-operated mechanisms, valves for controlling the admission of fluid respectively to said different mechanisms, controlling means movable to initiate the operations of the different mechanisms by control of said valves, a fluid-operated member movable to operate said controlling means, automatic means for terminating the operation of the controlling means by said member by control of the fluid acting on said member, spring-operated mechanism for further moving said controlling means automatically to a predetermined position if it is not moved to that position by said member, and a fluid-operated device for controlling said spring-operated mechanism to render its operative.

183. In a fluid-operated machine, a plurality of fluid-operated mechanisms, valves for controlling the admission of fluid respectively to said different mechanisms, controlling means movable to initiate the operations of the different mechanisms by control of said valves, a fluid-operated member movable to operate said controlling means, automatic means for terminating the operation of the controlling means by said member by control of the fluid acting on said member, mechanism for further moving said controlling means automatically to a predetermined position if it is not moved to that position by said member, a spring for operating said mechanism, and fluid-operated means for moving said mechanism against the resistance of said spring and for releasing it to the action of the spring.

184. In a fluid-operated machine, a plurality of fluid-operated mechanisms, valves for controlling the admission of fluid respectively to said different mechanisms, controlling means rotatable to initiate the operations of the different mechanisms by control of said valves, a fluid-operated member movable to rotate said controlling means, automatic means for terminating the rotation of the controlling means by said member by control of the fluid acting on said member, mechanism arranged to act on said controlling means further to rotate it to a predetermined position at the end of the operation of the machine if it is not moved to that position by said member, a spring for operating said mechanism, and fluid-operated means for moving said mechanism automatically against the resistance of said spring and for releasing it to the action of the spring.

185. In a fluid-operated machine, a plurality of fluid-operated mechanisms, a chamber containing fluid for operating said mechanisms, means for establishing fluid pressure in said chamber at the beginning of the operation of the machine and for terminating the pressure at the end of the operation of the machine, valves for controlling the admission of fluid respectively to said different mechanisms, controlling means movable to initiate the operations of the different mechanisms by control of said valves, a fluid-operated member movable to operate said controlling means, mechanism for further moving said controlling means to a predetermined position at the end of the operation of the machine if it is not moved to that position by said member, a spring for operating said mechanism, and fluid-operated means subject to the pressure of the fluid in said chamber for moving said mechanism against the resistance of the spring when the pressure is established in said chamber and for releasing it to the action of the spring when the pressure in the chamber is terminated.

186. In a fluid-operated machine, a plurality of fluid-operated mechanisms, a chamber containing fluid for operating said mechanisms, a pump for delivering fluid to said chamber, means providing a fluid outlet to prevent initially the development of any substantial pressure in said chamber by the pump, a valve movable by the operator to obstruct said outlet and thereby to establish pressure in said chamber, a retaining device for holding said valve against reverse movement, controlling means movable to initiate the operations of said fluid-operated mechanisms, a fluid-operated member movable to operate said controlling means, said controlling means being constructed to operate said retaining device to release said valve for reverse movement at the end of the operation of the machine, and additional fluid-actuated mechanism for further moving said controlling means into position to release said retaining device after acting thereon if it is not moved to that position by said fluid-operated member.

187. In a fluid-operated machine, a plurality of fluid-operated mechanisms, a chamber containing fluid for operating said mechanisms, a pump for delivering fluid to said chamber, means providing a fluid outlet to prevent initially the development of any substantial pressure in said chamber by the pump, a valve movable by the operator to obstruct said outlet and thereby to establish pressure in said chamber, a retaining device for holding said valve against reverse movement, controlling means movable to initiate the operations of said fluid-operated mechanisms, a fluid-operated member movable to operate said controlling means, said controlling means being constructed to operate said retaining device to release said valve for reverse movement at the end of the operation of the machine, mechanism for further moving said controlling means into position to release said retaining device after acting thereon if it is not moved to that position by said fluid-operated member, a spring for operating said mechanism, and fluid-operated means for moving said mechanism automatically against the resistance of said spring and for releasing it to the action of the spring.

188. In a fluid-operated machine, the combination with a fluid-operated device, of a member movable by fluid pressure to impart operative movement to said device, automatic means for terminating the operation of the device by said member by control of the fluid acting on said member, and additional fluid-actuated motor mechanism for further moving said device automatically in the direction of its movement by said member to a predetermined position if it is not moved to that position by said member.

189. In a fluid-operated machine, the combination with a fluid-operated device, of a member movable by fluid pressure to impart operative movement to said device, automatic means for terminating the operation of the device by said member by control of the fluid acting on said member, mechanism for further moving said device to a predetermined position if it is not moved to that position by said member, a spring for operating said mechanism, and fluid-operated means for rendering said spring effective thus to operate said mechanism.

190. In a fluid-operated machine, the combination with a rotatable device, of a member movable by fluid pressure to rotate said device, automatic means for terminating the rotation of the device by said member by control of the fluid acting on said member, an additional member arranged further to rotate said device to a predetermined position if it is not moved to that position by said fluid-operated member, a spring for operating said additional member, and fluid-operated means for retracting said additional member against the resistance of the spring and for releasing it to the action of the spring.

191. In a fluid-operated machine, the combination with a rotatable device, of a member movable by fluid pressure to rotate said device, automatic means for terminating the rotation of the device by said member by control of the fluid acting on said member, an additional member arranged to rotate said device to a predetermined position if it is not moved to that position by said fluid-operated member, a swinging arm for operating said additional member, a spring for operating said arm, means for limiting the movement of the arm, and a fluid-operated device for retracting the arm against the resistance of the spring preparatory to its movement by the spring.

192. In a fluid-operated machine, the combination with a fluid-operated device, of a chamber for containing operating fluid, means for establishing fluid pressure in said chamber at the beginning of the operation of the machine and for terminating the pressure at the end of the operation of the machine, a member movable by the fluid pressure to impart operative movement to said device, mechanism for further moving said device to a predetermined position at the end of the operation of the machine if it is not moved to that position by said member, a spring for operating said mechanism, and fluid-operated means subject to the pressure of the fluid in said chamber for retracting said mechanism against the resistance of the spring when the pressure is established in said chamber and for releasing it to the action of the spring when the pressure in the chamber is terminated.

193. In a fluid-operated machine, a plurality of fluid-operated mechanisms, fluid-operated controlling means movable to initiate the operations of said different mechanisms in a predetermined order, automatic means for interrupting the movement of said controlling means by control of the fluid acting thereon and for thereby stopping the machine before the machine completes its operations, and fluid-operated starting mechanism for thereafter automatically starting said controlling means again in operation by control of the operating fluid.

194. In a fluid-operated machine, a plurality of fluid-operated mechanisms, fluid-operated controlling means movable to initiate the operations of said different mechanisms in a predetermined order, automatic means for interrupting the movement of said controlling means by control of the fluid acting thereon and for thereby stopping the machine before the machine completes its operations, fluid-operated starting mechanism for automatically starting said controlling means again in operation by control of the operating fluid after an interval depending upon the speed of the movement of said starting mechanism, and means for adjustably varying said speed.

195. In a fluid-operated machine, a plurality of fluid-operated mechanisms, fluid-operated controlling means movable to initiate the operations of said different mechanisms in a predetermined order, automatic means for interrupting the movement of said controlling means by control of the fluid acting thereon and for thereby stopping the machine before the machine completes its operations, fluid-operated starting mechanism for automatically starting said controlling means again in operation by control of the operating fluid after an interval depending upon the speed of the movement of said starting mechanism, and fluid means for variably retarding the movement of said starting mechanism to vary the time said controlling means remains at rest.

196. In a fluid-operated machine, a plurality of fluid-operated mechanisms, fluid-operated controlling means movable to initiate the operations of said different mechanisms in a predetermined order, automatic means for interrupting the movement of said controlling means by control of the fluid acting thereon and for thereby stopping the machine before the machine completes its operations, fluid-operated starting mechanism for starting said controlling means again in operation by control of the operating fluid after an interval depending upon the speed of the movement of said starting mechanism, and automatic means for admitting fluid to said starting mechanism to initiate its movement before said controlling means comes to a stop.

197. In a fluid-operated machine, a plurality of fluid-operated mechanisms, controlling means movable to initiate the operations of said different mechanisms in a predetermined order, a fluid-operated device comprising a member movable by fluid pressure to operate said controlling means, a valve for admitting fluid to said device, automatic means for interrupting the movement of said controlling means by control of said valve to stop the machine before the machine completes its operations, and fluid-operated starting mechanism for thereafter automatically starting said controlling means again in operation by control of said valve.

198. In a fluid-operated machine, a plurality of fluid-operated mechanisms, controlling means movable to initiate the operations of said different mechanisms in a predetermined order, a fluid-operated device comprising a member movable by fluid pressure to operate said controlling means, a valve for admitting fluid to said device, automatic means for interrupting the movement of said controlling means by control of said valve to stop the machine before the machine completes its operations, fluid-operated starting mechanism for automatically starting said controlling means again in operation by control of said valve after an interval depending upon the speed of the movement of said starting mechanism, and automatic means for initiating the movement of said starting mechanism before said controlling means comes to a stop.

199. In a fluid-operated machine, a plurality of fluid-operated mechanisms, valves for controlling the admission of fluid respectively to said different mechanisms, controlling means rotatable to cause said mechanisms to operate in a predetermined order in a cycle of operations of the machine by control of said valves, a fluid-operated device comprising a member movable by fluid pressure to rotate said controlling means, means for interrupting the movement of said controlling means by control of the fluid acting on said member to stop the machine prior to the completion of the cycle of operations, and fluid-operated starting mechanism for thereafter automatically starting said controlling means again in operation by admitting fluid to said device.

200. In a fluid-operated machine, a plurality of fluid-operated mechanisms, valves for controlling the admission of fluid respectively to said different mechanisms, controlling means rotatable to cause said mechanisms to operate in a predetermined order in a cycle of operations of the machine by control of said valves, a fluid-operated device comprising a member movable by fluid pressure to rotate said controlling means, a valve for admitting fluid to said device, automatic means for interrupting the movement of said controlling means by control of said valve to stop the machine prior to the completion of the cycle of operations, and fluid-operated starting mechanism for thereafter automatically starting said controlling means again in operation by control of said valve.

201. In a fluid-operated machine, a plurality of fluid-operated mechanisms, valves for controlling the admission of fluid respectively to said different mechanisms, controlling means rotatable to cause said mechanisms to operate in a predetermined order in a cycle of operations of the machine by control of said valves, a fluid-operated device comprising a member movable by fluid pressure to rotate said controlling means, a valve for admitting fluid to said device, automatic means for interrupting the movement of said controlling means by control of said valve to stop the machine prior to the completion of the cycle of operations, fluid-operated starting mechanism for starting said controlling means again in operation by control of said valve after an interval depending upon the speed of the movement of said starting mechanism, and automatic means for admitting fluid to said starting mechanism to initiate its movement before said controlling means comes to a stop.

202. In a fluid-operated machine, a plurality of fluid-operated mechanisms, valves for controlling the admission of fluid respectively to said different mechanisms, controlling means rotatable to cause said mechanisms to operate in a predetermined order in a cycle of operations of the machine by control of said valves, a fluid-operated device comprising a member movable by fluid pressure to rotate said controlling means, a valve for admitting fluid to said device, valve-operating mechanism movable by the operator to start said controlling means by movement of said valve, automatic means for interrupting the movement of said controlling means by control of said valve to stop the machine prior to the completion of the cycle of operations, and fluid-operated starting mechanism for thereafter automatically starting said controlling means again in operation by movement of said valve-operating mechanism.

BERNHARDT JORGENSEN.

CERTIFICATE OF CORRECTION.

Patent No. 2,324,509. July 20, 1943.

BERNHARDT JORGENSEN.

It is hereby certified that error appears in the printed specification of the above numbered patent requiring correction as follows: Page 1, first column, line 46, for "sides" read --side--; page 7, first column, line 40, for "upward" read --upwiped--; page 8, second column, line 56, for "block" read --blocks--; page 21, first column, line 1, strike out "1074 for thus operating and controlling the valve" and insert the same after "plate" on page 20, second column, line 62; page 32, first column, line 21, claim 101, for "yieldably" read --yieldable--; line 45, for "sald" read --said--; and that the said Letters Patent should be read with this correction therein that the same may conform to the record of the case in the Patent Office.

Signed and sealed this 9th day of November, A. D. 1943.

(Seal)

Henry Van Arsdale,
Acting Commissioner of Patents.